United States Patent
Bellini, III et al.

(10) Patent No.: US 11,321,647 B2
(45) Date of Patent: *May 3, 2022

(54) PROJECT SCHEDULING AND MANAGEMENT SYSTEM THAT USES PRODUCT DATA WITH PRODUCT CLASSES

(71) Applicant: ConnectWise LLC, Tampa, FL (US)

(72) Inventors: Arnold Bellini, III, Tampa, FL (US); Linda Brotherton, Tampa, FL (US); Robert Isaacs, Tampa, FL (US)

(73) Assignee: CONNECTWISE, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,450

(22) Filed: Nov. 23, 2020

(65) Prior Publication Data

US 2021/0150452 A1 May 20, 2021

Related U.S. Application Data

(63) Continuation of application No. 15/624,628, filed on Jun. 15, 2017, now Pat. No. 10,846,632, which is a continuation of application No. 13/837,337, filed on Mar. 15, 2013, now Pat. No. 9,684,880.

(51) Int. Cl.
*G06Q 10/06* (2012.01)

(52) U.S. Cl.
CPC .................. *G06Q 10/063116* (2013.01)

(58) Field of Classification Search
None
See application file for complete search history.

(56) References Cited

U.S. PATENT DOCUMENTS

| 5,758,126 | A | 5/1998 | Daniels et al. |
| 5,758,327 | A | 5/1998 | Gardner et al. |
| 5,758,328 | A | 5/1998 | Giovannoli |
| 5,758,331 | A | 5/1998 | Johnson |
| 5,802,493 | A | 9/1998 | Sheflott et al. |
| 5,808,894 | A | 9/1998 | Wiens et al. |
| 6,067,525 | A | 5/2000 | Johnson et al. |

(Continued)

OTHER PUBLICATIONS

Steyn, Herman. "An investigation into the fundamentals of critical chain project scheduling." International journal of project management 19.6 (2001): 363-369. (Year: 2001).*

(Continued)

*Primary Examiner* — Thomas L Mansfield
(74) *Attorney, Agent, or Firm* — Foley & Lardner LLP

(57) ABSTRACT

Systems and methods of the present disclosure facilitate scheduling and managing a project. In some embodiments, the system includes a quoting module, a product data module, and a project planning module executing on at least one processor of a server. The product data module may be configured to store at least one product. The product stored in the project module may have a product class indicating that the product is a labor product, parts product, or agreements product. The system may be configured to copy products from the product data module to the quoting module. The system may be configured to also copy products from the product data module to the project planning module, and generate tasks for the project planning module based on the products.

20 Claims, 38 Drawing Sheets

(56) References Cited

U.S. PATENT DOCUMENTS

| | | | |
|---|---|---|---|
| 6,085,169 A | 7/2000 | Walker et al. | |
| 6,141,653 A | 10/2000 | Conklin et al. | |
| 6,158,044 A | 12/2000 | Tibbetts | |
| 6,226,675 B1 | 5/2001 | Meltzer et al. | |
| 6,256,667 B1 | 7/2001 | W.ang.hlander et al. | |
| 6,356,909 B1 | 3/2002 | Spencer | |
| 6,415,259 B1 | 7/2002 | Wolfinger et al. | |
| 6,418,415 B1 | 7/2002 | Walker et al. | |
| 6,801,333 B1 | 10/2004 | Weiss | |
| 6,859,768 B1* | 2/2005 | Wakelam | G06Q 10/06 703/1 |
| 6,898,580 B1 | 5/2005 | Curran et al. | |
| 6,901,407 B2 | 5/2005 | Curns et al. | |
| 7,003,473 B2 | 2/2006 | Curtis et al. | |
| 7,050,874 B1 | 5/2006 | Tenorio | |
| 7,072,857 B1 | 7/2006 | Calonge | |
| 7,092,968 B1 | 8/2006 | Ebel et al. | |
| 7,117,162 B1 | 10/2006 | Seal et al. | |
| 7,143,051 B1 | 11/2006 | Hanby et al. | |
| 7,302,401 B1 | 11/2007 | Tervonen | |
| 7,340,410 B1 | 3/2008 | Vaillancourt et al. | |
| 7,440,911 B1 | 10/2008 | Fors et al. | |
| 7,516,088 B2 | 4/2009 | Johnson et al. | |
| 7,546,346 B2 | 6/2009 | Ouchi | |
| 7,558,783 B2 | 7/2009 | Vadlamani et al. | |
| 7,606,739 B1 | 10/2009 | Johnson | |
| 7,664,668 B2 | 2/2010 | Lissy et al. | |
| 7,702,736 B2 | 4/2010 | Ouchi | |
| 7,702,737 B2 | 4/2010 | Ouchi | |
| 7,707,259 B2 | 4/2010 | Ouchi | |
| 7,836,103 B2* | 11/2010 | Li | G06F 16/258 707/809 |
| 7,908,200 B2 | 3/2011 | Scott et al. | |
| 7,941,341 B2 | 5/2011 | Johnson et al. | |
| 7,962,358 B1 | 6/2011 | Fernandez et al. | |
| 8,005,910 B2 | 8/2011 | Ouchi | |
| 8,009,820 B2 | 8/2011 | Curtis | |
| 8,271,355 B2 | 9/2012 | Johnson et al. | |
| 8,290,808 B2 | 10/2012 | Brower et al. | |
| 8,306,908 B1 | 11/2012 | Barker et al. | |
| 8,374,896 B2 | 2/2013 | Engler et al. | |
| 8,612,275 B1 | 12/2013 | Crum et al. | |
| 8,639,553 B1 | 1/2014 | Knauth et al. | |
| 2001/0056362 A1* | 12/2001 | Hanagan | H04M 15/51 705/7.11 |
| 2002/0007289 A1 | 1/2002 | Malin et al. | |
| 2002/0016729 A1 | 2/2002 | Breitenbach et al. | |
| 2002/0026356 A1 | 2/2002 | Bergh et al. | |
| 2002/0046147 A1* | 4/2002 | Livesay | G06Q 30/02 705/37 |
| 2002/0046214 A1 | 4/2002 | Sandifer | |
| 2002/0059512 A1 | 5/2002 | Desjardins | |
| 2002/0069154 A1 | 6/2002 | Fields | |
| 2002/0077711 A1 | 6/2002 | Nixon et al. | |
| 2002/0078046 A1 | 6/2002 | Uluakar et al. | |
| 2002/0083099 A1 | 6/2002 | Knauss et al. | |
| 2002/0087391 A1 | 7/2002 | Williams | |
| 2002/0116210 A1 | 8/2002 | Medina et al. | |
| 2002/0116300 A1 | 8/2002 | Debusk et al. | |
| 2002/0123957 A1 | 9/2002 | Notarius et al. | |
| 2002/0123969 A1 | 9/2002 | Foertsch et al. | |
| 2002/0165724 A1 | 11/2002 | Blankesteijn | |
| 2002/0169651 A1 | 11/2002 | Limousin et al. | |
| 2002/0188513 A1 | 12/2002 | Gil et al. | |
| 2002/0199182 A1 | 12/2002 | Whitehead | |
| 2003/0004854 A1 | 1/2003 | Greene et al. | |
| 2003/0014298 A1 | 1/2003 | Merklein | |
| 2003/0014326 A1 | 1/2003 | Ben-Meir et al. | |
| 2003/0028533 A1 | 2/2003 | Bata et al. | |
| 2003/0046153 A1 | 3/2003 | Robibero | |
| 2003/0061266 A1 | 3/2003 | Ouchi | |
| 2003/0121001 A1 | 6/2003 | Jeannette et al. | |
| 2003/0135425 A1 | 7/2003 | Leavitt | |
| 2003/0154144 A1 | 8/2003 | Pokorny et al. | |
| 2003/0158640 A1 | 8/2003 | Pillar et al. | |
| 2003/0179870 A1 | 9/2003 | Desa et al. | |
| 2003/0182172 A1 | 9/2003 | Claggett et al. | |
| 2004/0002885 A1 | 1/2004 | Levy | |
| 2004/0117046 A1 | 6/2004 | Colle et al. | |
| 2004/0143474 A1 | 7/2004 | Haeberle et al. | |
| 2004/0254950 A1 | 12/2004 | Musgrove et al. | |
| 2005/0021424 A1 | 1/2005 | Lewis et al. | |
| 2005/0022154 A1 | 1/2005 | Chung et al. | |
| 2005/0044165 A1 | 2/2005 | O'Farrell et al. | |
| 2005/0171918 A1 | 8/2005 | Eden et al. | |
| 2005/0216325 A1 | 9/2005 | Ziad et al. | |
| 2005/0240451 A1 | 10/2005 | Johnson et al. | |
| 2005/0240881 A1 | 10/2005 | Rush et al. | |
| 2006/0053043 A1* | 3/2006 | Clarke | G06Q 10/06314 705/7.17 |
| 2006/0106685 A1 | 5/2006 | Cheng et al. | |
| 2006/0122892 A1 | 6/2006 | Fletcher et al. | |
| 2006/0184715 A1 | 8/2006 | Gikas et al. | |
| 2006/0287874 A1 | 12/2006 | Askeland et al. | |
| 2006/0287932 A1* | 12/2006 | Wulteputte | G06Q 30/02 705/26.4 |
| 2007/0016487 A1 | 1/2007 | Calonge | |
| 2007/0022404 A1* | 1/2007 | Zhang | G06Q 10/06 717/103 |
| 2007/0088621 A1 | 4/2007 | Hamilton et al. | |
| 2007/0143320 A1 | 6/2007 | Gaurav et al. | |
| 2007/0150855 A1 | 6/2007 | Jeong | |
| 2007/0156476 A1 | 7/2007 | Koegler et al. | |
| 2007/0165816 A1 | 7/2007 | Gilles | |
| 2007/0192362 A1 | 8/2007 | Caballero et al. | |
| 2008/0034425 A1 | 2/2008 | Overcash et al. | |
| 2008/0162177 A1 | 7/2008 | Raffel et al. | |
| 2008/0228582 A1 | 9/2008 | Fordyce et al. | |
| 2008/0243565 A1 | 10/2008 | Gregory | |
| 2008/0243654 A1 | 10/2008 | Wernze et al. | |
| 2008/0255914 A1 | 10/2008 | Oren | |
| 2008/0300962 A1 | 12/2008 | Cawston et al. | |
| 2008/0312980 A1 | 12/2008 | Boulineau et al. | |
| 2009/0012828 A1 | 1/2009 | Brower et al. | |
| 2009/0076928 A1 | 3/2009 | Hjertonsson et al. | |
| 2009/0094040 A1 | 4/2009 | Lewis | |
| 2009/0109033 A1 | 4/2009 | Salvat | |
| 2009/0125359 A1 | 5/2009 | Knapic et al. | |
| 2009/0222317 A1 | 9/2009 | Allen et al. | |
| 2009/0222356 A1 | 9/2009 | Courchesne et al. | |
| 2010/0030665 A1 | 2/2010 | Johnson | |
| 2010/0063959 A1 | 3/2010 | Doshi et al. | |
| 2010/0070329 A1 | 3/2010 | Engler et al. | |
| 2010/0076803 A1 | 3/2010 | Deo et al. | |
| 2010/0088240 A1 | 4/2010 | Ely et al. | |
| 2010/0131296 A1 | 5/2010 | Knutson | |
| 2010/0198652 A1 | 8/2010 | Spanton et al. | |
| 2010/0217616 A1 | 8/2010 | Colson et al. | |
| 2010/0257012 A1 | 10/2010 | Walker et al. | |
| 2010/0280867 A1 | 11/2010 | Diaz et al. | |
| 2010/0318443 A1 | 12/2010 | Culp | |
| 2011/0093328 A1 | 4/2011 | Woolcott | |
| 2011/0184771 A1* | 7/2011 | Wells | G06Q 10/04 705/7.14 |
| 2011/0246255 A1 | 10/2011 | Gilbert et al. | |
| 2011/0252019 A1* | 10/2011 | Lamothe | G06Q 10/06 707/720 |
| 2011/0276427 A1 | 11/2011 | Mcnall et al. | |
| 2012/0030069 A1 | 2/2012 | Garg et al. | |
| 2012/0072299 A1 | 3/2012 | Sampsell | |
| 2012/0215687 A1 | 8/2012 | Jain | |
| 2012/0215783 A1 | 8/2012 | Musgrove et al. | |
| 2012/0221393 A1 | 8/2012 | Ouimet et al. | |
| 2012/0259684 A1 | 10/2012 | Ochiai | |
| 2012/0271730 A1 | 10/2012 | Mcnall et al. | |
| 2012/0323727 A1 | 12/2012 | Batra et al. | |
| 2012/0330929 A1 | 12/2012 | Kowalski et al. | |
| 2013/0006700 A1 | 1/2013 | Brower et al. | |
| 2013/0110667 A1 | 5/2013 | Debusk et al. | |
| 2013/0117228 A1 | 5/2013 | Appleman et al. | |
| 2013/0246113 A1 | 9/2013 | Mantravadi et al. | |
| 2013/0268388 A1 | 10/2013 | Walker et al. | |

(56) References Cited

U.S. PATENT DOCUMENTS

| | | | |
|---|---|---|---|
| 2014/0122144 A1 | 5/2014 | Cirpus et al. |
| 2014/0214473 A1 | 7/2014 | Gentile et al. |
| 2014/0265299 A1 | 9/2014 | Janesky |

OTHER PUBLICATIONS

Loerch, Andrew George. A new approach to production planning, scheduling, and due-date quotation in manufacturing systems. Cornell University, 1990. (Year: 1990).*

"Agent-based e-commerce in case of mass customization", K Turowski—International Journal of Production Economics, 2002—Elsevier.

"An investigation into the use of ERP systems in the service sector", V Botta-Genoulaz, PA Millet—International Journal of Production Economics, 2006—Elsevier.

"Assessment of benefits from product configuration systems" L Hvam, A Haug, NH Mortensen—. . . on Configuration, ECAI 2010, the 19th . . . , 2010—orbit.dtu.dk.

"Hospital resource planning: concepts, feasibility, and framework", AV Roth, R Dierdonck—Production and operations . . . , 1995—Wiley Online Library.

"System." Merriam-Webster.com, May 18, 2013. Internet Archive, <http:l/web.archive.org/web/20130518062353/https://www .merriam-webster.com/dictionary/system>. (Year: 2013).

1945 Snap-On Tools Price Catalog, Ebay Auction, retrieved from the Internet Jul. 22, 2017, pp. 1-3. pages.

A case study of the ERP system application in the aviation maintenance department of H company L Haigang, Y Wanling—Service Systems and Service . . . , 2008—ieeexplore.IEEE.org.

Akintoye, "Just-in-Time Application and Implementation for Building Material Management", Oct. 19, 1993, pp. 105-113.

Aquilano and Smith, "A Formal Set of Algorithms for Project Scheduling with Critical Path Scheduling / Material Requirements Planning", vol. 1, Issue2, Nov. 1980, pp. 57-67.

Ashley Verrill, Help Desk Software Systems, Apr. 5, 2013.

Assistance Software, product overview, 2013, Naarden, The Netherlands.

Autotask, A Better Way to Run your Software Business, DS ISV LTR 070312, Jul. 2012, East Greenbush, New York.

Autotask, Insight. Intelligence. Control. Prosper Through Productivity, DS SLM A4 FR 070212, Jul. 2012, East Greenbush, New York.

Autotask, MSP Increases Top Line Growth by 55%, CS MASTER LTR+ 032013, Mar. 2013, East Greenbush, New York.

Autotask, Opening the Door to Sell & Service Clients with Internal IT Resources, DS AT LTR 071912, Jul. 2012, East Greenbush, New York.

Autotask, Sporting Goods Manufacturer Optimizes IT Service Operations with Autotask, CS Li Ning A4 040513, Apr. 2013, East Greenbush, New York.

Autotask, Streamlining Service Provider Operations, Jul. 2012, East Greenbush, New York.

Autotask, Understanding the Changing Landscape for IT Services, Jan. 2013, East Greenbush, New York.

BDO Solutions Blog, Why a Microsoft Dynamics CRM based Professional Service Automation solution may be right for you (Part 1), Dec. 17, 2012, Waterloo, Ontario, Canada.

Berka and Conn, "Materials Management: A Comprehensive System" Transactions of AACE International, 1994 ABI/INFORM Global, pp. SI2.1.

Customer relationship management in the pharmaceutical industry T Puschmann, R Alt—. . . Sciences, 2001. Proceedings of the 34th . . . , 2001—ieeexplore.IEEE.org.

Design and development of a business-to-business integration module for Openbravo ERP JM Bernal Alejo—2011—academica-e.unavarra.es.

Enterprise Resource Planning and Integration, K Kurbel—2005—mfile.narotama.ac.id.

Evaluation of integration technology approaches in the healthcare supply chain S Kitsiou, A Matopoulos, V Manthou . . .—. . . Journal of Value . . . , 2007—indersciencenonline.com.

Final Office Action on U.S. Appl. No. 13/837,300 dated May 9, 2018.

Final Office Action on U.S. Appl. No. 13/958,095 dated Mar. 9, 2021.

Final Office Action on U.S. Appl. No. 13/958,095 dated Mar. 21, 2019.

Final Office Action on U.S. Appl. No. 13/958,095 dated Apr. 14, 2020.

Final Office Action on U.S. Appl. No. 15/624,628 dated Apr. 20, 2020.

Financialforce.com, FinancialForce Professional Services Automation (PSA) datasheet, 2013, San Francisco, California.

Financialforce.com, FinancialForce PSA overview, 2013, San Francisco, California.

GreenRope, GreenRope CRM product description, 2013, San Diego, California.

Launching professional services automation: Institutional entrepreneurship for information technology innovations P Wang, EB Swanson—Information and Organization, 2007—Elsevier.

LogicBox, LogicBox CRM product description, 2013, Portland, Oregon.

Microsoft Corp., Microsoft Dynamics AX 2012 R2 product overview, 2013, Redmond, Washington.

NetSuite, NetSuite CRM+ product overview, 2013, San Mateo, California.

Non-Final Office Action on U.S. Appl. No. 13/958,095 dated Jul. 19, 2018.

Non-Final Office Action on U.S. Appl. No. 13/958,095 dated Oct. 4, 2019.

Non-Final Office Action on U.S. Appl. No. 13/958,095 dated Oct. 30, 2020.

Non-Final Office Action on U.S. Appl. No. 15/624,628 dated Oct. 17, 2019.

Non-Final Office Action on U.S. Appl. No. 16/434,749 dated Jan. 28, 2020.

Notice of Allowance on U.S. Appl. No. 13/837,300 dated Jan. 24, 2019.

Notice of Allowance on U.S. Appl. No. 15/624,628 dated Jul. 24, 2020.

Notice of Allowance on U.S. Appl. No. 16/434,749 dated Jul. 8, 2020.

Oracle, Inc., JD Edwards EnterpriseOne Applications Customer Relationship Management for Sales Implementation Guide, Release 9.1, E15142-02, Mar. 2013, Redwood Shores, California.

Professional Services Automation: A Knowledge Management Approach Using LS land Domain Specific Ontologies. V Kashyap, SR Dalal, C Behrens—FLAIRS Conference, 2001—aaai.org.

Ronen and Trietsch, "A Decision Support System For Purchasing Management of Large Projects", Operations Research; Nov./Dec. 1988, ABI/INFORM Global, p. 882.

Sage, Sage SalesLogix product overview, 2013, Irvine, California.

SAP AG, Improving CRM Processes with SAP Business All-In-One Solutions, 50-089-904, Sep. 2011, Walldorf, Germany.

Siebel Systems, Inc., Siebel Professional Services Automation Guide, eBusiness Applications, Version 7.0, 10PA1-PS00-07000, Sep. 2001, San Mateo, California.

Siebel Systems, Inc., Siebel Professional Services Automation Guide, Version 7.7, Nov. 2004, San Mateo, California.

SugarCRM, product description, 2013, Cupertino, California.

The Construction Industry Institute Materials Management Task Force, "Project Materials Management Primer", Publication 7—Nov. 2, 1988.

Tigerpaw Software, product description, 2013, Bellevue, Nebraska.

U.S. Notice of Allowance on U.S. Appl. No. 13/837,337 dated Mar. 22, 2017.

U.S. Office Action dated Apr. 8, 2015.

U.S. Office Action dated Sep. 4, 2015.

U.S. Office Action dated Oct. 15, 2015.

U.S. Office Action dated Dec. 9, 2014.

U.S. Office Action dated Mar. 18, 2015.

(56) References Cited

OTHER PUBLICATIONS

U.S. Office Action on U.S. Appl. No. 13/837,300 dated Jun. 8, 2016.
U.S. Office Action on U.S. Appl. No. 13/837,300 dated Jul. 26, 2017.
U.S. Office Action on U.S. Appl. No. 13/837,300 dated Feb. 8, 2017.
U.S. Office Action on U.S. Appl. No. 13/837,337 dated Feb. 8, 2016.
U.S. Office Action on U.S. Appl. No. 13/958,095 dated Feb. 21, 2017.
U.S. Office Action on U.S. Appl. No. 13/958,095 dated Sep. 12, 2017.
Using electronic data interchange (EDI) to improve the efficiency of accounting transactions SW Anderson, WN Lanen—The Accounting Review, 2002—aaajournals.org.

* cited by examiner

PROJECT SCHEDULING AND MANAGEMENT SYSTEM THAT USES PRODUCT DATA WITH PRODUCT CLASSES

CROSS-REFERENCE TO RELATED APPLICATIONS

This application is a continuation of, and claims priority to and the benefit of U.S. Non-Provisional patent application Ser. No. 15/624,628 titled "PROJECT SCHEDULING AND MANAGEMENT SYSTEM THAT USES PRODUCT DATA WITH PRODUCT CLASSES", filed on Jun. 15, 2017, which is a continuation of and claims priority to and the benefit of U.S. Non-Provisional patent application Ser. No. 13/837,337 titled "PROJECT SCHEDULING AND MANAGEMENT SYSTEM THAT USES PRODUCT DATA WITH PRODUCT CLASSES", filed on Mar. 15, 2013, which is hereby incorporated herein by reference in its entirety for all purposes.

FIELD OF THE DISCLOSURE

The present disclosure generally relates to the use of project planning systems to schedule and manage projects. More specifically, the present disclosure relates to using product data to drive the project planning process, based on product classes associated with the product data.

BACKGROUND OF THE INVENTION

Project planning systems can schedule and manage projects of various types. Tasks that are required in order to complete the project are manually entered and assigned.

SUMMARY OF THE INVENTION

Service providers are in the business of delivering equipment and services to customers. The services they offer to their customers include installation, configuration, and ongoing maintenance of the equipment they deliver. In order to facilitate providing services, a service provider can use a project planning system to schedule and manage the plethora of activities involved in providing these installation, configuration, and maintenance services.

The information used to enter and update tasks in a project planning system can be derived from the products that go into the original quote sent to the customer. For example, if the quote contains an email server, then the product data associated with the email server will include information such as the part number and the price of the hardware server, as well as the part number and price of the software license for the email software needed on the server. In the present disclosure, the product data can also include information about the amount of time and skill set needed to install the server, the amount of time and skill set needed to install and configure the email software, the interval at which regular maintenance of the server hardware is required, the amount of time and skill set needed to provide the regular maintenance of the server hardware, the interval at which regular maintenance of the email software is required, and the amount of time and skill set needed to provide the regular maintenance of the email software. With this product information, tasks can be automatically generated for the project planning system to install, configure, and maintain the server hardware and email software. The maintenance tasks can be automatically entered on an ongoing basis, for example, daily, weekly, or monthly. Additionally, the skill sets from the product data can be used to automatically assign the tasks to appropriate staff.

The level of automation described in the present disclosure, combined with the "leveling" function available in modern project planning systems, makes it possible to completely automate the creation of the project plan using only the product data from the customer quote. This level of automation increases the efficiency of the service provider, and additionally reduces the human error inherent in more manual processes, which increases the level of customer satisfaction. As a result, the service provider has a large business advantage with the present disclosure.

Systems and methods of the present disclosure facilitate scheduling and managing a project. For example, the present disclosure provides a quoting module, a product data module, and a project planning module. The product data module stores product descriptions and can be configured to store products. The products can have a product class indicating that they are a labor product, parts product, or agreements product. Products can be copied from the product data module to both the quoting module and the project planning module. Tasks can be generated for the project planning module based on the products.

At least one aspect of the present disclosure is directed to a system for project scheduling and management. In some embodiments, the system can include a quoting module, a product data module, and a project planning module. The product data module can be configured to store at least one product. The products have a product class, indicating that the product is a labor product, parts product, or agreements product. The system can be configured to copy a first product from the product data module to the quoting module. The system can be configured to copy the first product from the product data module to the project planning module. The system can generate a task for the product planning module based on the first product.

At least one aspect of the present disclosure is directed to a method for project scheduling and management. In some embodiments, the method can include storing, by a product data module executing on the server, at least one product, wherein the product comprises a product class, the product class including at least one of a labor product, a parts product, and an agreements product. In some embodiments, the method can include copying a first product from the product data module to a quoting module executing on the server. In some embodiments, the method can include copying the first product from the product data module to a project planning module executing on the server. In some embodiments, the method can include generating, based on the first product, a task for the project planning module.

At least one aspect of the present disclosure is directed to a system for automatically scheduling and managing projects. In some embodiments, the system can include a product data module. The product data module can execute on at least one processor of a server. The product data module can be configured to obtain a first product. The first product can include a product description and a product class, where the product class can include at least one of a labor product, a parts product, and an agreements product. The system can include a quoting module configured to generate a quote and update the product data with the quote. The quote can be generated based, at least in part, on a subset of the product data. The system can also include a project planning module. The project planning module can be configured to obtain the updated product data with the quote. The project planning module can generate, based on the product class and the quote, a task. The task can be associated with at least one of a resource type, skill level, price, start time, deadline, and order.

In some embodiments, the project planning module can identify, based on the generated task, an available resource to perform the task, and assign the task.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 22 is an illustrative example of an embodiment of a user interface for project management.

FIG. 28 is an illustrative example of an embodiment of an invoice for a customer.

FIG. 33 is an illustrative example of an embodiment of a user interface for selecting products to include in a product bundle.

Like reference numbers and designations in the various drawings indicate like elements.

DETAILED DESCRIPTION

Figure 1:
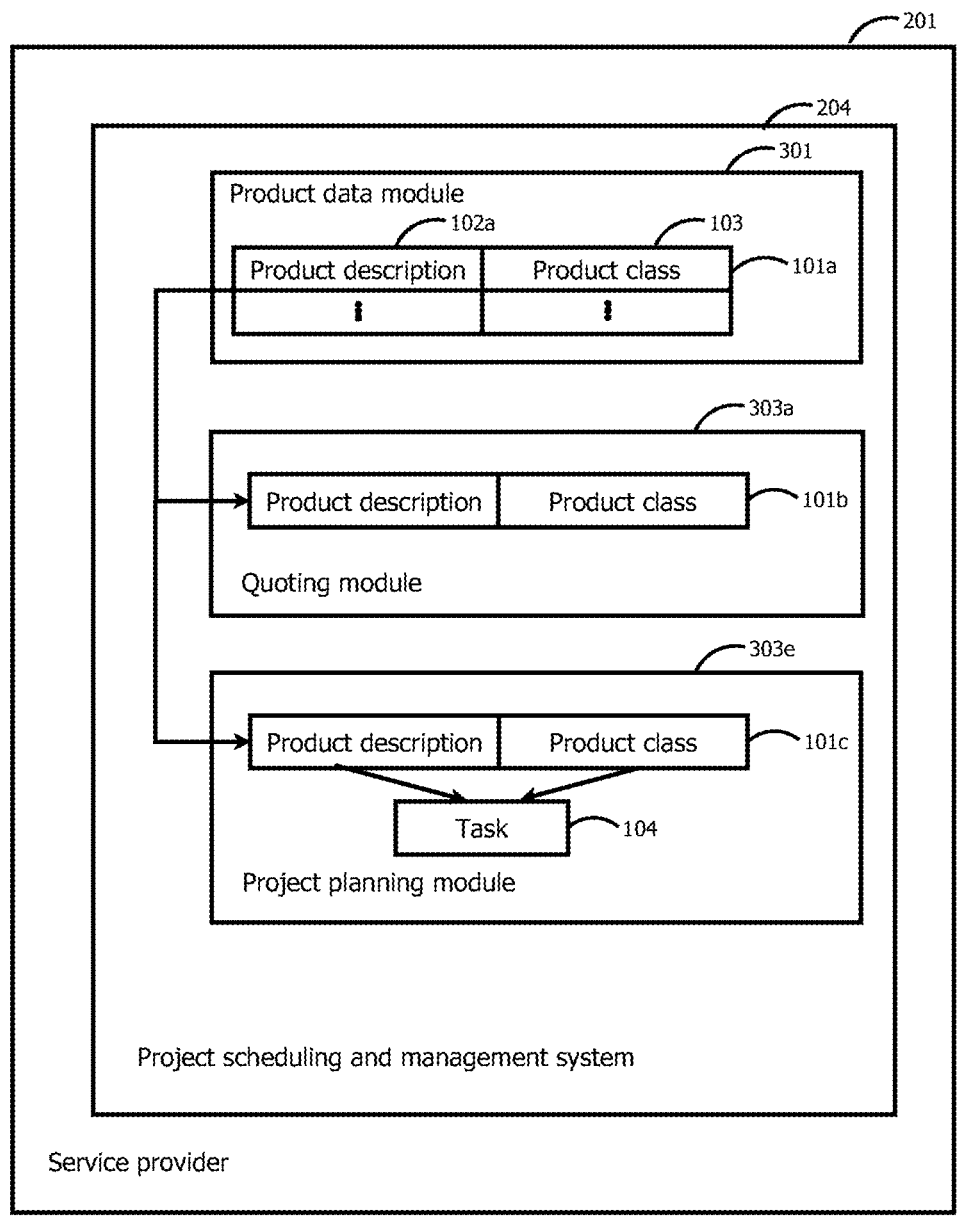
FIG. 1 is an illustrative block diagram of an embodiment of a system to schedule and manage a project.

Systems and methods of the present disclosure can use product data to drive the creation of tasks in a project management system. Product data can describe various classes of products including, e.g., parts products, labor products and agreement products. Based on the type of product data and the product description, the systems and methods disclosed herein can generate a quote for the product, which can then be used to generate, enter, assign and update one or more tasks associated with the product or project.

In an illustrative example, a service provider may provide a network solution for a small business. As part of the network solution, the service provider may provide equipment (e.g., a firewall server, routers, Ethernet wires), installation (e.g., installing servers, routers and wires, setting up server, configuring client machines), and an agreement (e.g., warranty, maintenance program, routine updates, setting up new client machines on-demand). Each of these components of the network solution may be performed by various actors or entities. For example, a first entity may provide the server equipment, while a second entity may provide the wires and routers, a third entity performs the install, and a fourth entity negotiates the agreements. To determine the various tasks that need to be performed to complete the project, the systems and methods of the present disclosure can use the underlying product data to drive the task generation and assignment process. For example, a quote module or quoting business process can generate a quote using at least a subset of the product data. Once the customer agrees to the terms of the quote, which may require revising one or more term of the quote, the product data can be updated based on the quote.

Thereafter, a project planning module can obtain the latest product data to generate one or more tasks based on a product description and a product class. For example, the project planning module can determine that a product description is a model number for a router and the product class is a part. The project planning module may further determine that this part needs to be ordered in order to complete the project. The product data may include additional terms associated with this part such as a price, quantity, shipping rate, delivery time, or warranty. In some embodiments, the project planning module may generate a task for ordering the part. In some embodiments, the system may determine, based on the product data, that the part will need to be installed in order to complete the project. In some embodiments, the system may determine that prior to generating and assigning a task for installing the product, that the part should be ordered and received at the site of installation or received by the installer. Accordingly, in some embodiments, the project planning module may schedule the ordering task with a deadline that is no later than the latest time an installer can install the part and still meet the overall timeline for the project. In other embodiments, the system may receive an indication that the part has arrived, and, responsive to receiving this indication, generate a task to install the part. That is, in the event tasks that are dependent on one another, the system can receive an indication of when a previous tasks is completed, and the project planning module can automatically schedule the subsequent task, based on the product data.

FIG. 1 illustrates a block diagram of a system to schedule and manage a project. In brief overview, the business is a service provider 201 with a project scheduling and management system 204. In some embodiments, the system 204 can be, or include, a resource planning system. The project scheduling and management system 204 can include a product data module 301 that stores product information 101, with both a product description 102 and a product class 103. The project scheduling and management system 204 can include a quoting module 303a and a project planning module 303e. The quoting module 303a and project planning module 303e can be communicatively coupled to each other or the product data module 301. The system can copy a product 101a from the product data module 301 to a product 101b in the quoting module 303a, and also copy the product 101a to a product 101c in the project planning module 303e. The system can then automatically use the product 101c to create a task 104 in the project planning module. This process can be repeated to make additional tasks 104 from products 101.

In further detail, the service provider 201 can include any entity that provides services or equipment to customers. Services may include installation, configuration, and ongoing maintenance of the equipment they deliver. In some embodiments, service providers may include manufacturers that manufacture equipment and provide the equipment to customers. Service providers may communicate with third-party vendors to provide one or more services to the customers, and may further assign tasks to the one or more vendors. In some embodiments, the service providers may assign tasks electronically via a network, SMS text messaging, electronic mail, or other communication technique. In some embodiments, the servicer provider may communicate with vendors or customers electronically, telephonically or physically.

The product data module 301, which is discussed in further detail below, includes one or more products. Each product can include a product description and a corresponding product class. For example, installing a furnace may be a labor product class because it includes a person performing a task. The description of the product, e.g., the installation, can include the type of furnace (e.g., gas, oil, air, water), a make/model number of the furnace, estimated cost of installation, installation timeline, or skill level required to perform the installation.

The quoting module or quoting business process 303a can obtain at least a subset of the product data to facilitate generating a quote, as discussed further below. The quoting module 303a can obtain the product data in any manner including, e.g., copying the information from the product data module, referring to the data in the product module, transferring the product data information from the product data module, or otherwise conveying the product data information. The quoting module 303a may obtain a subset of the product data, for example, the make/model of the furnace, the cost of the furnace, and the estimated installation cost to generate a quote and provide the quote product to the customer. The customer may alter one or more terms of the quote; e.g., the customer may determine that the make/model is too expensive or not compatible with a pre-existing system, and alter the part. The quoting module 303a may then save the revised quote, which can be copied back to the product data module 301, saved in the product data module 301, or conveyed directly to the project planning module 303e or project planning business process 303e.

The project planning module 303e can obtain at least a subset of product data from either the product data module 301 or the quoting module 303a, or another repository that includes that the revised product data based on the quote. The product data may be copied, transferred, or otherwise conveyed to the project module 303e. The project data module 303e can generate a task based on the obtained updated product data. For example, the project planning module 303e can plan, organize and manage resources (e.g., equipment and personnel) to facilitate completion of a project. In some embodiments, the project planning module 303e can take into account various factors such as scheduling, cost control, budget management, resource allocation, or resource leveling.

For example, the product data may indicate that a part needs to be ordered and that the part needs to be installed (e.g., a parts products and a labor product). The product data may also indicate who is in charge of ordering the part, the skill level required to perform the installation, and the timeline for the project. Based on the information in the product data, the project planning module 303e can generate a task for ordering the part and assign the task to the person or entity responsible for ordering parts, which may indicated in the product data or obtained from a repository containing information about entities that can perform certain tasks. The task can indicate information about the part (e.g., make/model, quantity, price), from where to order the part, and by when the part should be ordered or received by the customer or the installer. The project planning module 303e can also generate a task to install the product based on the product data. For example, the project planning module 303e can identify the skill level required to perform the task and further identify an available person to perform the task. In some embodiments, the product data ma include information about the availability of personnel who can perform the task, while in other embodiments the project management module 303e may obtain this information from another source, such as a worker shift schedule.

In some embodiments, the project planning module 303e can generate tasks based on the multiple dependency relationships of tasks or activities. Further to the network solution example above, the system may determine that the Ethernet wiring should be installed before the firewall server can be installed, that the firewall server needs to be installed before the routers can function, and that the routers should be installed before client machines can be configured to operate on the network. In some embodiments, each of these products (e.g., parts and labor products), may correspond to tasks that should be completed in a certain order. The project planning module may identify the order based on the product data itself, which may indicate whether certain products need to be performed prior to other products, or whether the product can be performed independent of other products.

In some embodiments, the project planning module 303e can provide resource leveling functionality. Resource leveling may refer to a project management technique used to resolve over-allocations or conflicts of resources (e.g., persons or equipment). For example, the project planning module may schedule certain tasks simultaneously. When more resources such as equipment or people are needed than are available, the tasks may have to be rescheduled concurrently or sequentially to manage the constraint. By resolving these conflicts, the project planning module 303e can balance the workload and resolve conflicts or over allocations in a project plan by calculating delays and updating tasks automatically (e.g., delay task until resources are available).

The system and its components, such as a resource planning system 204 and business process modules 303, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2:
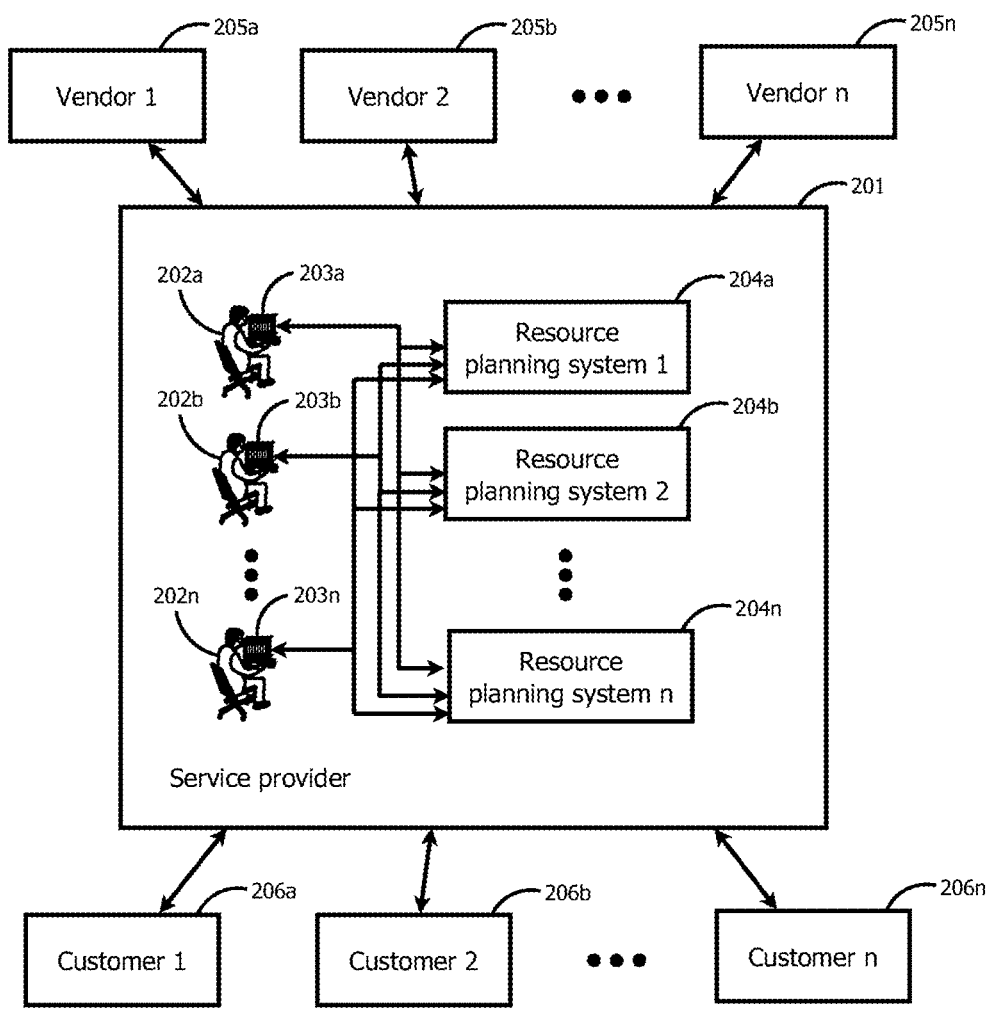
FIG. 2 is an illustrative block diagram of an embodiment of a service provider.

FIG. 2 illustrates a block diagram of a service provider 201 in accordance with an embodiment. The service provider 201 provides goods and services to customers 206. In one embodiment, the service provider 201 is an information technology (IT) service company that provides computer software, hardware, and maintenance to its customers 206. In another embodiment, the service provider 201 is a software product developer that provides the same software application to many different customers 206. In another embodiment, the service provider 201 is a custom software developer that provides different software applications, customized for specific needs, to each customer 206. In another embodiment, the service provider 201 is a web development company that provides the design and implementation of web sites to its customers 206. In another embodiment, the service provider 201 is a managed service provider (MSP) that services the computer hardware and software of its customers 206 for a fee (e.g., a fixed fee). In another embodiment, the service provider 201 is a hardware reseller that provides its customers 206 with computer hardware, installation, and setup. These embodiments are intended to be illustrative rather than limiting, and in still other embodiments, the service provider 201 provides its customers 206 with various combinations of the services described in these embodiments.

The service provider 201 employs a staff 202 to provide the services described. To support their work, the staff 202 uses one or more resource planning systems 204, accessing the resource planning systems 204 with devices 203. Devices 203 may be connected to the resource planning systems 204 either directly or through a network. In one embodiment, the resource planning systems 204 run internally at the service provider 201. In another embodiment, the resource planning systems 204 run externally, outside the service provider 201. In other embodiments, the resource planning systems 204 are a mixture of internal and external systems.

The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The service provider interacts with vendors 205, which can include one or more of hardware vendors that supply physical hardware, software vendors that supply software applications, and service vendors that supply other services. In one embodiment, a vendor 205 is also a service provider, such as the service provider 201.

The one or more servers associated with the resource planning systems 204 or service provider devices 203 do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node.

Figure 3:
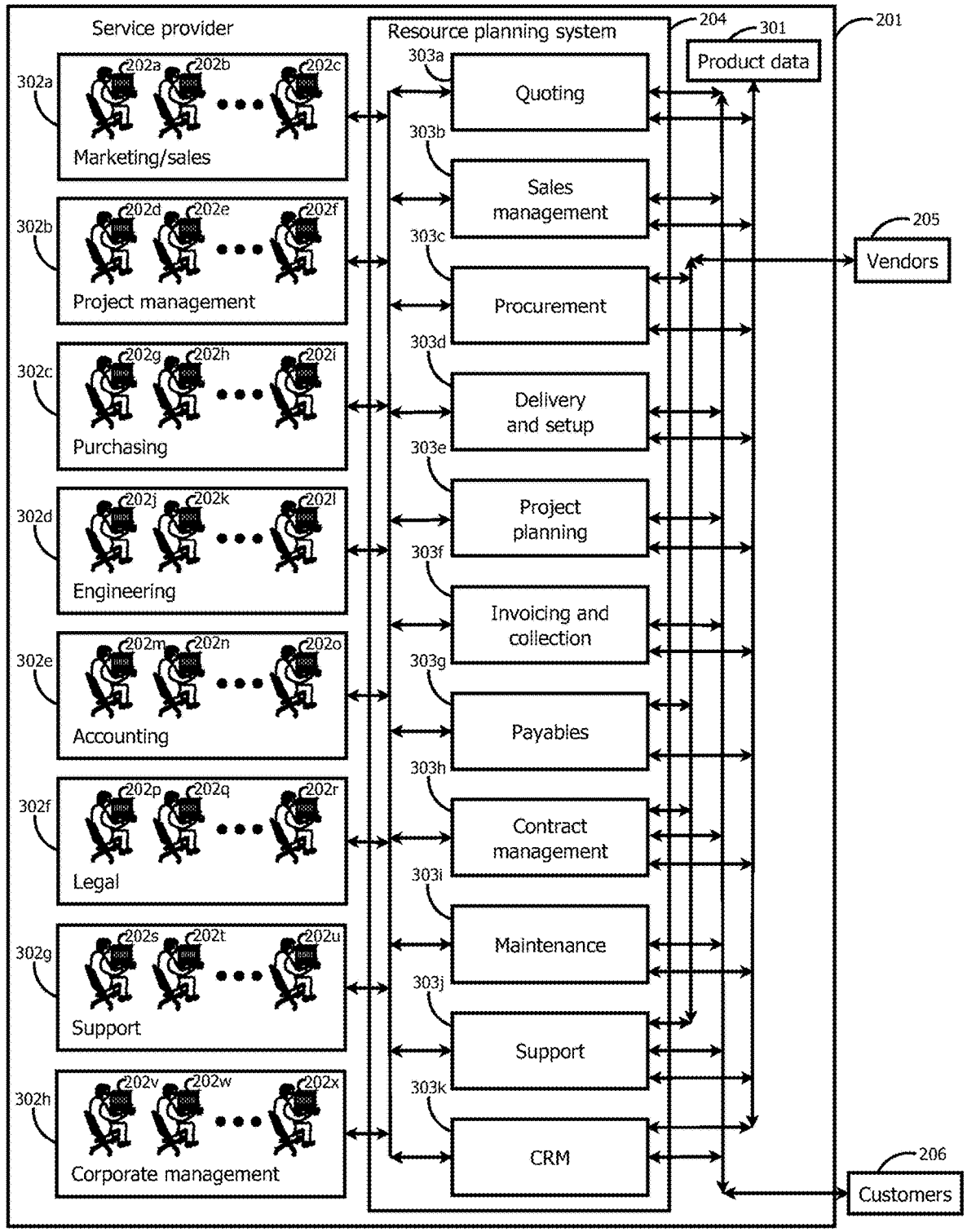
FIG. 3 is an illustrative block diagram of an embodiment of the business units and processes within a service provider.

FIG. 3 illustrates a block diagram of the business units 302 and business processes 303 within a service provider 201 in accordance with an embodiment. The staff 202 at the service provider 201 is organized into different business units 302. In one embodiment, the business units 302 can include at least one of the marketing/sales department 302a, the project management department 302b, the purchasing department 302c, the engineering department 302d, the accounting department 302e, the legal department 302f, the support department 302g, and the corporate management 302h. In some embodiments, such as smaller companies, a single staff member 202 is a member of more than one department 302. In other embodiments, there are different business units; the embodiment described is intended to be illustrative rather than limiting.

The marketing/sales department 302a is responsible for finding customers 206 and convincing the customers 206 to do business with the service provider 201. The project management department 302b is responsible for understanding the needs of customers 206 and providing detailed plans to the staff 202 to meet those needs. The purchasing department 302c is responsible for interacting with vendors 205 to procure and pay for goods and services provided by the vendors 205. The engineering department 302d is responsible for the technical operations of installing, setting up, and maintaining the goods and services provided to the customers 206. The accounting department 302e is responsible for managing all of the financial aspects of the service provider 201. The legal department 302f is responsible for agreements between the service provider 201 and customers 206, agreements between the service provider 201 and vendors 205, and any other legal issues involving the service provider 201. The support department 302g is responsible for helping customers 206 to resolve any problems they have with the goods and services that the service provider 201 provides. The corporate management 302h oversees the operation of the service provider 201 and is ultimately responsible for its success or failure.

The business units 302 use multiple business processes 303 to interact with vendors 205 and provide goods and services to customers 206. In some embodiments, these business processes 303 can include at least one of a quoting process 303a, a sales management process 303b, a procurement process 303c, a delivery and setup process 303d, a project planning process or project planning business process 303e, an invoicing and collection process 303f, a payables process 303g, a contract management process 303h, a maintenance process 303i, a support process 303j, and a customer relationship management (CRM) process 303k.

Business units 302 have the ability to interact with processes 303, and can do so from time to time. As will be seen in FIG. 4, business units 302 can have a preferred set of business processes 303 with which they interact on a more regular basis. For example, the vendors 205 can interact with the procurement process 303c, the payables process 303g, the contract management process 303h, and the support process 303j. In another example, the customers 206 can interact with the quoting process 303a, the sales management process 303b, the delivery and setup process 303d, the project planning process 303e, the invoicing and collection process 303f, the contract management process 303h, the maintenance process 303i, the support process 303j, and the CRM process 303k.

The quoting process 303a provides a quote to a customer 206 with the cost of a specific set of goods and services to be provided by the service provider 201. The sales management process 303b helps the marketing/sales department 302a to organize their activities efficiently and manage their activities with the customers 206. The procurement process 303c orders, receives, and processes goods and services from the vendors 205. The delivery and setup process 303d ensures that goods and services from the service provider 201 arrive at the customers 206 and are installed and configured properly. The project planning process 303e coordinates the resources of the service provider 201 in order to satisfy the commitments of the service provider 201 to the customers 206 efficiently and in a timely manner. The invoicing and collection process 303f delivers invoices to customers 206, notifies customers 206 when a payment is due and ensures that the customers 206 pay the service provider 201 in a timely manner. The payables process 303g facilitates the process that includes the service provider 201 paying the vendors 205 in a timely manner. The contract management process 303h can negotiate the terms of agreements between the service provider 201 and the customers 206, and can also negotiate the terms of agreements between the service provider 201 and the vendors 205. The maintenance process 303i facilitates the process that includes completing, by the service provider 201 in a timely manner, periodic tasks required by the customers 206. The support process 303*j* addresses product-related problems that the customers 206 are having, and can continue to work on those problems until they are resolved to the satisfaction of the customer 206. The CRM process 303*k* facilitates contact between the service provider 201 and customers 206 by maintaining contact information and company information, and providing convenient interfaces for using that information to initiate telephone calls, emails, text messages, letters, faxes, or other forms of communication.

The business processes 303 use the product data 301. The product data 301 is a key shared repository for data about the goods and services provided by the service provider 201. Systems and methods of the present disclosure can use product data 301 to serve as a unifying mechanism for the business processes 303, the business units 302 that use those business processes 303, and the staff 202 that are part of those business units 302.

FIG. 4 illustrates a block diagram of the relationships between the business units 302 and the business processes 303 within a service provider 201. Business units 302 can interact with business processes 303, and certain interactions may occur more frequently in normal business operations. The interactions described with respect to FIG. 4 are not intended to be limiting, but are intended to illustrate customary business practices.

Figure 4A:
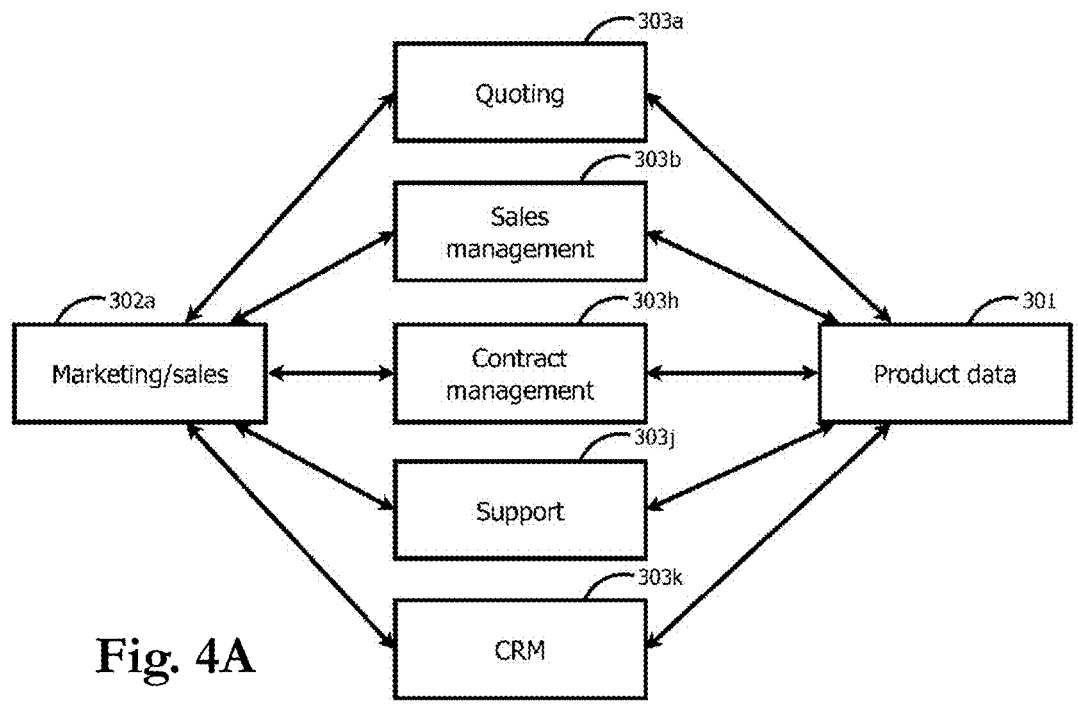
FIGS. 4A-H are illustrative block diagrams of embodiments of the relationships between the business units and the processes within a service provider.

FIG. 4*a* illustrates an exemplary interaction between the marketing/sales department 302*a* and various business processes including, e.g., at least one of the quoting process 303*a*, sales management process 303*b*, contract management process 303*h*, support process 303*j*, or CRM process 303*k*. The marketing/sales department 302*a* can drive the quoting process 303*a* by communicating with the customer 206 and arriving at an understanding of the customer's needs, then assembling the quote from goods and services in the product data 301, including the prices of those goods and services. The marketing/sales department 302*a* can interact with the sales management process 303*b* on a regular basis to find customers 306 and close orders with these customers. The marketing/sales department 302*a* can interact with the contract management process 303*h* to finalize agreements with customers 206 for products that may require ongoing service and payment. The marketing/sales department 302*a* can interact with the support process 303*j* for pre-sale support activity when, e.g., a prospective customer has a problem with a product or service and needs help from the support department 302*g*. The marketing/sales department 302*a* can use the CRM process 303*k* when the department attempts to contact a customer 206. In these interactions, the product data 301 can serve as the basis of interaction between the business processes 303, and can also serve as a common way for the marketing/sales department 302*a* to understand their interactions with those business processes.

Figure 4B:
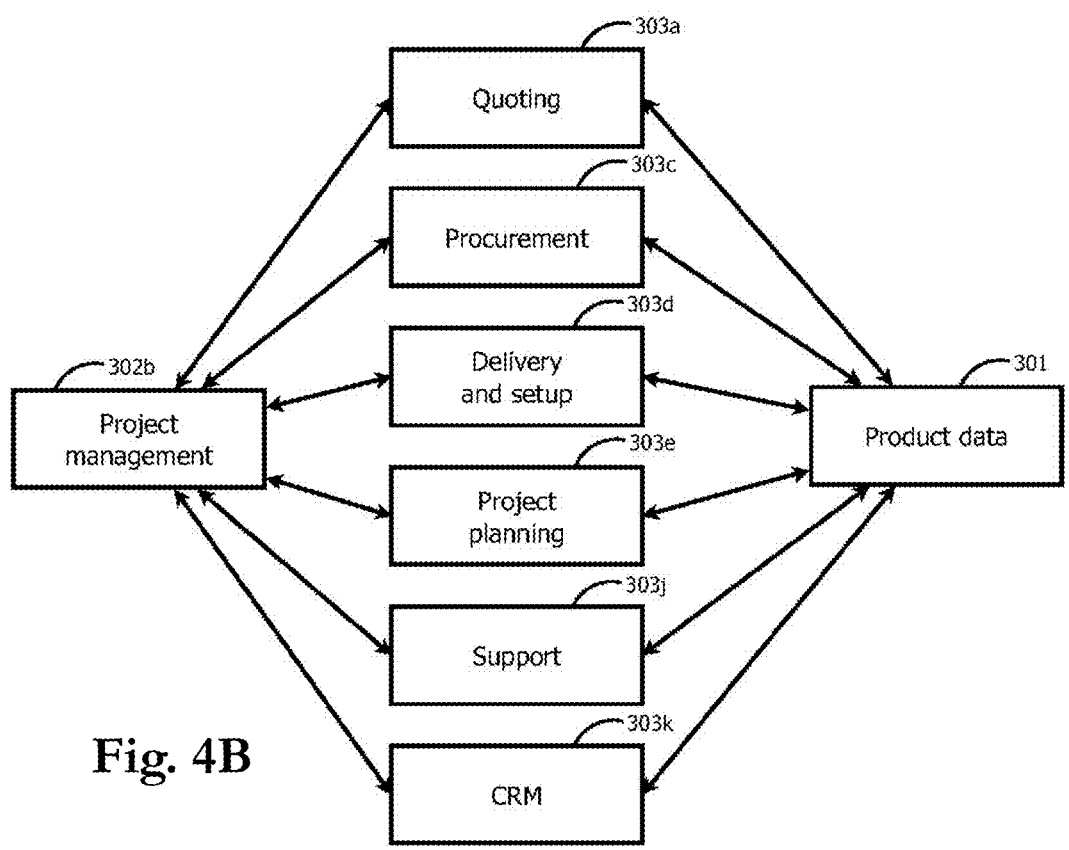

FIG. 4*b* illustrates an exemplary interaction between the project management department 302*b* and various processes including, e.g, the quoting process 303*a*, procurement process 303*c*, delivery and setup process 303*d*, project planning process 303*e*, support process 303*j*, or CRM process 303*k*. The project management department 302*b* can use the details from the quoting process 303*a* to build a project plan to deliver that quote, and can also integrate that project plan with other projects that are going on within the service provider 201. The project management department 302*b* can use the procurement process 303*c* to purchase external goods and services needed from vendors 205 in order to implement the project plan. The project management department 302*b* can use the delivery and setup process 303*d* to deliver the goods and services indicated by the project plan to the customer 206. The project management department 302*b* can interact with the support process 303*j* whenever there are unforeseen difficulties in implementing the project plan that must be resolved for the customer 206. The project management department 302*b* can use the CRM process 303*k* to contact a customer 206. In some or all of these interactions, the product data 301 can serve as the basis of interaction between the business processes 303, and can also serve as a common way for the project management department 302*b* to understand their interactions with those business processes.

Figure 4C:
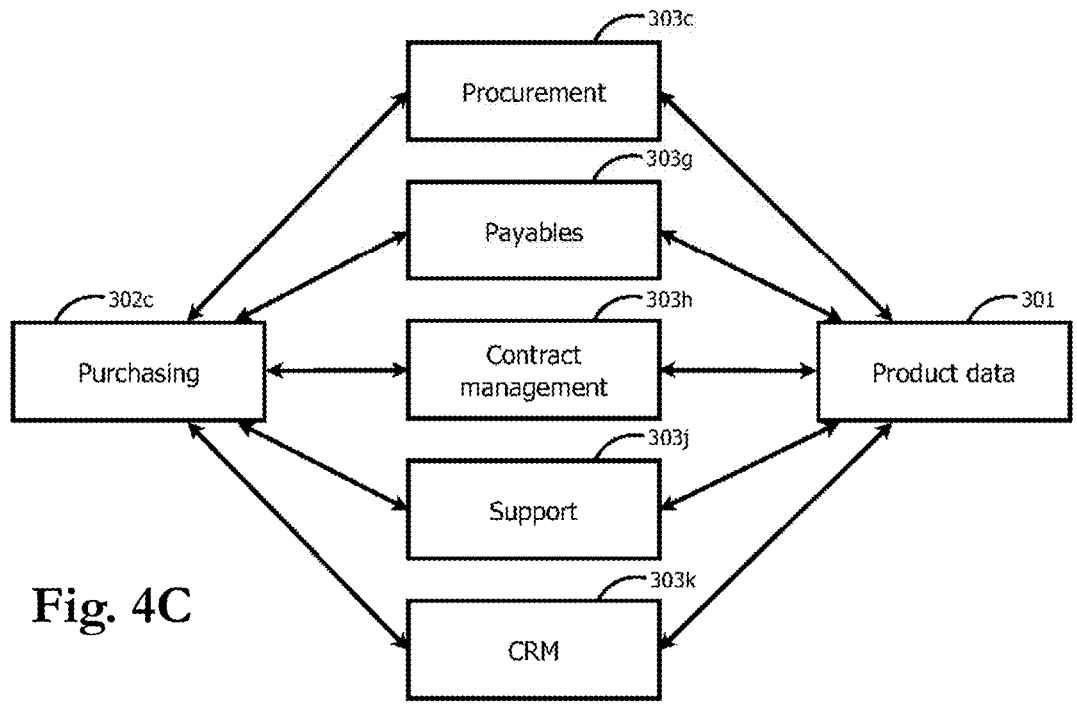

FIG. 4*c* illustrates an exemplary interaction between the purchasing department 302*c* and various business processes including, e.g., at least one of the procurement process 303*c*, payables process 303*g*, contract management process 303*h*, support process 303*j*, or CRM process 303*k*. The purchasing department 302*c* can manage the procurement process 303*c* to order goods and services from vendors 205 that are needed in order for the service provider 201 to meet its commitments to its customers 206. The purchasing department 302*c* can help to manage the payables process 303*g* to pay the vendors 205 in a timely manner and manage the cash flow of the service provider 201. The purchasing department 302*c* can interact with the contract management process 303*h* to get more favorable purchasing terms from vendors 205 by entering into longer term purchase agreements with them. The purchasing department 302*c* can also interact with the contract management process 303*h* to set up terms for services rendered by vendors 205 for the service provider 201 and its customers 206. The purchasing department 302*c* can interact with the support system 303*j* when a customer 206 has an issue concerning an interaction with a vendor 205 for which the purchasing department 302*c* is managing the relationship. The purchasing department 302*c* can use the CRM process 303*k* to contact a customer 206. In some or all of these interactions, the product data 301 can serve as the basis of interaction between the business processes 303, and can also serve as a common way for the purchasing department 302*c* to understand their interactions with those business processes.

Figure 4D:
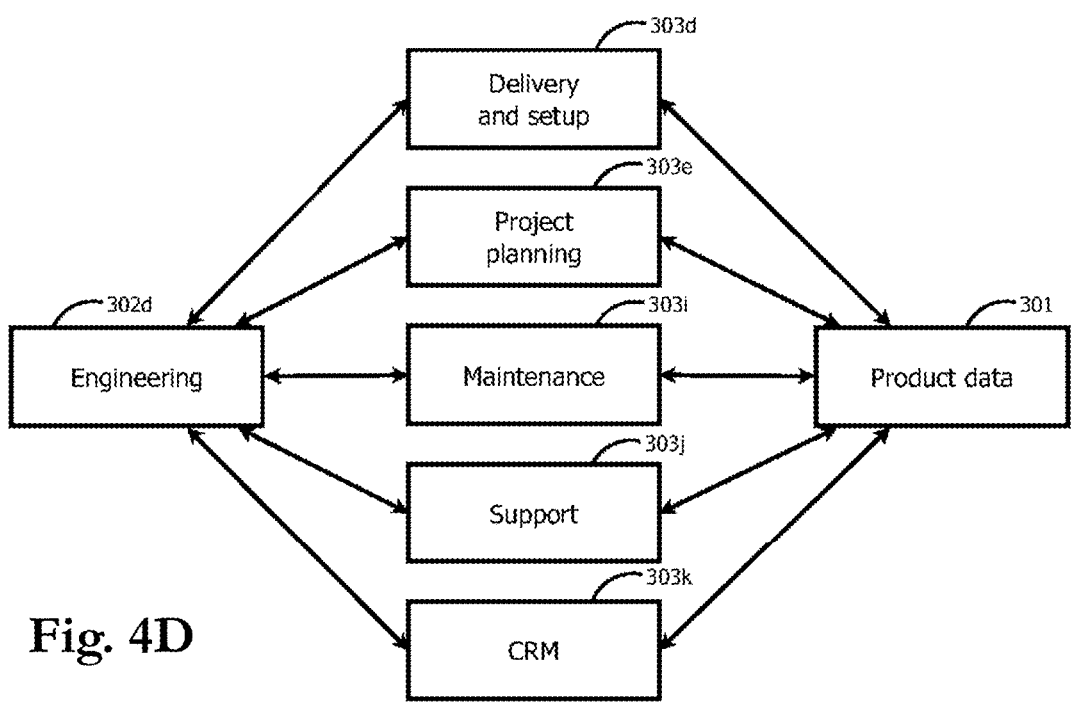

FIG. 4*d* illustrates an exemplary interaction between the engineering department 302*d* and various business processes including, e.g, at least one of the delivery and setup process 303*d*, project planning process 303*e*, maintenance process 303*i*, support process 303*j*, or CRM process 303*k*. The engineering department 302*d* can implement the setup part of the delivery and setup process 303*d* at the site of the customer 206 by implementing any installation and configuration services needed for the goods and services provided by the service provider 201 to the customer 206. The engineering department 302*d* can use the project planning process 303*e* as a source of information on the selection and timing of tasks that are required in order to implement the overall project plan. The engineering department 302*d* can implement the maintenance process 303*i* at the site of the customer 206 by implementing the periodic work agreed to by the service provider 201 and the customer 206. The engineering department 302*d* can use the support process to understand and diagnose problems encountered by customers 206, and to implement and track the solutions to those problems. The engineering department 302*d* can use the CRM process 303*k* to contact a customer 206. In some or all of these interactions, the product data 301 can serve as the basis of interaction between the business processes 303, and can also serve as a common way for the engineering department 302*d* to understand their interactions with those business processes.

Figure 4E:
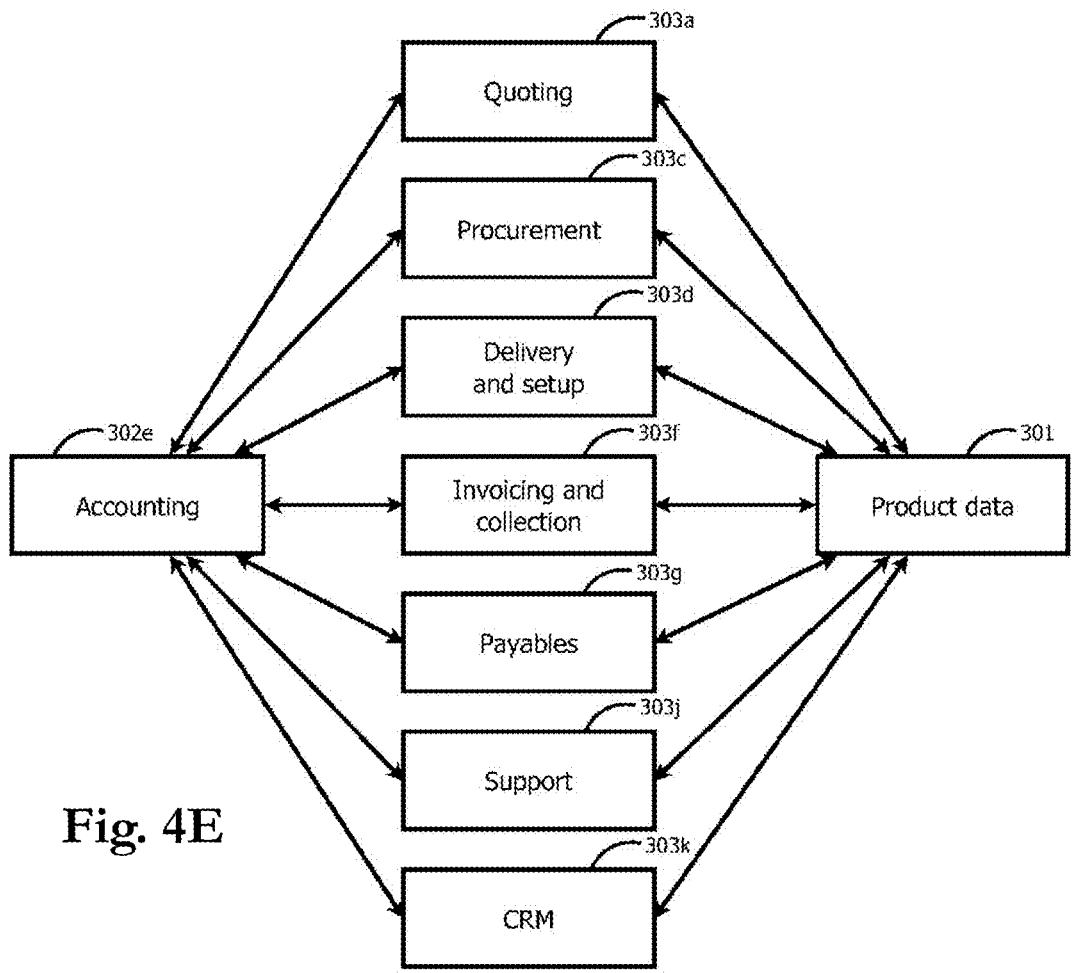

FIG. 4e illustrates an exemplary interaction between the accounting department 302e and various business processes including, e.g., at least one of the quoting process 303a, procurement process 303c, delivery and setup process 303d, invoicing and collection process 303f, payables process 303g, support process 303j, or CRM process 303k. The accounting department 302e can use the quoting process 303a as a source of information for creating an invoice to bill the customer 206. The accounting department 302e can use information from the procurement process 303c to generate forecasts of expenses to manage the cash flow of the service provider 201. The accounting department 302e can use the delivery and setup process 303d to know when deliveries take place at customers 206 in order to coordinate invoices and avoid invoicing a customer 206 for something that has not yet been delivered. The accounting department 302e can manage the invoicing and collection process 303f to deliver invoices to customers 206 and collect payments from them, and can manage the cash flow of the service provider 201. The accounting department 302e can manage the payables process 303g to pay vendors 205 in a timely manner, and can manage the cash flow of the service provider 201. The accounting department 302e can use the support process 303j to manage and track billing and invoicing issues generated by customers 206. The accounting department 302e can use the CRM process 303k to contact a customer 206. In some or all of these interactions, the product data 301 can serve as the basis of interaction between the business processes 303, and can also serve as a common way for the accounting department 302e to understand their interactions with those business processes.

Figure 4F:
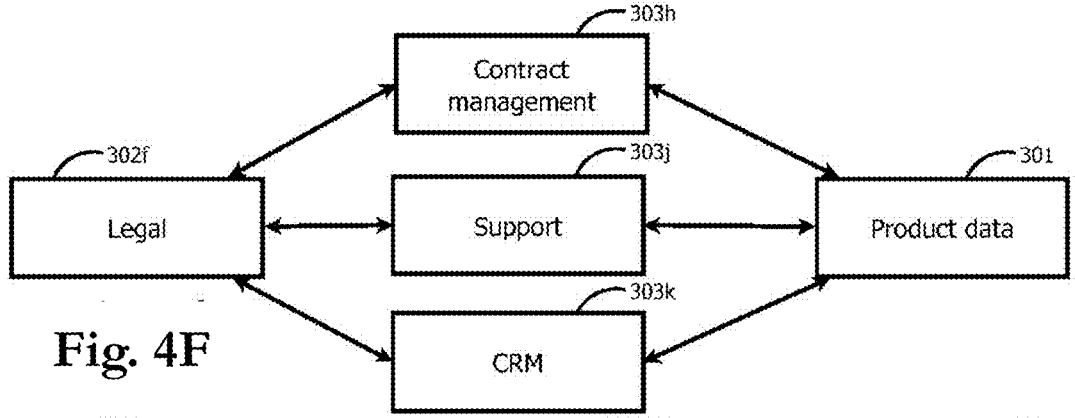

FIG. 4f illustrates an exemplary interaction between the legal department 302f and various business processes including, e.g., at least one of the contract management process 303h, support process 303j, or CRM process 303k. The legal department 302f can manage the contract management process 303h to define and negotiate the terms of any agreement into which the service provider 201 enters. The legal department can use the support process 303j to manage and track any issues generated by customers 206 that involve the terms of an agreement. The legal department 302f can use the CRM process 303k to contact a customer 206. In some or all of these interactions, the product data 301 can serve as the basis of interaction between the business processes 303, and can also serve as a common way for the legal department 302f to understand their interactions with those business processes.

Figure 4G:
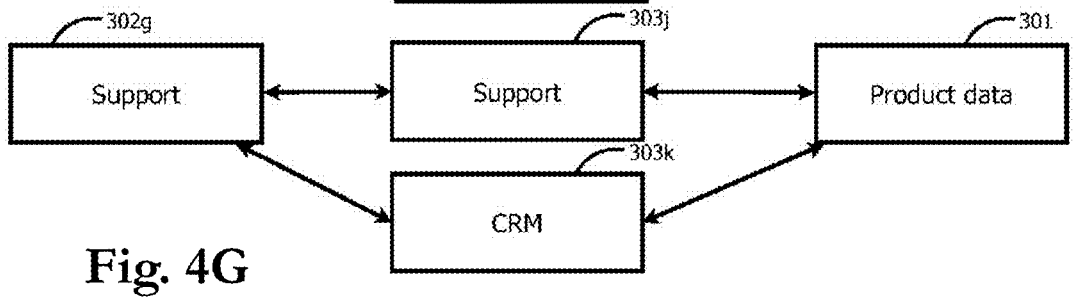

FIG. 4g illustrates an exemplary interaction between the support department 302g and various business processes including, e.g., at least one of the support process 303j or CRM process 303k. The support department 302g can manage the support process 303j and can use it to track and respond to all issues with customers 206. The support department 302g can use the CRM process 303k to contact a customer 206. In some or all of these interactions, the product data 301 can serve as the basis of interaction between the business processes 303, and can also serve as a common way for the support department 302g to understand their interactions with those business processes.

Figure 4H:
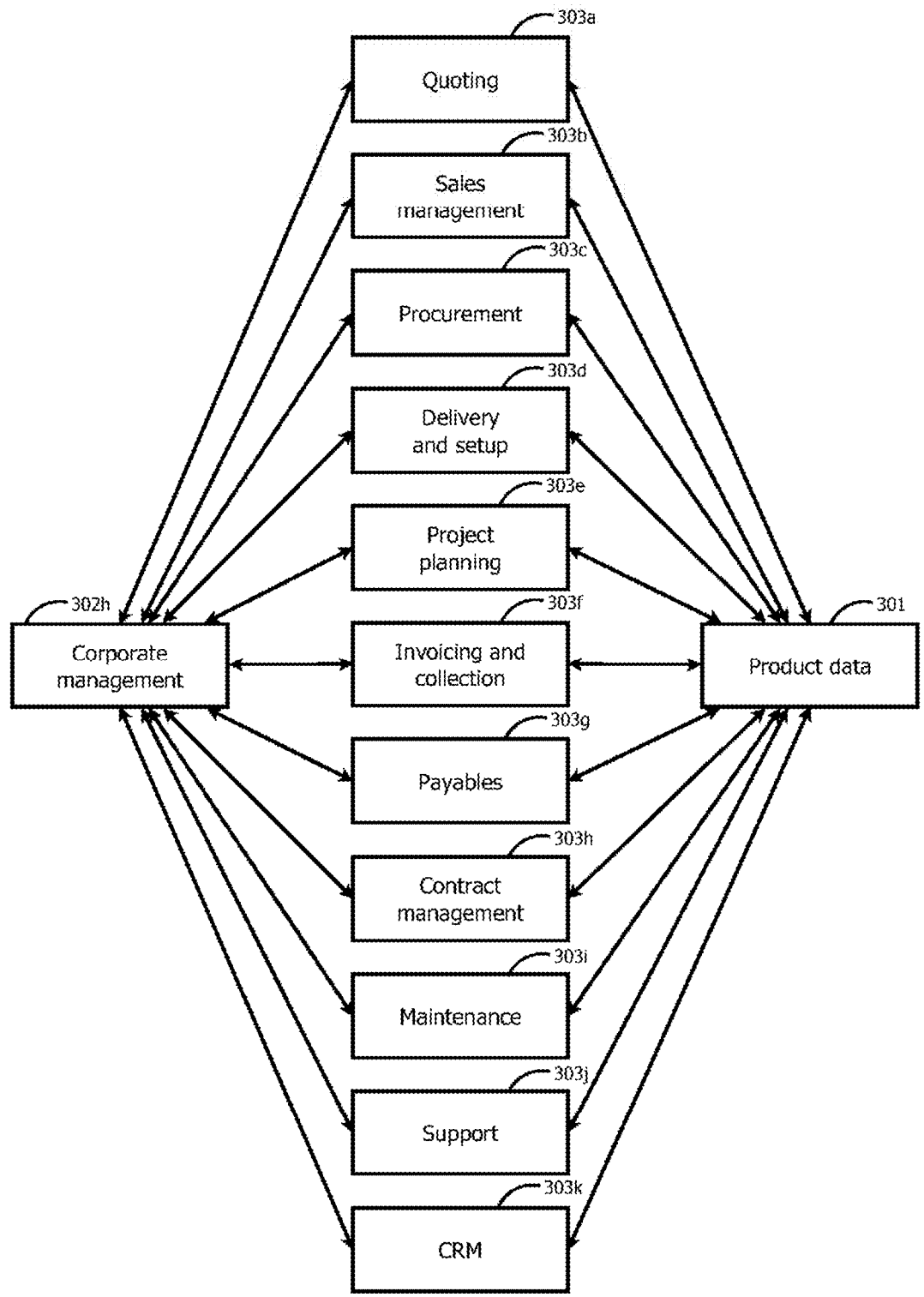

FIG. 4h illustrates an exemplary interaction between corporate management 302h and various business processes including, e.g., at least one of the business processes 303a-303k. Corporate management 302h can use information from business processes 303a-303k to track and understand the operation of the business of the service provider 201 as a whole. This can give a "360-degree view" of the business and can be valuable in making decisions about how to run the business. Again, the product data 301 can serve as the basis of interaction between the business processes 303, which can facilitate oversight provided by corporate management 302h with respect to the status of processes 303 and to understand the implications of same.

Figure 5:
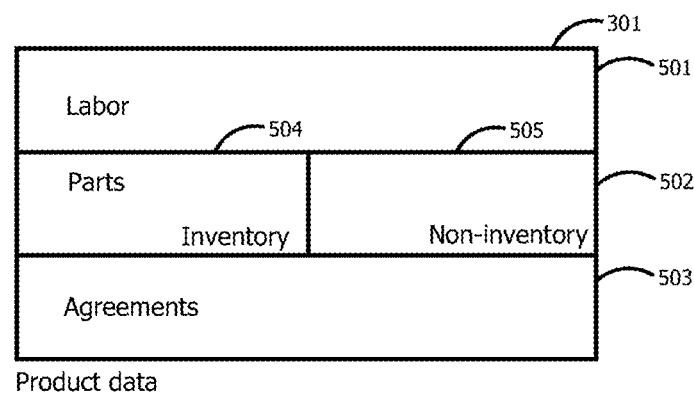
FIG. 5 is an illustrative block diagram of an embodiment of product data.

FIG. 5 illustrates a block diagram of product data 301. In this example, there are three different classes of product data 301. For example, one class of product data 301 can be labor 501, which describes products that are services. Services-oriented products can include one-time actions that are taken by a person. For example, labor 501 can include the action of setting up the initial configuration for a piece of equipment. Another example of labor 501 can include the action of installing a software update onto a computer. Yet another example of labor 501 can include the action of replacing a part in a network router that is broken in order to restore its function. Labor products 501 can be invoiced at a fixed rate, based on the work that is done, or at an hourly rate, based on the amount of time spent doing the work.

A second class of product data 301 is parts 502, which describes products that are purchased entities delivered to the customer 206. For example, parts 502 can include a new piece of equipment that is installed for the customer 206. Another example of parts 502 can include a replacement part for a network router that is broken. In some embodiments, parts 502 can also include non-physical entities such as a software license for a commercial third party software application that is installed for the customer 206. In another example, parts 502 can include an extended warranty from a manufacturer covering repair and updates for a longer period of time than the standard warranty. Parts products 502 can be invoiced at the cost to the service provider 201 plus a markup.

In some embodiments, parts products can include a plurality of subclasses. For example, parts products can include two sub-classes, inventory parts 504 and non-inventory parts 505. Inventory parts 504 can be parts 502 that the service provider 201 orders ahead of time and keeps in stock, which can make it convenient and quick to deliver the inventory parts 505 to a customer 206. Non-inventory parts 505 can be parts 502 that the service provider orders from a vendor 205 on an as-needed basis. The vendor 205 can delivers the parts 502 directly to the customer 206. The vendor 205 can also deliver the parts 502 to the service provider 201, who can then deliver them to the customer 206. Inventory parts 504 can be invoiced with a larger markup than non-inventory parts 505, because the service provider may need to pay the inventory and carrying costs associated with the inventory parts 504.

In some embodiments, product data 301 can include a third class for agreements 503, which describes products that are repeated or periodic services. Repeated or periodic services can refer to actions taken by a person on a regular basis, and can be covered by service agreements that are entered into between the service provider 201 and the customer 206. Examples of agreements 503 can include agreements to periodically clean a piece of equipment at the site of the customer 206; install updates for a commercial third party software application as they are released; and provide a network routing solution to meet a written specification, and continually update the network to meet the written specification as the environment changes. Agreements products 503 are can be invoiced at a fixed fee for a given time period, such as monthly or yearly.

Figure 6:
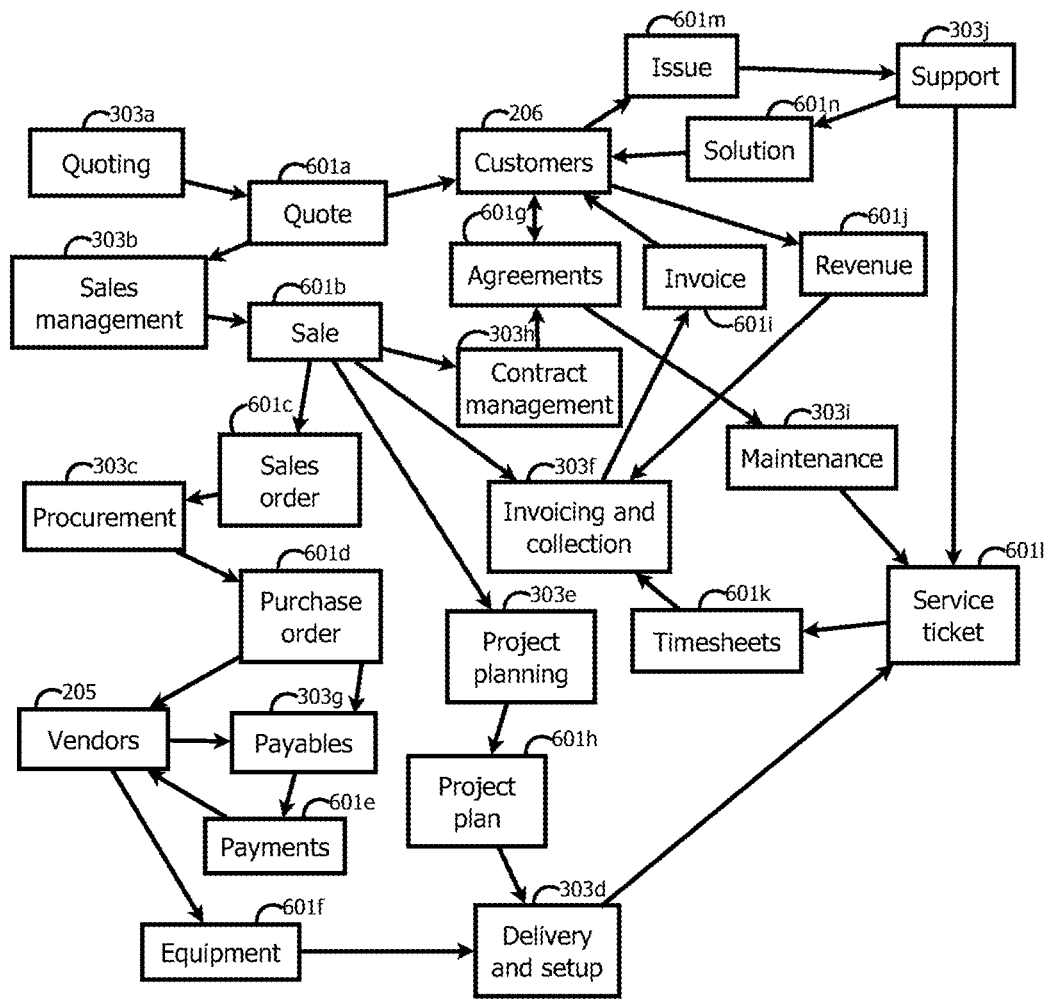
FIG. 6 is an illustrative block diagram of an embodiment of the data flow within a service provider.

FIG. 6 illustrates a block diagram of using the product data 301 to unify communications between the various business processes 303. FIG. 6 illustrates a number of different forms of intermediate data 601 between the business processes 301, but in every case the intermediate data 601 is made up of products from the product data 301, as will be described in further detail here. In this way, the product data 301 serves as a common source of information for both the business processes 301 and the intermediate data 601 that is used to transfer information between them. FIG. 6 is not intended to be limiting, but is instead intended to illustrate many of the aspects of the flow of information inside a service provider 201. Other embodiments of a service provider 201 have elements of data flow that are not shown in FIG. 6.

In some embodiments, the marketing/sales department 302*a* can commence the process by using the quoting business process 303*a* to create a quote 601*a* from the product data 301. In other embodiments, different departments or processes can commence the flow. The quote 601*a* can include a list of products designed to address the needs of a customer 206. This list can include a plurality of classes of products such as labor products 501, parts products 502, and agreements products 503. For example, a customer 206 that needs an email server may get a quote 601*a* that includes the hardware for the server, which is a parts product 502, the one-time setup for that server, which is a labor product 501, and the ongoing maintenance for that server, which is an agreements product 503. The quote 601*a* includes prices for all of the products in the list, so that the customer 206 knows in advance the total price for what is being bought, and exactly what that price includes.

The sales management business process 303*b* now has the responsibility of selling the products to the customer 206. The marketing/sales department follows a series of steps for working with the customer 206. The steps can reference the list of products in the quote 601*a*. In some embodiments, the sale is complete when the customer 206 agrees with every element of the quote 601*a*. At that time, the sale has been closed and the quote 601*a* is converted to a sale 601*b*. The sale 601*b* is a different form of information, but it is a list of the products that the customer 206 has agreed to purchase, so it is created from the quote by using the same product data 301 that the quote refers to. This is an example of how the product data 301 serves as a common source of information for both the quoting business process 303*a* and the sales management business process 303*b*.

Once the sale 601*b* is finalized, the list of products in it is copied, transferred, or otherwise conveyed to several places. For example, the list of parts products 501 in the sale 601*b* can be copied to a sales order 601*c*. The sales order 601*c* is a list of the parts products 501 that need to be ordered in order to deliver the quote 601*a*. The sales order goes to the procurement business process 303*c*, which is responsible for procuring the parts products 501 that are listed in the sales order. Since the sales order 601*c* is created from a list of products from the product data 301, this is an example of how the product data 301 serves as a common source of information for both the sales management business process 303*b* and the procurement business process 303*c*.

The list of agreements products in the sale 601*b* is used by the contract management business process 303*h*. Each agreements product in the sale 601*b* is used to generate an agreement 601*g*. The agreement is created from information in the product data 301 about the product in the list of products in the sale 601*b*, so this is an example of how the product data 301 serves as a common source of information for both the sales management business process 303*b* and the contract management business process 303*h*. The contract management business process 303*h* is responsible for negotiating the terms of the agreements 601*g* with the customer 206, and updating the agreements 601*g* with the results of the negotiation.

The list of all products in the sale 601*b* is used by the invoicing and collection business process 303*f*. Each product in the sale 601*b* is copied into the invoicing system, which is used to create invoices 601*i* to be sent to the customer 206. The invoices 601*i* are created from information such as pricing in the product data 301 for the list of products in the sale 601*b*, so this is an example of how the product data 301 serves as a common source of information for both the sales management business process 303*b* and the invoicing and collections business process 303*f*. The invoices 601*i* are not actually sent to the customer 206 until the products listed on them have actually been delivered; this is described later more fully.

The list of labor products 501 in the sale 601*b* is used by the project planning business process 303*e*. The project planning business process 303*e* creates a project plan 601*h*, which is a list of tasks needed to deliver the quote 601*a*. Each labor product 501 listed in the sale 601*b* is copied into one task, and the product data 301 provides information such as the expected length of time for the task. The project planning business process 303*e* assigns the tasks to appropriate staff 202 within the service provider 201 based on the nature of the tasks, and schedules the tasks based on the availability of the staff 202. The result is the completed project plan 601*h*. The tasks in the project plan 601*h* are created using information from the product data 301 about the labor products 501 in the sale 601*b*, so this is an example of how the product data 301 serves as a common source of information for both the sales management business process 303*b* and the project planning business process 303*e*.

The list of products in the sales order 601*c* is used by the procurement business process 303*c* to create purchase orders 601*d*. A purchase order 601*d* is a list of products to be procured from one vendor 205. Each product in the sales order 601*c* that is procured from the same vendor 205 is copied into the purchase order 601*d* for that vendor 205. The purchase order 601*d* is then sent to the vendor 205 and is also used by the payables business process 303*g*. The purchase orders 601*d* are created using the vendor information in the product data 301, so this is an example of how the product data 301 serves as a common source of information for both the procurement business process 303*c* and the payables business process 303*g*.

The list of products in the purchase order 601*d* is used by the payables business process 303*g* to create payments 601*e* to be sent to the vendors 205. The payables business process 303*g* monitors the deliveries of equipment 601*f* from the vendors 205 and coordinates the payments 601*e* to correspond to the delivery times and terms agreed upon with the vendors 205. The payments 601*e* are created and scheduled using vendor information and payment terms in the product data 301, so this is another example of how the product data 301 serves as a common source of information for both the procurement business process 303*c* and the payables business process 303*g*.

The project plan 601*h* is used by the delivery and setup business process 303*d* to schedule the delivery of equipment 601*f* to the customer 206 as well as the use of staff 202 to set up the equipment 601*f* once it has been delivered. Each task in the project plan 601*h* is copied into a service ticket 601*l*, and the service tickets are used by the staff 202 to properly organize their time so that the setup of the equipment 601*f* is done in a timely and efficient manner. The service tickets 601*l* are created using information about the time and expense taken from the product data 301 for the labor products 501 in the tasks in the project plan 601$h$, so this is an example of how the product data 301 serves as a common source of information for both the project planning business process 303$e$ and the delivery and setup business process 303$d$.

The staff 202 addressing the service tickets 601$l$ creates timesheets 601$k$ for the work they are doing. Information from the service ticket 601$l$ that is completed is copied into the timesheet entry for that ticket, and the timesheet goes to the invoicing and billing business process to be included in the invoice 601$i$ that is sent to the customer 206. This closes the loop that was described previously where a labor product 501 entered the invoicing and collection business process 303$f$ from the sale 601$b$; the arrival of the same labor product 501 from a timesheet 601$k$ indicates that the labor product 501 has been delivered to the customer and can now be included in an invoice 601$i$ that is sent to the customer. Since the same labor product 501 is used from the product data 301, this is an example of how the product data 301 serves as a common source of information for the sales management business process 303$b$, the invoicing and collection business process 303$f$, and the delivery and setup business process 303$d$.

The agreements 601$g$ are used by the maintenance business process 303$i$ to schedule and deliver the ongoing tasks required to meet the terms of the agreements 601$g$. The terms of the agreements 601$g$ in the products in the agreements are copied into service tickets 601$l$, and the service tickets are used by the staff 202 to properly organize their time so that the periodic maintenance tasks are done in a timely and efficient manner. The service tickets 601$l$ are created using information about the scheduling, time, and expense taken from the product data 301 for the agreements products 503 in the agreements 601$g$, so this is an example of how the product data 301 serves as a common source of information for both the contract management business process 303$h$ and the maintenance business process 303$i$.

The service tickets 601$l$ created by the maintenance business process 303$i$ can be handled in essentially the same way as previously described for service tickets 601$l$ created by the delivery and setup business process 303$d$. In much the same way, this is an example of how the product data 301 serves as a common source of information for the sales management business process 303$b$, the invoicing and collection business process 303$f$, and the maintenance business process 303$i$.

The customers 206 have ongoing issues 601$m$ with the goods and services delivered by the service provider 201. The support business process 303$j$ takes these issues 601$m$ in a triage process and creates a service ticket 601$l$ for each ticket. Since each issue is in reference to a particular product, the support process copies information from the product data 301 into the service ticket 601$l$. The service tickets are then used by staff 202 to prioritize and organize time and effort efficiently to arrive at solutions 601$n$ for the issues, which are delivered to the customers 206. The product information in the service tickets 601$l$ is integral in understanding, diagnosing, and solving the issues 601$m$, so this is an example of how the product data 301 serves as a common source of information for the support business process 303$j$ and every other business process 301, since any other business process 301 can be involved in solving customer issues 601$m$ at some point in time.

The service tickets 601$l$ created by the support business process 303$j$ are handled in essentially the same way as previously described for service tickets 601$l$ created by the delivery and setup business process 303$d$. In much the same way, this is an example of how the product data 301 serves as a common source of information for the sales management business process 303$b$, the invoicing and collection business process 303$f$, and the support business process 303$j$.

The logical end of the overall flow is reached when the customer 206 delivers revenue 601$j$ to the service provider 201 in response to receiving an invoice 601$i$. The revenue 601$i$ goes to the invoicing and collection business process 303$f$, which matches the revenue against the invoices 601$i$ that have been delivered to the customer 206 and closes the outstanding billing. In this final step, the revenue 601$j$ can be matched to the product items in the invoice 601$i$ that is being paid, so this is an example of how the product data 301 serves as a common source of information for the invoicing and collection business process 303$f$ to manage the financial relationship with the customer 206.

Figure 7A:
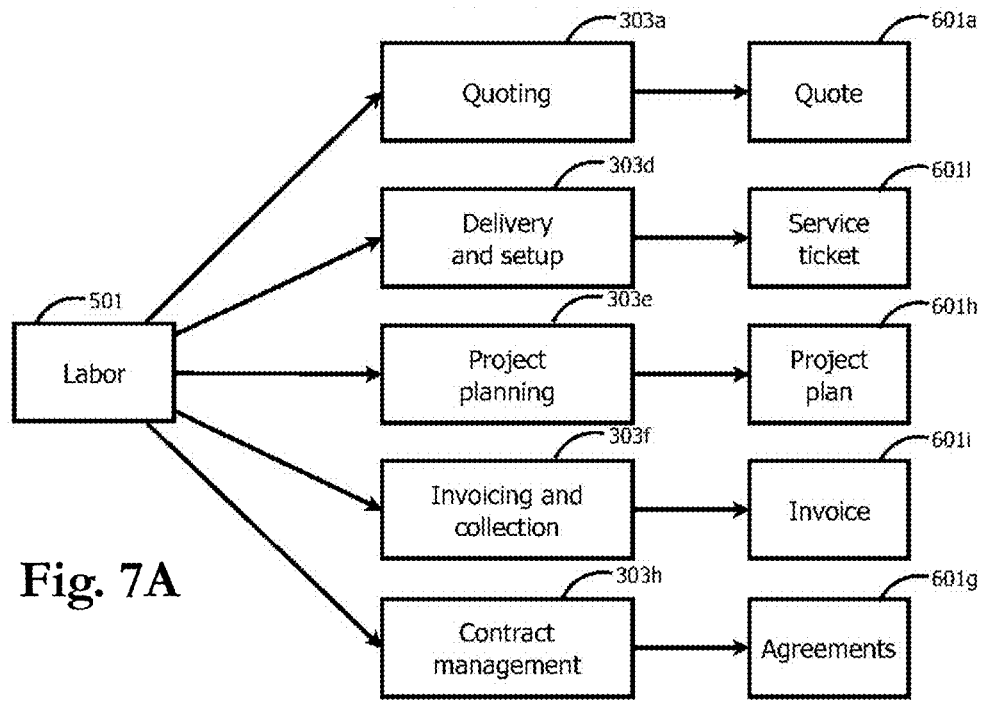
FIGS. 7A-C are illustrative block diagrams of embodiments of the flow of information from product data to the business processes within a service provider.

FIG. 7 illustrates a block diagram of the way in which the product class affects how information from the product data 301 is copied to the business processes 303 in the system. The product class is the entity that divides the product data 301 into labor products 501, which are detailed in FIG. 7$a$, parts products 502, which are detailed in FIG. 7$b$, and agreements products 503, which are detailed in FIG. 7$c$.

FIG. 7$a$ illustrates the way in which information from labor products 501 is copied to the business processes 303 in the system. In particular, information from labor products 501 is copied to the quoting business process 303$a$, delivery and setup business process 303$d$, project planning business process 303$e$, invoicing and collection business process 303$f$, and contract management business process 303$h$.

The quoting business process 303$a$ creates a quote 601$a$ in which every line item is a product from the product data 301. The line item uses information from the labor product data 501 to fill in, among other things, the description, part number, hourly rate, fixed fee, technician skill level, estimated time, and arbitrary notes for the product.

The delivery and setup business process 303$d$ creates service tickets 601$l$ for each task that is required in order to complete the delivery and setup. Each service ticket uses information from the labor product data 501 to fill in, among other things, the description, estimated time, customer name, customer contact information, and arbitrary notes for the ticket.

The project planning business process 303$e$ creates a project plan 601$h$ in which every task corresponds to a product from the product data 301. The task uses information from the labor product data 501 to fill in, among other things, the description, budgeted time, billing type, resource type (skill level) required, and arbitrary notes for the task.

The invoicing and collection business process 303$f$ creates an invoice 601$i$ in which every line item is a product from the product data 301. The line item uses information from the labor product 501 to fill in, among other things, the description, part number, hourly rate, fixed fee, billing method, and arbitrary notes for the product.

The contract management business process 303$h$ creates agreements 601$g$ when a labor product 501 is delivered by an outside vendor 205 rather than a staff member 202 of the service provider 201. In this case, the contract management must set up an agreement 601$g$ with the vendor 205 specifying the terms for the delivery of the labor product 501. The agreement 601$g$ uses information from the labor product 501 to fill in, among other things, the name, description, hourly rate, fixed fee, billing method, estimated time, vendor name, and arbitrary notes for the product.

Figure 7B:
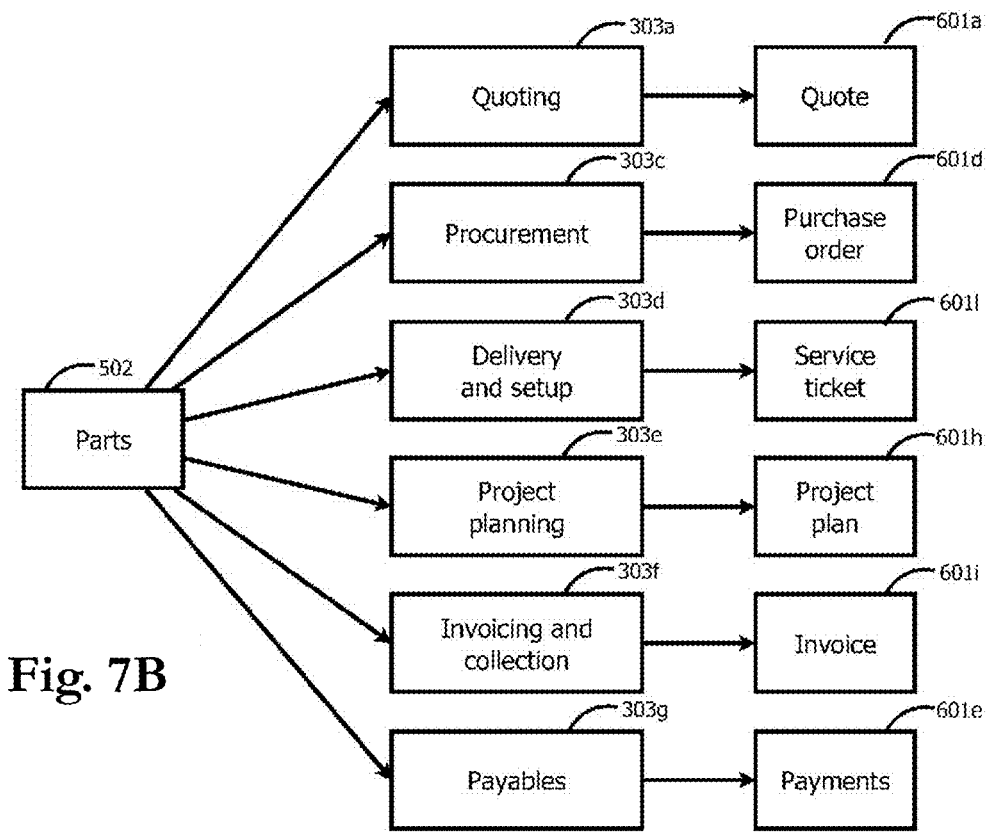

FIG. 7b illustrates the way in which information from parts products 502 is copied to the business processes 303 in the system. In particular, information from parts products 502 is copied to the quoting business process 303a, procurement business process 303c, delivery and setup business process 303d, project planning business process 303e, invoicing and collection business process 303f, and payables business process 303g.

The quoting business process 303a creates a quote 601a in which every line item is a product from the product data 301. The line item uses information from the parts product data 502 to fill in, among other things, the description, part number, packaging, price, pricing modifiers, image, arbitrary notes, and sourcing information for the product.

The procurement business process 303c creates a purchase order 601d in which every line item is a product from the product data 301. The line item uses information from the parts product data 502 to fill in, among other things, the product ID, description, quantity, price, customer site, packaging, pricing modifiers, and arbitrary notes for the product.

The delivery and setup business process 303d creates service tickets 601i for each task that is required in order to install and configure the parts product 502. Each service ticket uses information from the parts product data 502 to fill in, among other things, the description, estimated time, customer name, customer contact information, and arbitrary notes for the ticket.

The project planning business process 303e creates a project plan 601h in which every task corresponds to a product from the product data 301. The tasks corresponding to parts product data 502 are the tasks for installing and configuring those parts products 502. The tasks use information from the parts product data 502 to fill in, among other things, the description, budgeted time, billing type, resource type (skill level) required, and arbitrary notes for the task.

The invoicing and collection business process 303f creates an invoice 601i in which every line item is a product from the product data 301. The line item uses information from the parts product 501 to fill in, among other things, the description, part number, packaging, price, pricing modifiers, image, arbitrary notes, and sourcing information for the product.

The payables business process 303g creates payments 601e for products that are ordered from vendors 205. The payments correspond to a series of parts products, and the payments use information from the parts product data 502 to fill in, among other things, the description, price, part number, and arbitrary notes for the product.

Figure 7C:
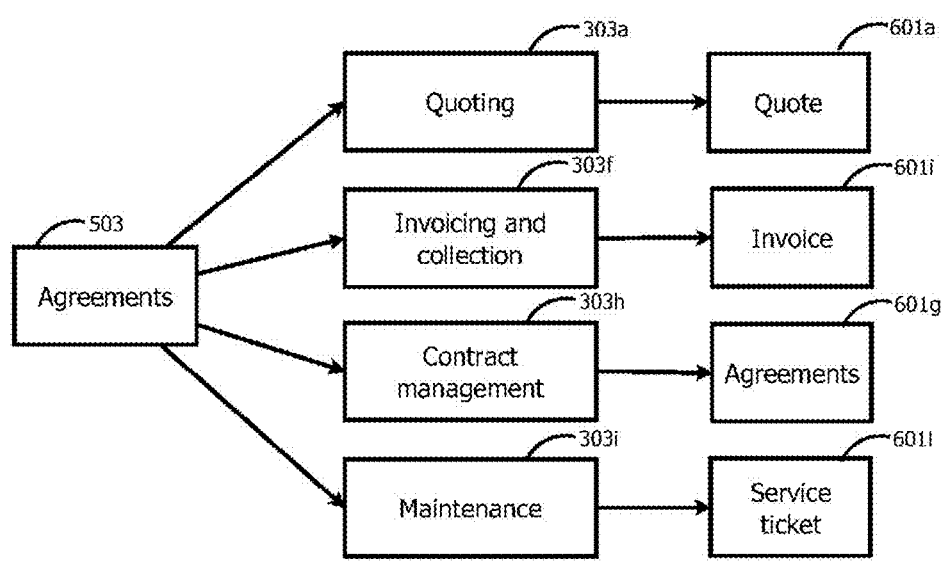

FIG. 7c illustrates the way in which information from agreements products 503 is copied to the business processes 303 in the system. In particular, information from agreements products 503 is copied to the quoting business process 303a, invoicing and collection business process 303f, contract management business process 303h, and maintenance business process 303i.

The quoting business process 303a creates a quote 601a in which every line item is a product from the product data 301. The line item uses information from the agreements product data 503 to fill in, among other things, the name, description, hourly rate, fixed fee, billing method, estimated time, vendor name, and arbitrary notes for the product.

The invoicing and collection business process 303f creates an invoice 601i in which every line item is a product from the product data 301. The line item uses information from the agreements product 503 to fill in, among other things, the name, description, hourly rate, fixed fee, billing method, estimated time, vendor name, and arbitrary notes for the product.

The contract management business process 303h creates agreements 601g to fulfill the obligations required by the agreements products 503. The contract management sets up an agreement 601g with the customer 206 specifying the terms for the delivery of the agreements product 503. The agreement 601g uses information from the labor product 501 to fill in, among other things, the name, description, hourly rate, fixed fee, billing method, estimated time, vendor name, and arbitrary notes for the product.

The maintenance business process 303d creates service tickets 601l for each task that is required in order to complete the periodic maintenance task. Each service ticket uses information from the agreement product data 503 to fill in, among other things, the description, hourly rate, fixed fee, billing method, estimated time, scheduling information, customer name, customer contact information, and arbitrary notes for the ticket.

Figure 8:
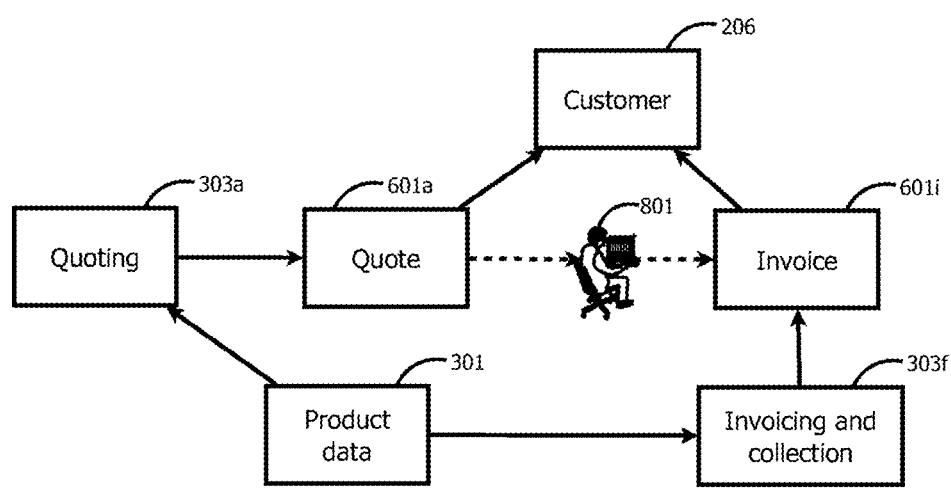
FIG. 8 is an illustrative block diagram of an embodiment of reliable synchronization of the quote and invoice seen by a customer.

FIG. 8 illustrates a block diagram of reliable synchronization of the quote 601a and invoice 601i seen by the customer 206. After the quoting business process 303a prepares the quote 601a, the quote 601a is sent to the customer 206. The customer may interact with the quote 601a and may even change it. After this, many business processes 303 interact with the quote 601a and are driven by it. Eventually, sometimes much later, one end result of the sale is the invoicing and collection business process 303f, which prepares the invoice 601i to be sent to the customer 206. This is a very important process to the service provider 201, because it is the mechanism by which the business makes money. In some systems not described by the present disclosure, the invoice 601i is created by a person 801 using a manual process that involves referring to the quote 601a. Preparing the invoice 601i this way has a substantial risk of introducing errors, including simple typographical errors, transcription errors, referring to the wrong copy of a quote, and so on. Unfortunately, the consequences of a customer 206 seeing a mismatch between the quote 601a and the invoice 601i are very negative. The customer 206 is not sure what amount to pay, which delays the payment. The customer 206 may interpret the mismatch as hidden charges or over-billing. The customer is likely to lose faith in the service provider 201 as a result of this relatively minor error.

The present disclosure completely avoids the unfortunate situation described. Since both the quote 601a and the invoice 601i are derived from the same list of products from the product data 301, and the same product list is used by both the quoting process 303a and the invoicing and collection process 601i, the quote 601a and the invoice 601i seen by the customer 206 always match exactly. In this way, the customer knows well in advance what payment is expected, so the payment is handled smoothly. The customer feels that the service provider 201 is in control and professional.

Figure 9:
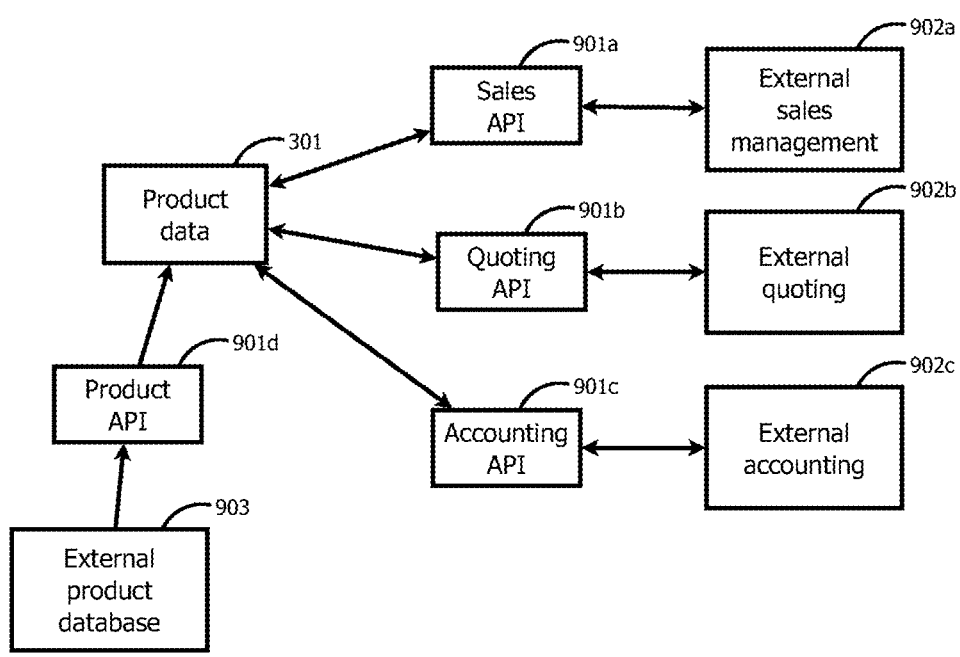
FIG. 9 is an illustrative block diagram of an embodiment of interfaces between product data and external systems.

FIG. 9 illustrates a block diagram of interfaces between product data 301 and external systems 902-903. The service provider 201 may use external systems for some business processes. For example, the service provider 201 may use an external system when the service provider 201 previously chose a system for one business process long before deciding to use a resource planning system 204, and does not want to train employees to work with a different system. In another embodiment, the service provider 201 previously chose or can choose a system for one or more business process based on special needs that require the features of that system. In another embodiment, the service provider 201 previously chose or can choose a system for one business process based on requirements imposed by a customer 206 or a vendor 205. FIG. 9 illustrates an embodiment where the sales management process is implemented using an external sales management system 902a such as the system provided by Salesforce.com of San Francisco, Calif., USA. FIG. 9 illustrates an embodiment where the quoting process is implemented using an external quoting system 902b such as the system provided by Quosal LLC of Bothell, Wash., USA. FIG. 9 illustrates an embodiment where the invoicing and collection process and the payables process is implemented using an external accounting system 902c such as the QuickBooks system provided by Intuit, Inc. of Mountain View, Calif., USA. For each of these external systems, the resource planning system 204 provides an application programming interface (API) 901 that communicates information both ways between the product data 301 and the external system 902. The API 901 uses a well defined interface defined by the supplier of the external system 902, and is greatly simplified by the fact that it only needs to correctly interface to a single product data source 301 in order to work with the rest of the resource planning system 204. In this way, a sales API 901a is provided to interface the product data 301 with the external sales management system 902a, a quoting API 901b is provided to interface the product data 301 with the external quoting system 902b, and an accounting API 901c is provided to interface the product data 301 with the external accounting system 902c.

In some embodiments, external interfaces can facilitate the use of external sources of product data. For example, external interfaces can facilitate importing standard product data from an external product database 903, such as the product database provided by Etilize, Inc. of Denver, Colo., USA. The external product database 903 may include thousands of commercially available products. To use this external product database 903, the resource planning system 204 provides a product API 901d that communicates information from the external product database 903 to the product data 301. The API 901d uses a well defined interface defined by the supplier of the external product database 903, and is greatly simplified by the fact that it only needs to correctly interface to a single product data source 301 in order to work with the rest of the resource planning system 204.

Figure 10:
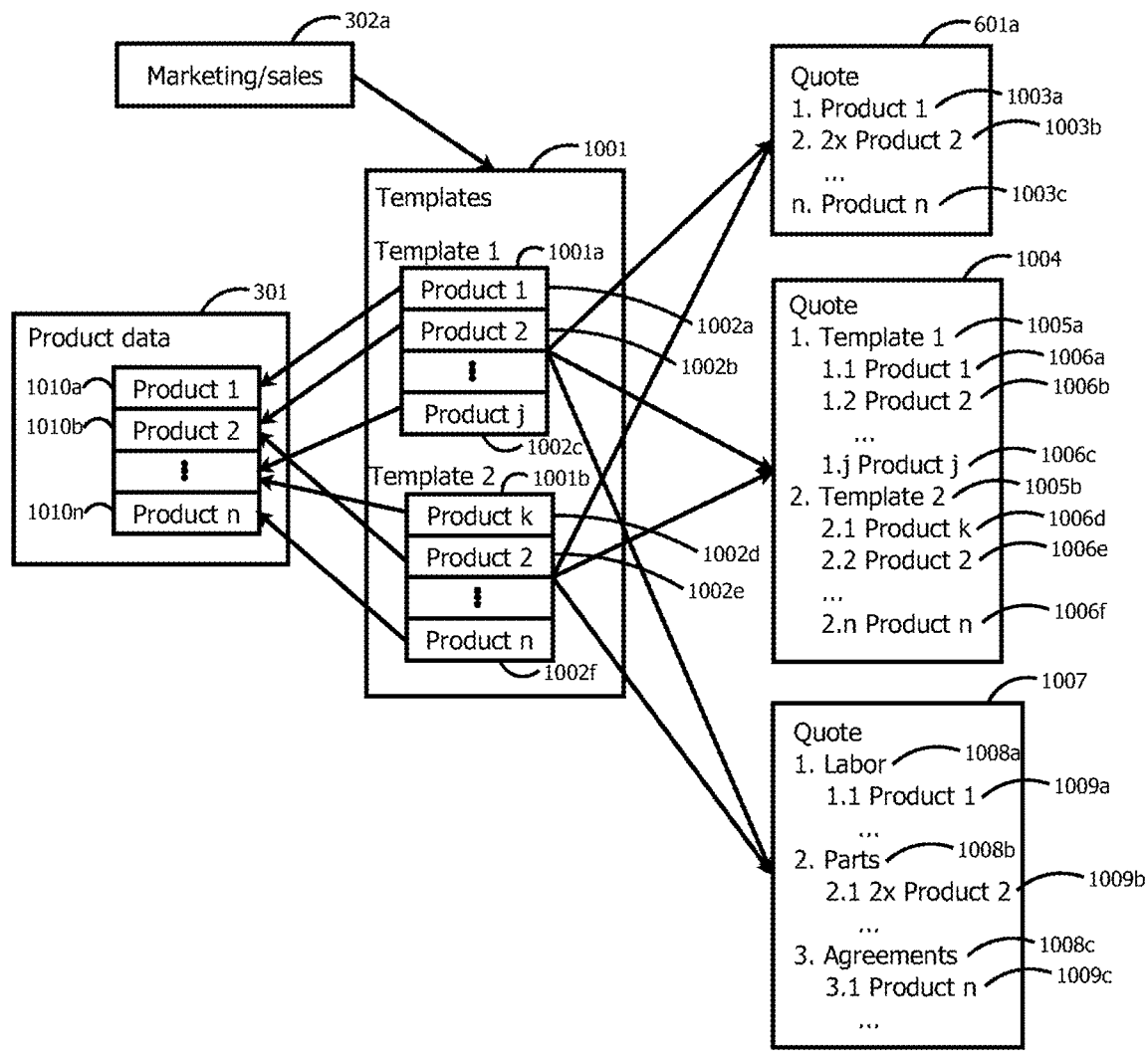
FIG. 10 is an illustrative block diagram of an embodiment of templates for product data.

FIG. 10 illustrates a block diagram of templates 1001 for product data 301. When the marketing/sales department 302a prepares a quote 601a for a customer, there is often a need to add to the quote 601a a collection of products that are commonly grouped together. In one embodiment, a quote for a small business setup includes a server, a router, a firewall/VPN, operating system software for the server, VPN software for the employees of the business, software installation, network installation, and monitoring and maintenance for the server. The service provider 201 wants to ensure that all of these products are included in the quote with the right configuration and pricing, but it is inefficient and error prone to require that all of the sales staff knows this product configuration, especially since it will change from time to time. To address this issue, the resource planning system 204 provides templates 1001 that are used to manage groups of products.

A list of templates 1001 is available for generating quotes 601a. In one embodiment, template 1 1001a contains product references to product 1 1002a through product j 1002c, and template 2 1001b contains product references to product k 1002d through product n 1002f, as well as a reference to product 2 1002e. Each of the product references 1002 in the templates 1001 is a pointer to the actual product information 1010 in the product data 301, so that when the product data 301 is updated, the templates 1001 are automatically updated as well. When template 1 1001a and template 2 1001b are both added to a quote 601a, the quote 601a lists line items 1003 for product 1 1003a through product n 1003c. The line item 1003b for product 2 indicates a quantity of 2, because one was generated by reference 1002b in template 1 1001a, and the other was generated by reference 1002e in template 2 1001b.

Since the quote 601a is generated automatically from the product data 301, it is simple for the marketing/sales department to generate the quote in different formats for the convenience of the customer. In one embodiment, the quote 601a is organized as a simple list of the products. In a second embodiment, the quote 1004 is organized by the templates 1005 used to make the quote, with the products 1006 listed within the templates. In a third embodiment, the quote 1007 is organized by the product classes labor 1008a, parts 1008b, and agreements 1008c, and the products are listed in each class 1008 as described previously, as labor products 1009a, parts products 1009b, and agreements products 1009c.

In this way, templates 1001 allow the sales/marketing department 302a to provide a quote 601a to a customer that contains commonly offered combinations of products, without requiring the sales/marketing department 302a to have detailed knowledge of the exact combination of products used in those commonly offered combinations.

Figure 11:
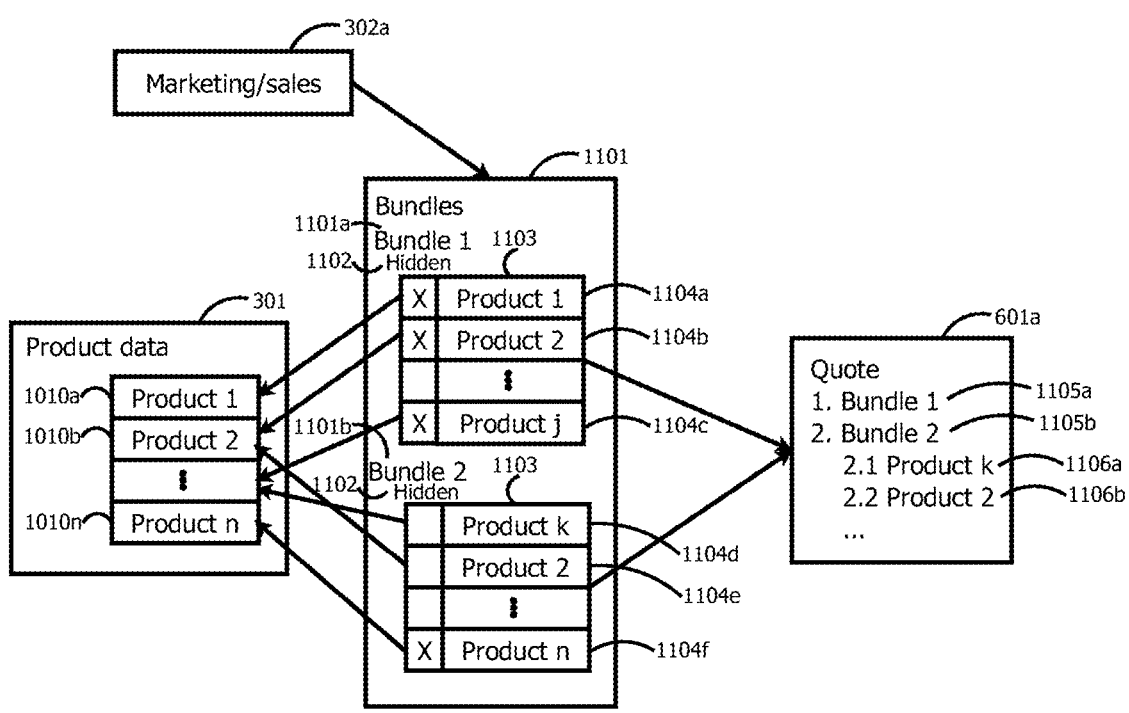
FIG. 11 is an illustrative block diagram of an embodiment of bundles for product data.

FIG. 11 illustrates a block diagram of bundles 1101 for product data 301. When the marketing/sales department 302a prepares a quote 601a for a customer, it may add to the quote 601a a product that is provided by the service provider 201, but is internally divided into a number of components. In one embodiment, the service provider 201 provides a product that is a small business server, but internally the product is made up of the server hardware, the operating system software license, the labor to install and configure the server, and the agreement for maintaining the server. In some embodiments, the resource planning system 204 provides bundles 1101 that are used to manage products that are made up of a number of components. The bundles 1101 can hide details from the customer, simplify the quote to make it more readable, or disguise details of the server hardware to discourage the customer 206 from looking for another source for the hardware.

A list of bundles 1101 is available for generating quotes 601a. In one embodiment, bundle 1 1101a contains product references to product 1 1104a through product j 1104c, and bundle 2 1101b contains product references to product k 1104d through product n 1104f, as well as a reference to product 2 1104e. Each of the product references 1104 in the bundles 1101 is a pointer to the actual product information 1010 in the product data 301, so that when the product data 301 is updated, the bundles 1101 are automatically updated as well. Each product reference 1104 in a bundle 1101 contains both the product reference itself 1103, and an indicator 1102 as to whether or not the product reference should be hidden. In FIG. 11, all of the product references 1104a-1104c in bundle 1 1101a are hidden, and only the product reference 1104f to product n in bundle 2 1101b is hidden.

When bundle 1 1101a and bundle 2 1101b are both added to a quote 601a, the quote 601a lists one line item 1105a for bundle 1, and a line item 1105b for bundle 2 that is broken down into line items 1106 for all of the product references 1104 in bundle 2 1101b except for product n 1104f, which is marked as hidden.

In this way, bundles 1101 allow the service provider 201 to provide its own products that are made up of component products, and also provide the ability to hide the details of those products where it is advantageous for the operation of the business.

In some embodiments, the system can determine to hide one or more details based on a user identifier (e.g., username, biometric information, pin number) associated with a user of the system, such as a customer or other entity using the system. For example, the system may include a list of users that are authorized to view certain data, and compare the user identifier of the user with the list to determine whether the user is authorized to view such data. In some embodiments, the system may prompt the user for a password prior to making the determination. Upon determining that the user is not authorized to view certain data (e.g., price or product details), the system may omit or otherwise censor the data such that the data is effectively hidden from the user. In some embodiments, the user can request access to the hidden data. The system can forward the request to a system manager or operator, who may grant or deny the request.

Figure 12:
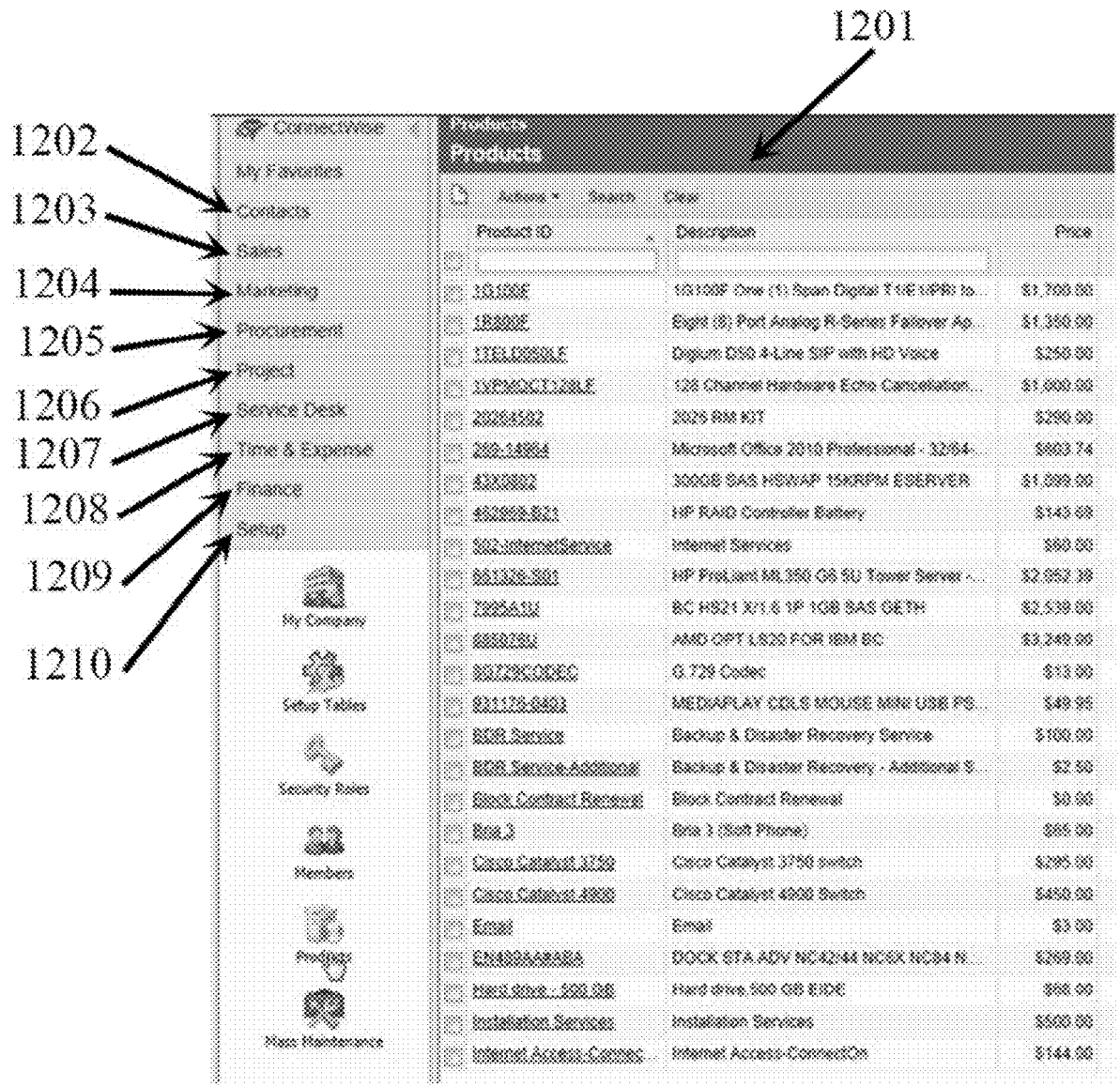
FIG. 12 is an illustrative example of an embodiment of a user interface for overall access to a resource planning system.

FIG. 12 illustrates an embodiment of a user interface, provided by the resource planning system 204, for overall access. The main display 1201 shows a view of the product data 301. The navigation display has tabs to select different main displays for contacts 1202, sales 1203, marketing 1204, procurement 1205, project 1206, service desk 1207, time and expense 1208, finance 1209, and setup 1210.

Figure 13:
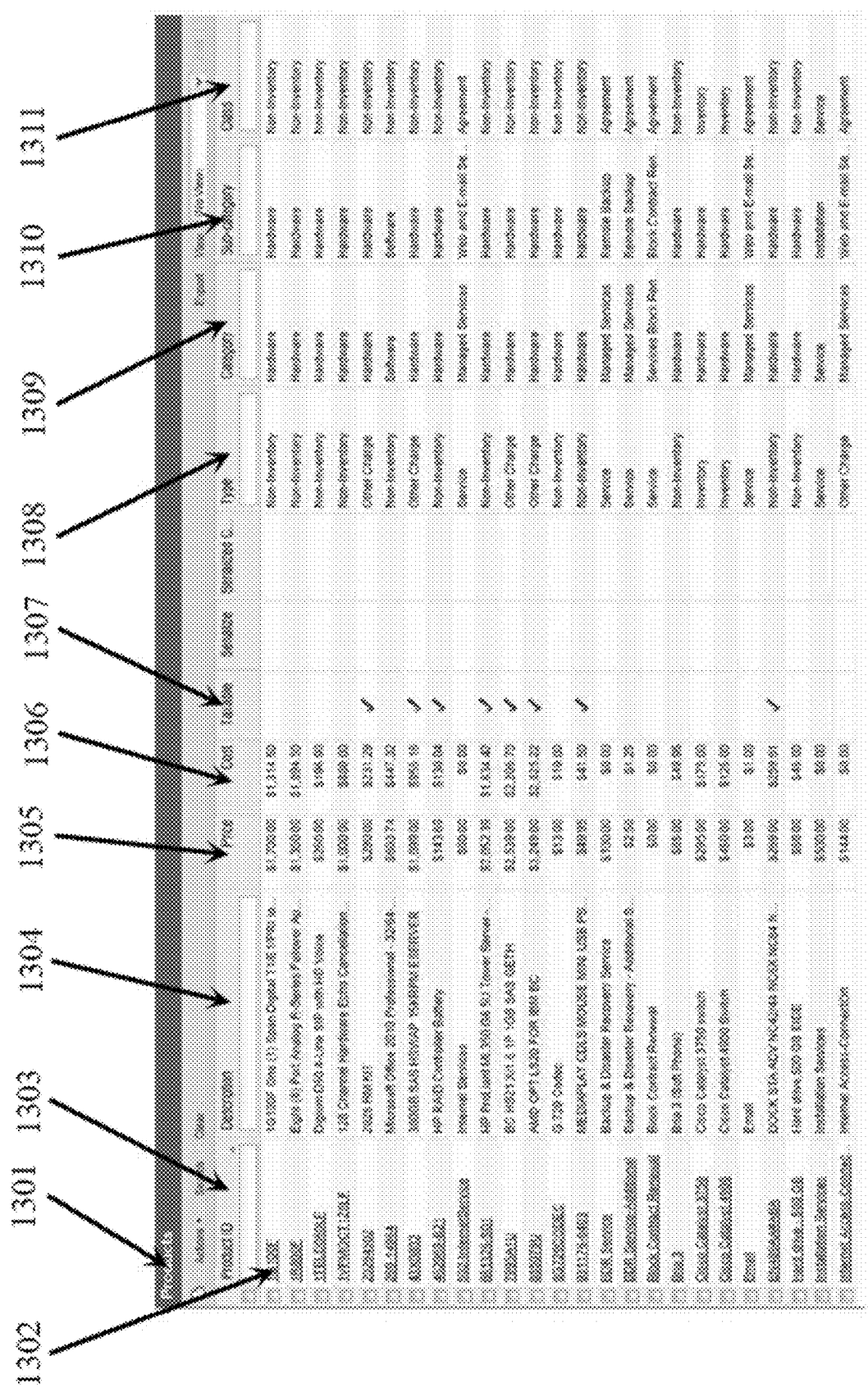
FIG. 13 is an illustrative example of an embodiment of a user interface for displaying and modifying product data.

FIG. 13 illustrates an embodiment of a user interface, provided by the resource planning system 204, for displaying and modifying product data. The display 1301 shows a list of the product data, with a single line for each product 1302. The columns 1303-1311 display information about each product. Column 1303 displays the product ID. Column 1304 displays the description of the product. Column 1305 displays the price of the product to the customer 206. Column 1306 displays the cost of the product from the vendor 205. Column 1307 displays whether or not the product is taxable. Column 1308 displays the type of the product, column 1309 displays the category of the product. and column 1310 displays the sub-category of the product. Together, the type, category, and sub-category of the product displayed by columns 1308-1310 affect the way the product is treated by the rest of the resource planning system 204. Column 1311 displays the class of the product as described previously with respect to FIG. 5.

Figure 14:
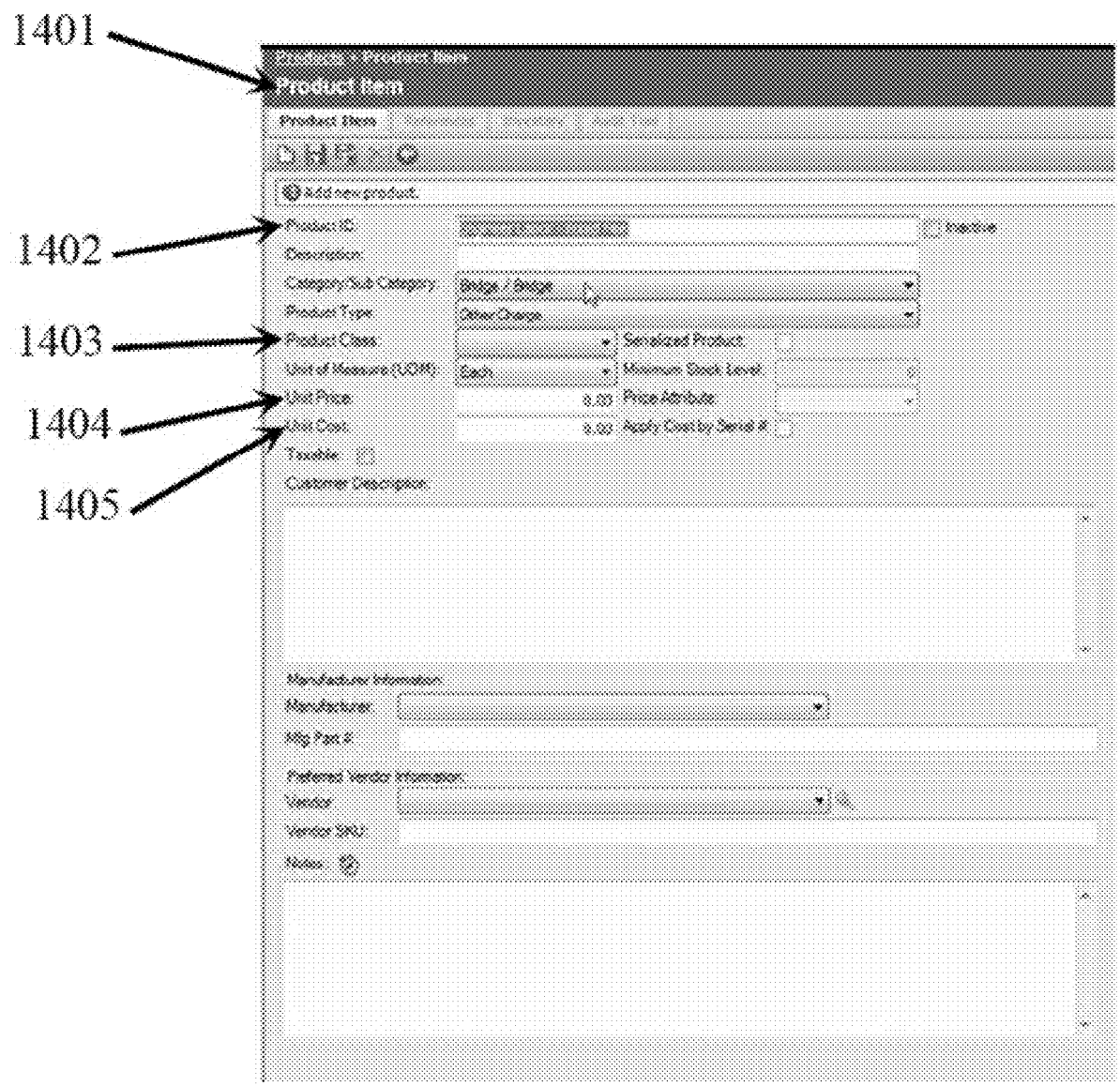
FIG. 14 is an illustrative example of an embodiment of a user interface for displaying and modifying a single item of product data.

FIG. 14 illustrates an embodiment of a user interface, provided by the resource planning system 204, for displaying and modifying a single item of product data. The display 1401 is shown by selecting one of the products 1302 in the display 1301 described previously with respect to FIG. 13. Entry 1402 allows the product ID, which is displayed in column 1303 in FIG. 13, to be modified. Entry 1403 allows the product class, which is displayed in column 1311 in FIG. 13, to be modified. Entry 1404 allows the product price, which is displayed in column 1305 in FIG. 13, to be modified. Entry 1405 allows the product cost, which is displayed in column 1306 in FIG. 13, to be modified.

Figure 15:
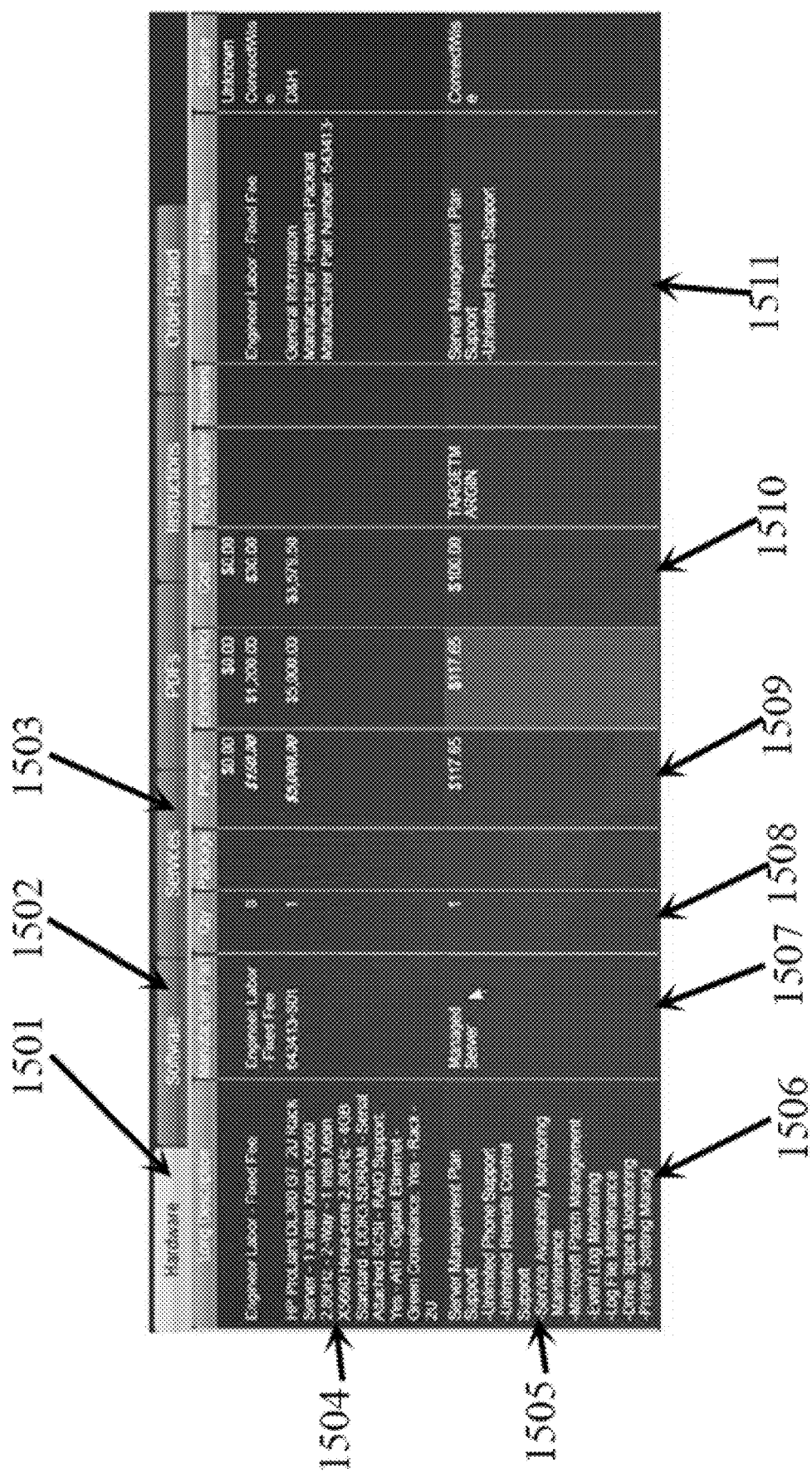
FIG. 15 is an illustrative example of an embodiment of a user interface for displaying and modifying a quote for a customer.

FIG. 15 illustrates an embodiment of a user interface, provided by the resource planning system 204, for displaying and modifying a quote for a customer. The display has tabs across the top allowing selection of different components of the quote. Tab 1501 selects the hardware component of the quote. Tab 1502 selects the software component of the quote. Tab 1503 selects the services component of the quote. When a product is added to the quote, the product type, product category, product sub-category, and product class displayed in columns 1308-1311 of FIG. 13 determine the component of the quote to which the product belongs. Every product that is added to the quote adds a row to the quote. In one embodiment, the quote has two hardware products, which appear in row 1504 and row 1505 in the hardware section 1501 of the quote. Each row has columns 1506-1511 that describe the product in the row. Column 1506 displays the long description of the product. Column 1507 displays the manufacturer's part number for the product. Column 1508 displays the number of products that are in the quote. Column 1509 displays the unit price of the product, and column 1510 displays the total price for the product in the quote. Column 1511 displays any notes relevant to the product in the quote.

Figure 16:
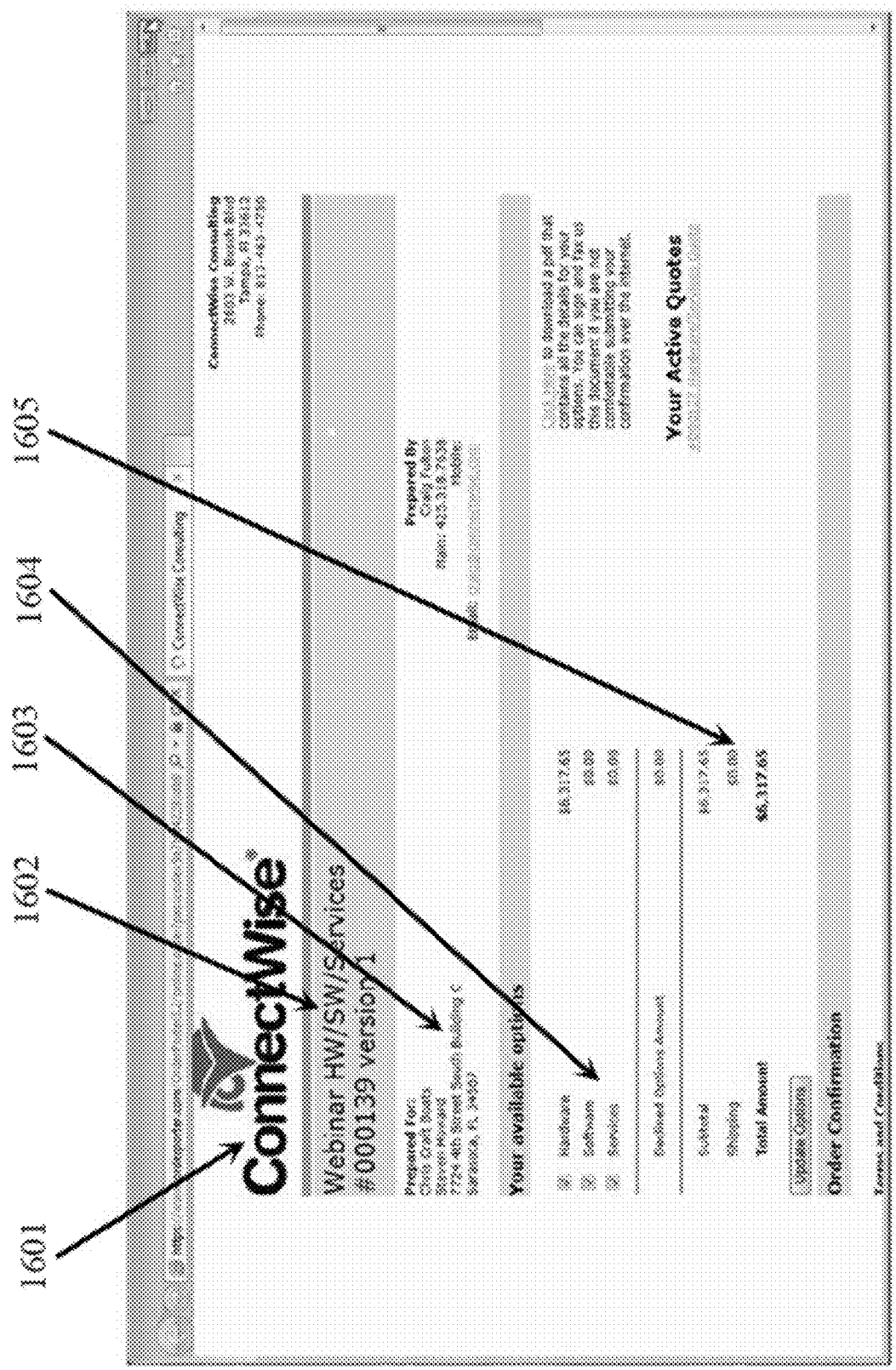
FIG. 16 is an illustrative example of an embodiment of a quote for a customer.

FIG. 16 illustrates an embodiment of a printable quote to be sent to a customer 206. The quote is customized with the name and logo 1601 of the service provider 201. The quote includes a name and other identifying information 1602. The quote includes the customer information 1603. The quote includes summary totals 1604 of the price being quoted for different classes of products. The quote also includes a total price 1605 for easy reference by the customer 206.

Figure 17:
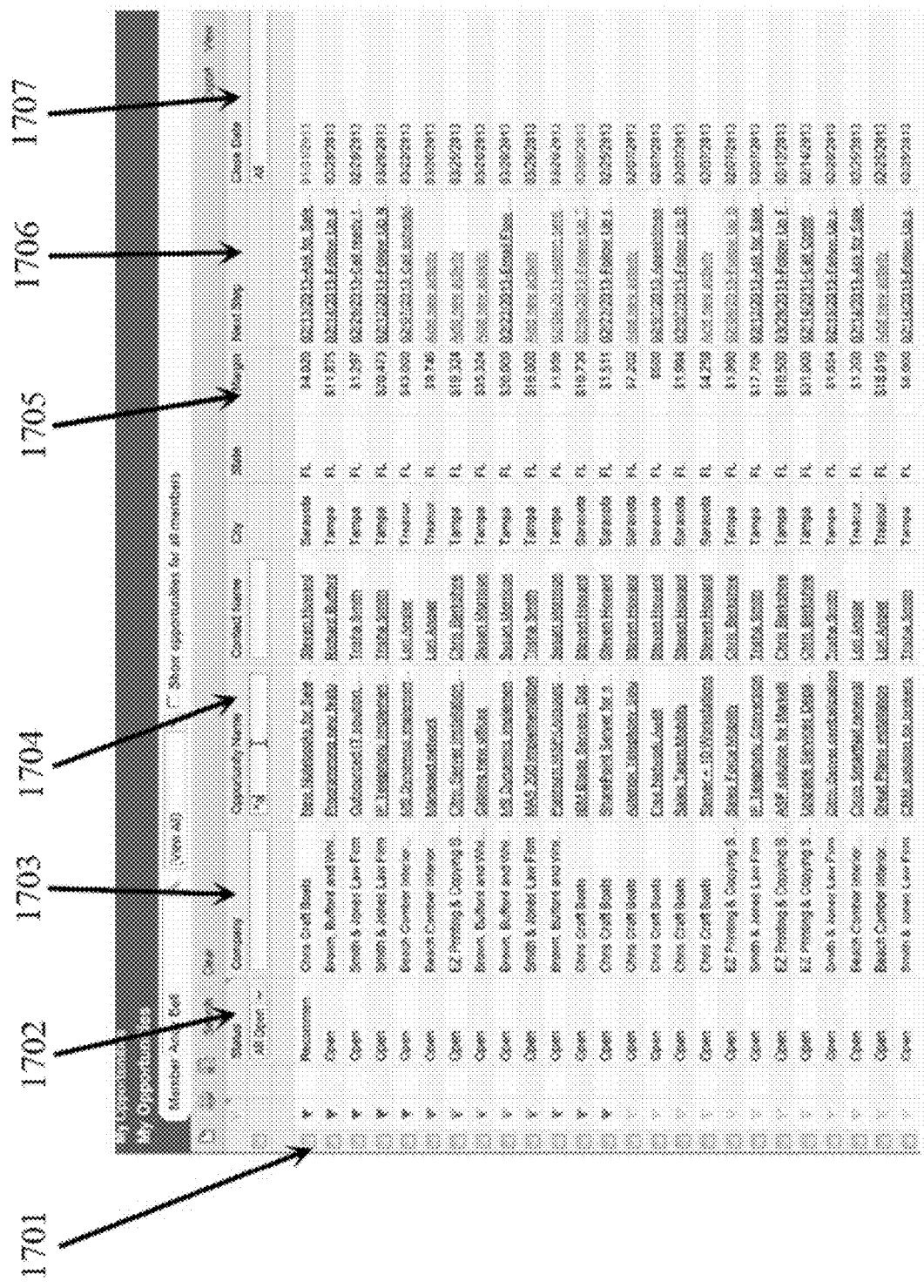
FIG. 17 is an illustrative example of an embodiment of a user interface for sales management.

FIG. 17 illustrates an embodiment of a user interface, provided by the resource planning system 204, for sales management. The display shows all the sales opportunities being pursued, for easy reference by the sales staff. Each sales opportunity is displayed as one row 1701. Each row has multiple columns 1702-1707 that display the data for that sales opportunity. Column 1702 displays the status of the opportunity. Column 1703 displays the company with which the opportunity is being pursued. Column 1704 displays the internal name of the opportunity. Column 1705 displays the margin (profit) that the opportunity would give the service provider 201 if it were closed. Column 1706 displays the next step that is required by the sales staff in order to advance the opportunity. Column 1707 displays the expected closing date for the opportunity, or the actual closing date if the opportunity has been closed.

Figure 18:
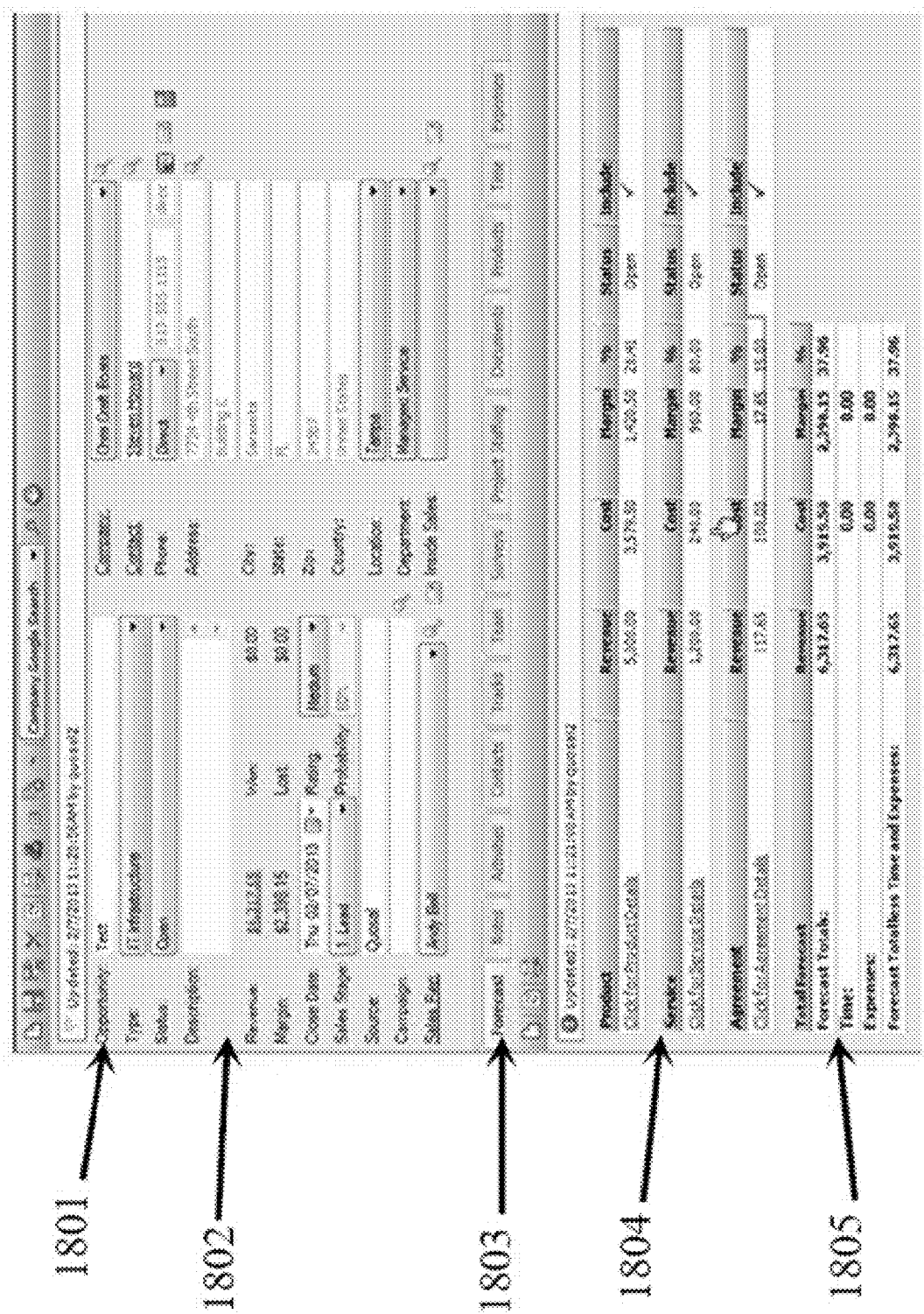
FIG. 18 is an illustrative example of an embodiment of a user interface for managing a single sales opportunity.

FIG. 18 illustrates an embodiment of a user interface, provided by the resource planning system 204, for managing a single sales opportunity. The display allows the sales staff to view and edit all the detail information about a single sales opportunity. Entry 1801 allows the internal name of the opportunity, which is displayed in column 1704 in FIG. 17, to be modified. Entry 1802 allows the description of the opportunity to be modified.

The bottom part of the user interface is used to display several different categories of information about the opportunity. A set of tabs 1803 is used to select the category of information being displayed. In the embodiment shown in FIG. 18, the Forecast tab is selected. This shows an area 1804 displaying the breakdown of the financials associated with each product class, and an area 1805 with the total financials for the entire opportunity.

Figure 19:
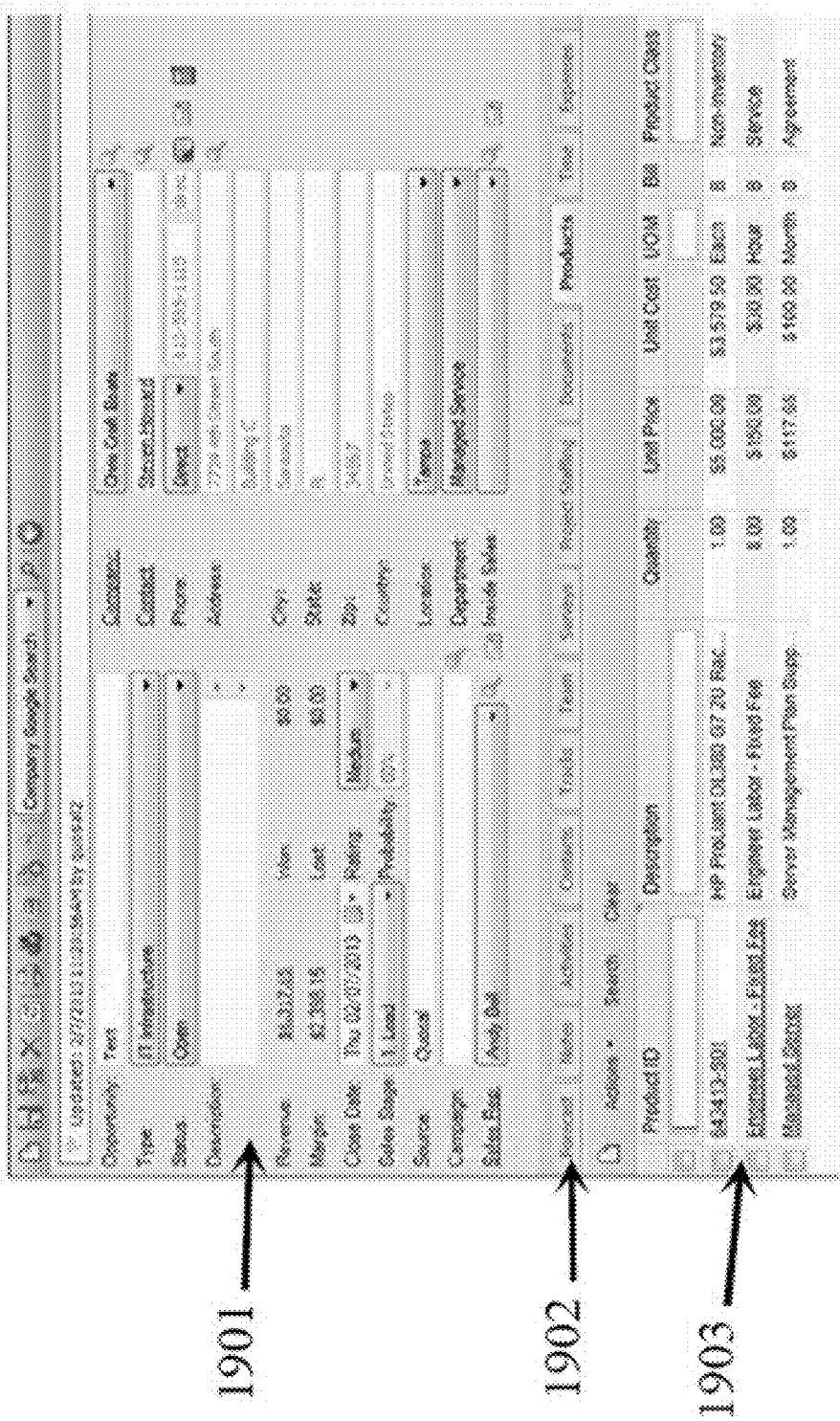
FIG. 19 is an illustrative example of an embodiment of a user interface for managing the products associated with a single sales opportunity.

FIG. 19 illustrates an embodiment of a user interface, provided by the resource planning system 204, for managing the products associated with a single sales opportunity. The top part of the user interface 1901 is the same as previously illustrated with respect to FIG. 18. In the tabs 1902, a different tab is selected for Products. As a result, the bottom part of the user interface 1903 is modified to display the list of products that are associated with the opportunity.

Figure 20:
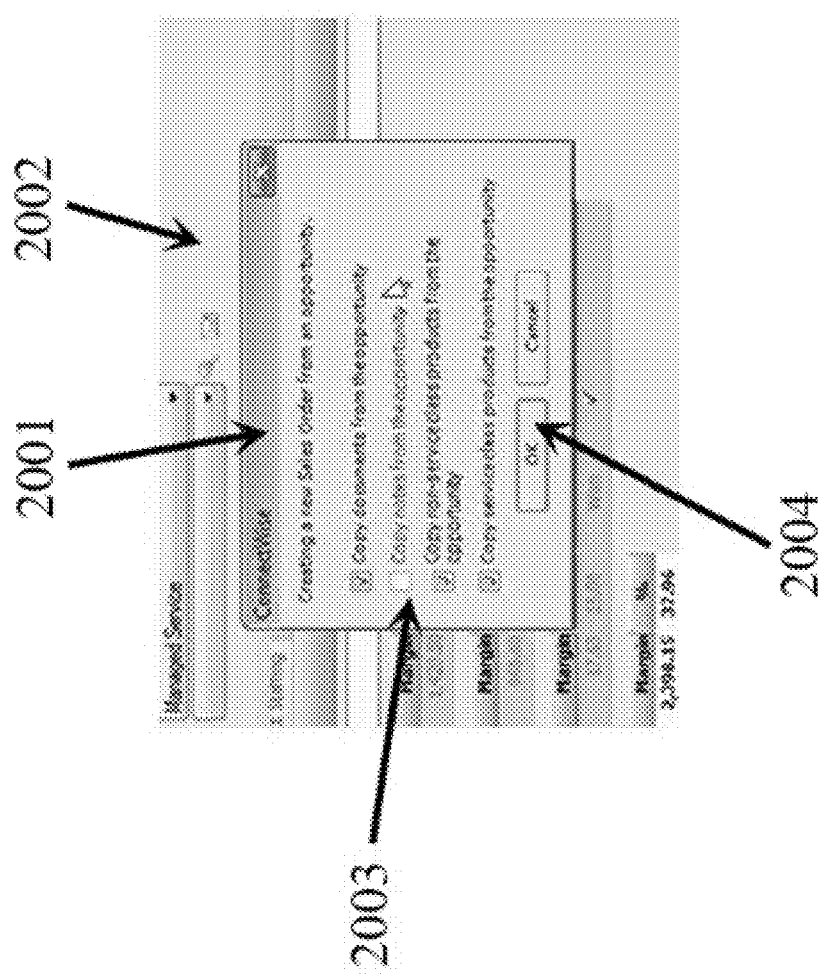
FIG. 20 is an illustrative example of an embodiment of a user interface for creating a sales order from a sales opportunity that was won.

FIG. 20 illustrates an embodiment of a user interface, provided by the resource planning system 204, for creating a sales order from a sales opportunity that was won. After the sales opportunity is won, the next step is to deliver the sale from the service provider 201 to the customer 206. Initiating this process creates a dialog box 2001 on top of the existing sales management interface 2002 (shown in part). The dialog box 2001 has a number of options 2003 about what information is copied from the sales opportunity to the sales order. After adjusting these options 2003, clicking on the OK button 2004 creates the sales order.

Figure 21:
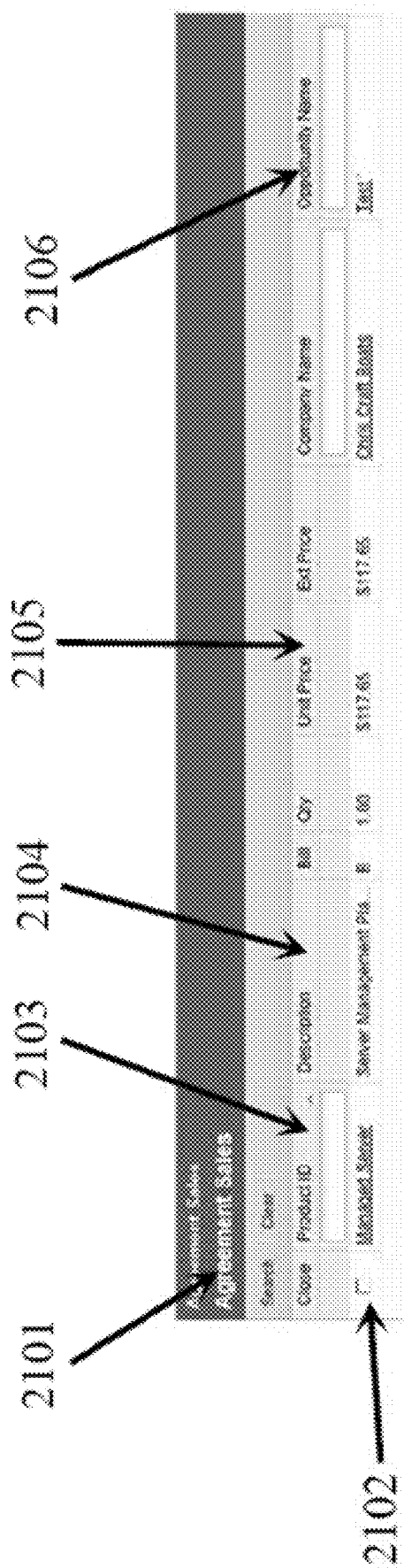
FIG. 21 is an illustrative example of an embodiment of a user interface for displaying and modifying agreements.

FIG. 21 illustrates an embodiment of a user interface, provided by the resource planning system 204, for displaying and modifying agreements products. The display 2101 shows a list of agreements products, where each row 2102 has information about one agreements product. The columns 2013-2106 display information about each agreements product. Column 2103 displays the product ID. Column 2104 displays the product description. Column 2105 displays the price of the agreements product for the customer 206. Column 2106 displays the internal name of one sales opportunity that uses the product.

Figure 22:
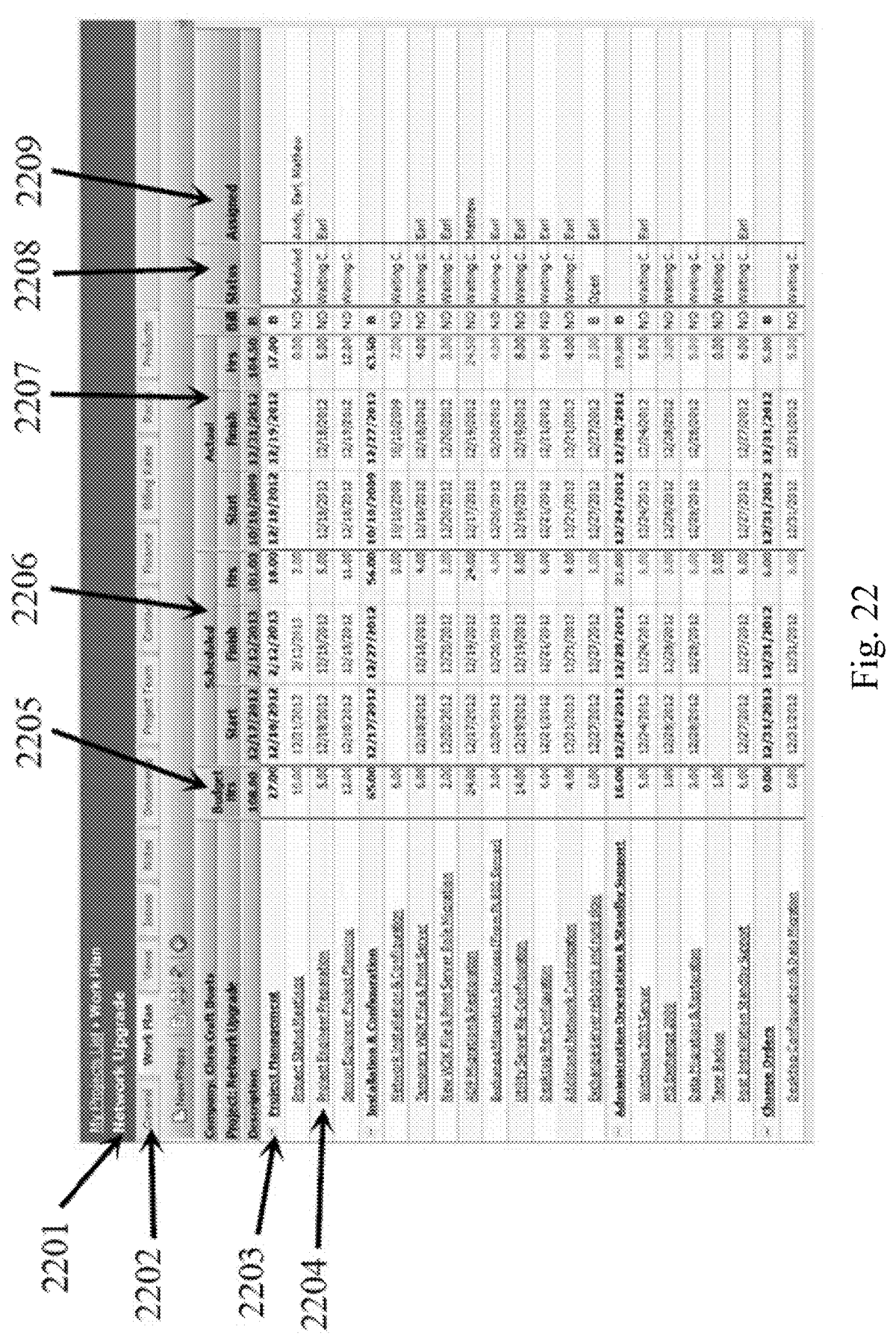

FIG. 22 illustrates an embodiment of a user interface, provided by the resource planning system 204, for project management. The name of the project 2201 is the label for the display. A set of tabs 2202 selects the information shown in the display. In one embodiment, the Work Plan tab is selected as shown in FIG. 22, and the display shows the groups of tasks 2203 with the individual tasks 2204 indented under the groups 2203. For each task 2204, the columns 2205-2209 display information about the task. Column 2205 displays the hours of time that are budgeted for the task. Column 2206, which comprises a group of columns, displays the details about the task scheduling: when the task is planned, and how much time is planned to finish the task. Column 2207, which is made up of a group of columns, displays the details about the timing of the task as it was actually completed: when the task was started, when the task was finished, and how much time was used to finish the task. Column 2208 displays the current status of the task. Column 2209 displays the staff members who are responsible for completing the task.

Figure 23:
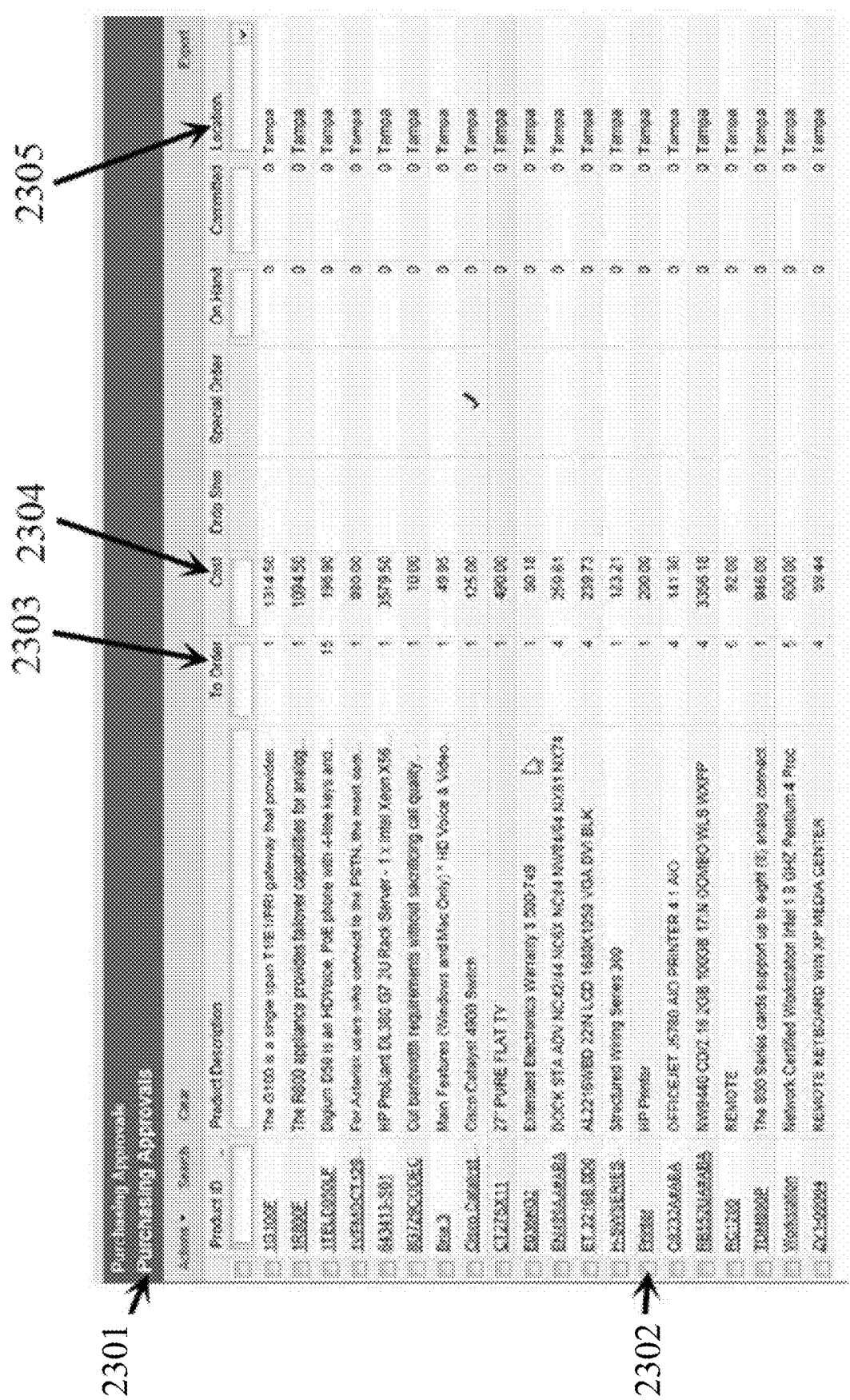
FIG. 23 is an illustrative example of an embodiment of a user interface for managing procurement.

FIG. 23 illustrates an embodiment of a user interface, provided by the resource planning system 204, for managing procurement. The display header 2301 indicates that the page displays information about purchasing. The display is a list of items that need to be purchased, where each row 2302 is a single item for purchase. The columns 2303-2305 display information about each item for purchase. Column 2303 displays the quantity (number) of items to purchase. Column 2304 displays the cost of the item from the vendor 205. Column 2306 displays the location where the item should be delivered.

Figure 24:
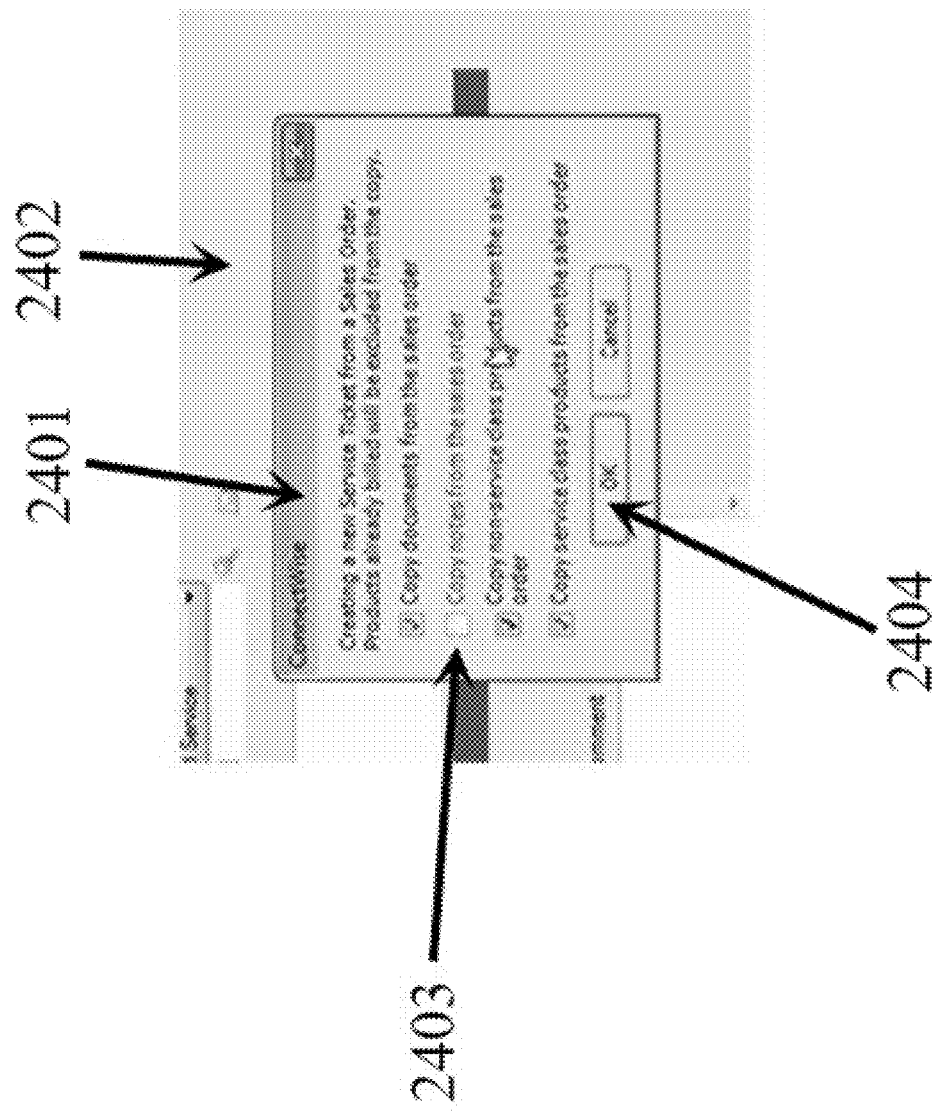
FIG. 24 is an illustrative example of an embodiment of a user interface for creating a service ticket from a sales order.

FIG. 24 illustrates an embodiment of a user interface, provided by the resource planning system 204, for creating a service ticket from a sales order. After the sales order has been planned and is ready for execution, the next step is to generate tickets to drive the implementation of the sales order by engineering. Initiating this process creates a dialog box 2401 on top of the existing sales order interface 2402 (shown in part). The dialog box 2401 has a number of options 2403 about what information is copied from the sales order to the service ticket. After adjusting these options 2403, clicking on the OK button 2404 creates the service ticket.

Figure 25:
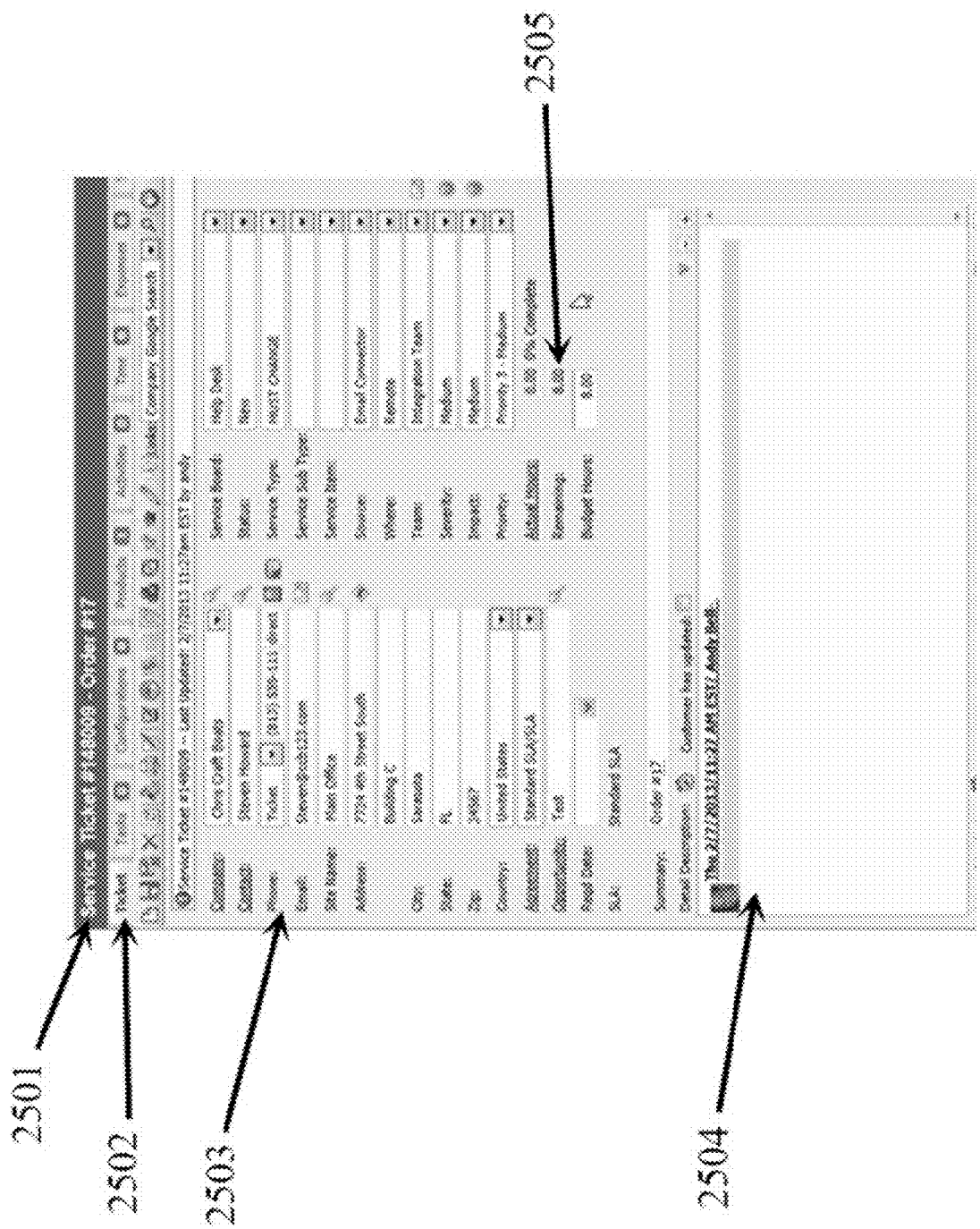
FIG. 25 is an illustrative example of an embodiment of a user interface for displaying and modifying a service ticket.

FIG. 25 illustrates an embodiment of a user interface, provided by the resource planning system 204, for displaying and modifying a service ticket. The display header 2501 indicates the name and identifier of the service ticket. A set of tabs 2502 selects the information shown in the display. In one embodiment, the Ticket tab is selected as shown in FIG. 25. As a result, the rest of the display 2503 shows information about the ticket. A large interaction area 2504 allows entry of free-form text describing any aspect of the ticket.

The initial time 2505 budgeted for the service ticket cannot be changed. This is because the value is taken from the product data 301. This makes it clear to the engineer in charge of the ticket what the expected effort is for the ticket, and when to alert management if complications are increasing the amount of labor significantly. In this way, the generation of the service ticket directly from the product data 301 greatly helps to control labor costs and manage overruns.

Figure 26:
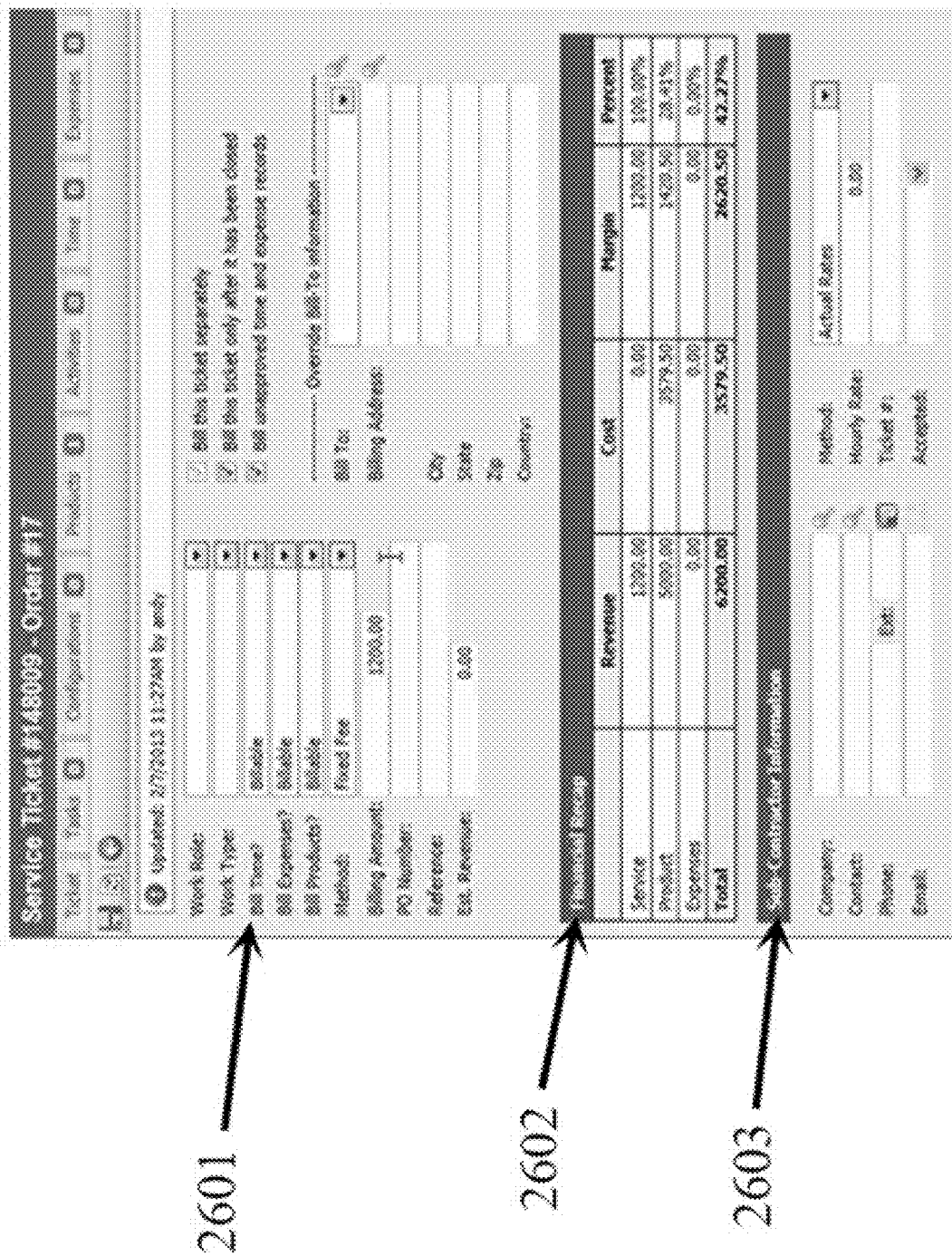
FIG. 26 is an illustrative example of an embodiment of a user interface for displaying and modifying the financial aspects of a service ticket.

FIG. 26 illustrates an embodiment of a user interface, provided by the resource planning system 204, for displaying and modifying the financial aspects of a service ticket. The tabs across the top of the interface are used to select the information that is displayed. Section 2601 displays the billing details, including the method used for computing the billing and the information for billing the customer. Section 2602 displays the summary for the customer expenses incurred by the service ticket. Section 2603 displays information about any external contractor used by the service provider 201 in order to complete the ticket.

Figure 27:
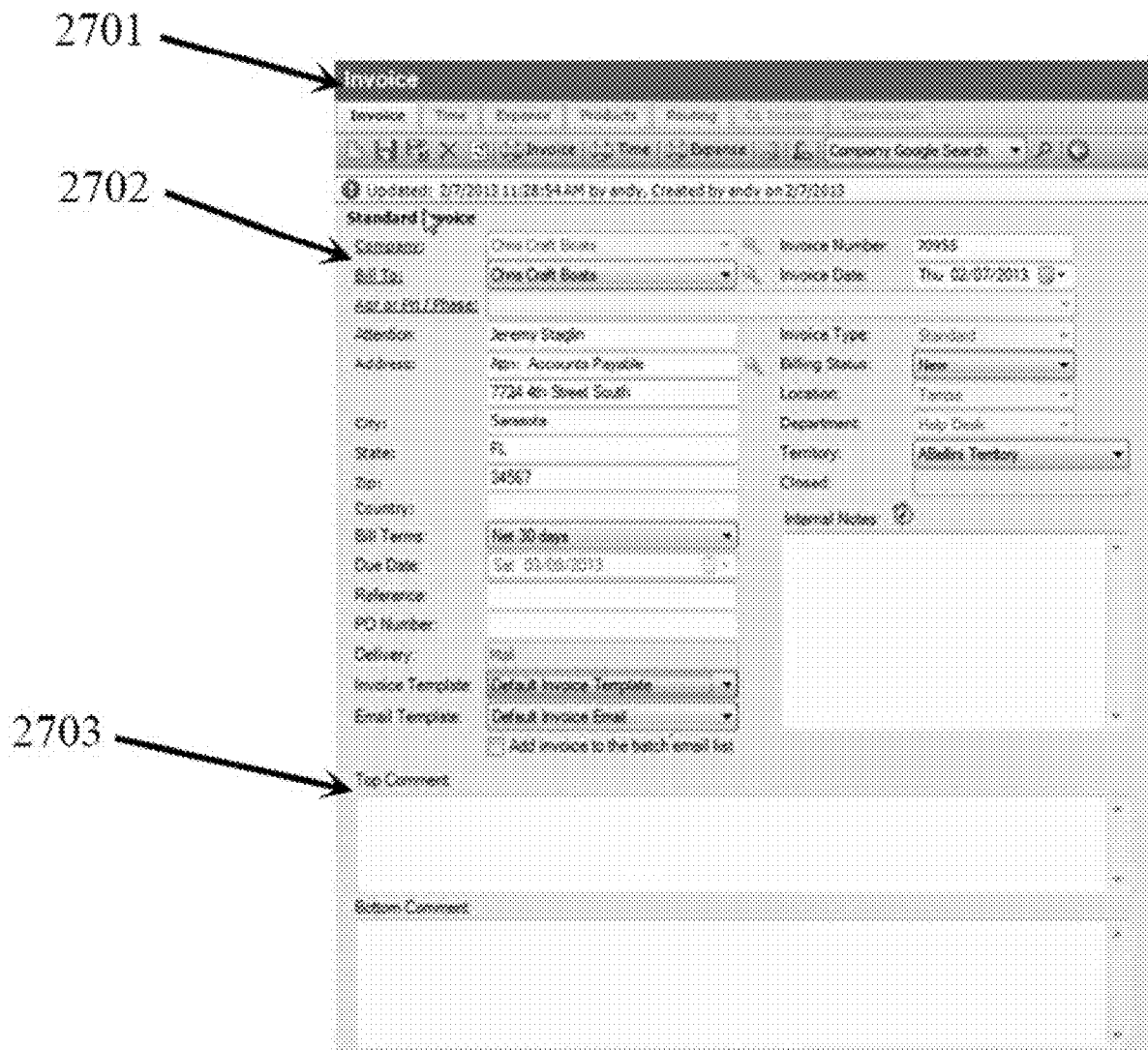
FIG. 27 is an illustrative example of an embodiment of a user interface for displaying and modifying an invoice for a customer.

FIG. 27 illustrates an embodiment of a user interface, provided by the resource planning system 204, for displaying and modifying an invoice for a customer. The display header 2701 indicates that the interface is for generating an invoice, and provides a set of tabs for controlling the information that is displayed. In one embodiment, the Invoice tab is selected as shown in FIG. 27, and the bottom area of the interface 2702 provides a viewing and editing capability for all aspects of the invoice that goes to the customer 206. The editing capability includes large text areas 2703 that allow for significant customization of the invoice.

Figure 28:
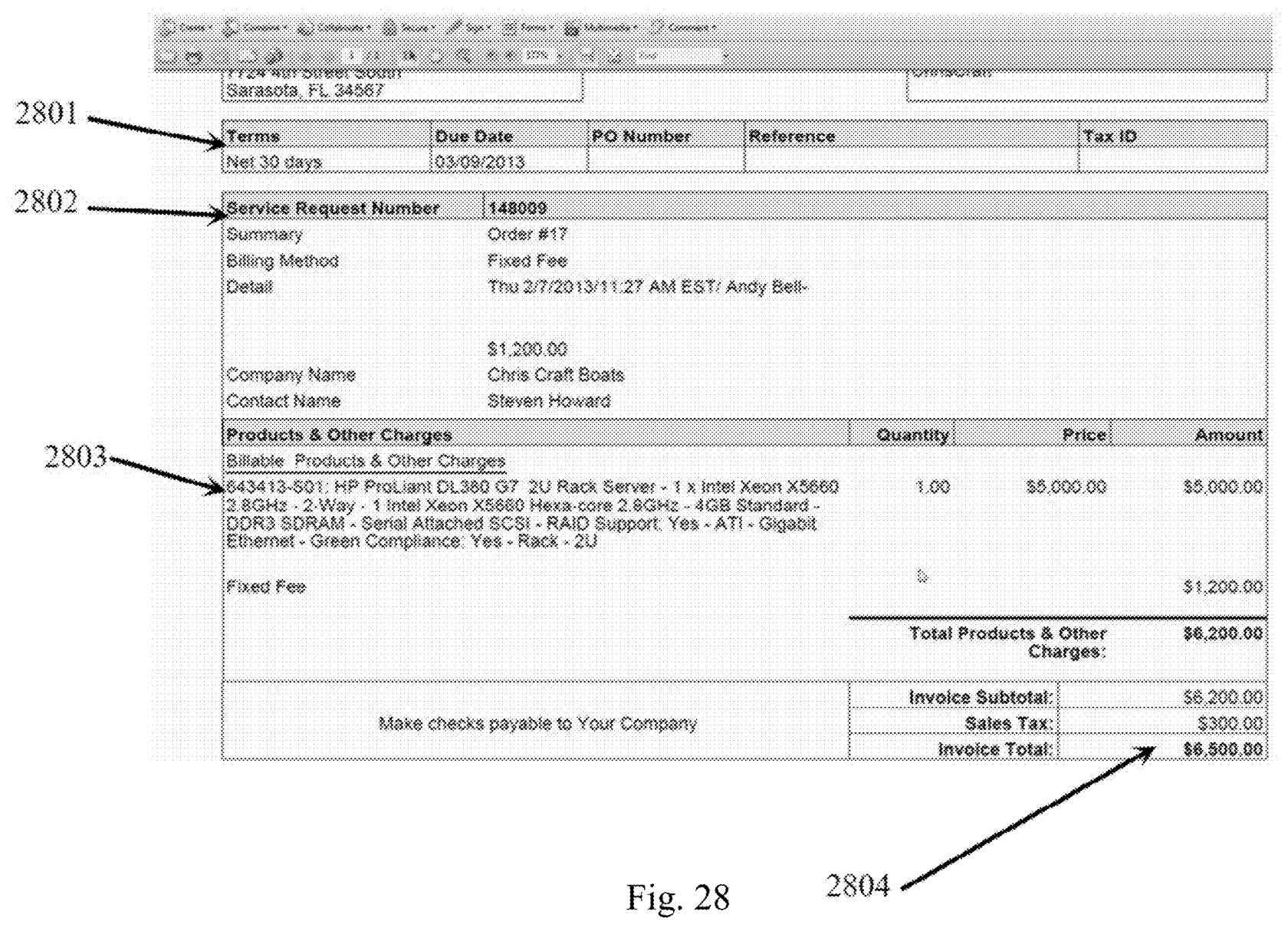

FIG. 28 illustrates an embodiment of an invoice for a customer. The invoice illustrated in FIG. 28 is generated using the interface previously described with respect to FIG. 27. Section 2801 identifies the invoice and its terms. Section 2802 lists contact information and billing information for both the service provider 201 and the customer 206. Section 2803 displays the detail about the products included in the invoice. Section 2804 summarizes the amount of the invoice for the customer 206.

Figure 29:
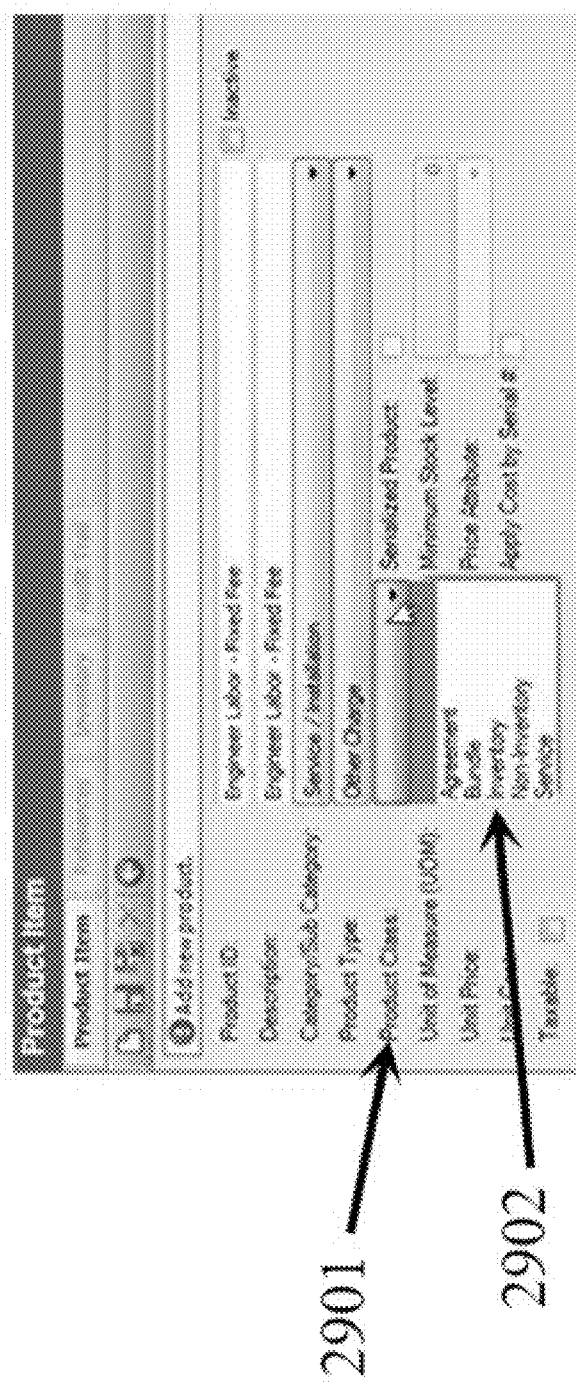
FIG. 29 is an illustrative example of an embodiment of classes for product data.

FIG. 29 illustrates an embodiment of classes for product data. The user interface shown in FIG. 29 is an instance of the user interface previously described with respect to FIG. 14. The item Product Class 2901 is implemented as a pull down 2902. The Agreement item in the pull down 2902 corresponds to agreements products 503 as previously described with respect to FIG. 5. The Bundle item in the pull down 2902 corresponds to bundles 1101 as previously described with respect to FIG. 11. The Inventory item in the pull down 2902 corresponds to inventory parts products 504 as previously described with respect to FIG. 5. The Non-Inventory item in the pull down 2902 corresponds to non-inventory parts products 505 as previously described with respect to FIG. 5. The Service item in the pull down 2902 corresponds to labor products 501 as previously described with respect to FIG. 5.

Figure 30:
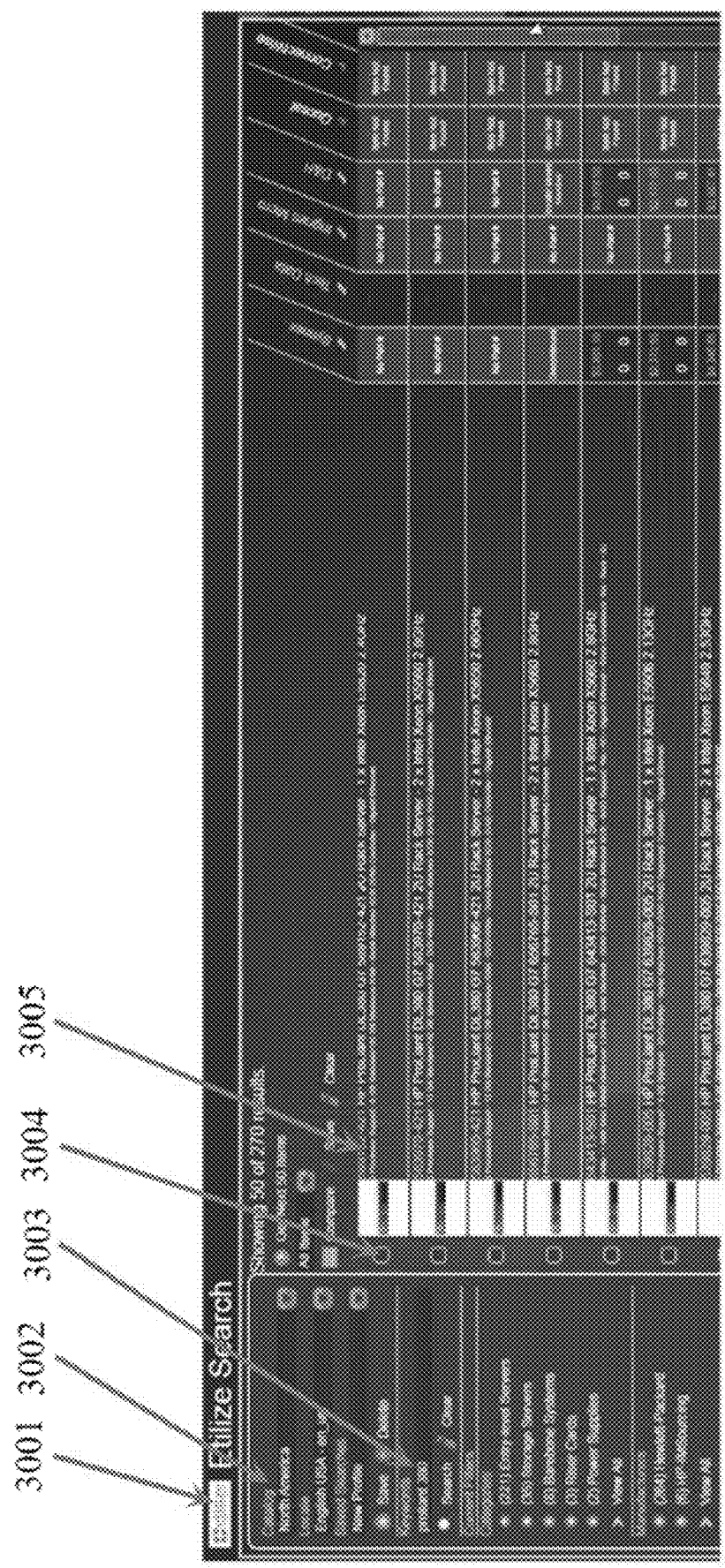
FIG. 30 is an illustrative example of an embodiment of a user interface for interfacing product data to an external product data source.

FIG. 30 illustrates an embodiment of a user interface, provided by the resource planning system 204, for interfacing product data to an external product database. The interface header 3001 displays the name of the external product database. The interface allows the product database to be selected 3002 and searched 3003 using keywords. The results of the search are shown in the right panel of the interface. Once an item is found using its detail information 3005, it can be selected 3004 and imported into the product data 301.

Figure 31:
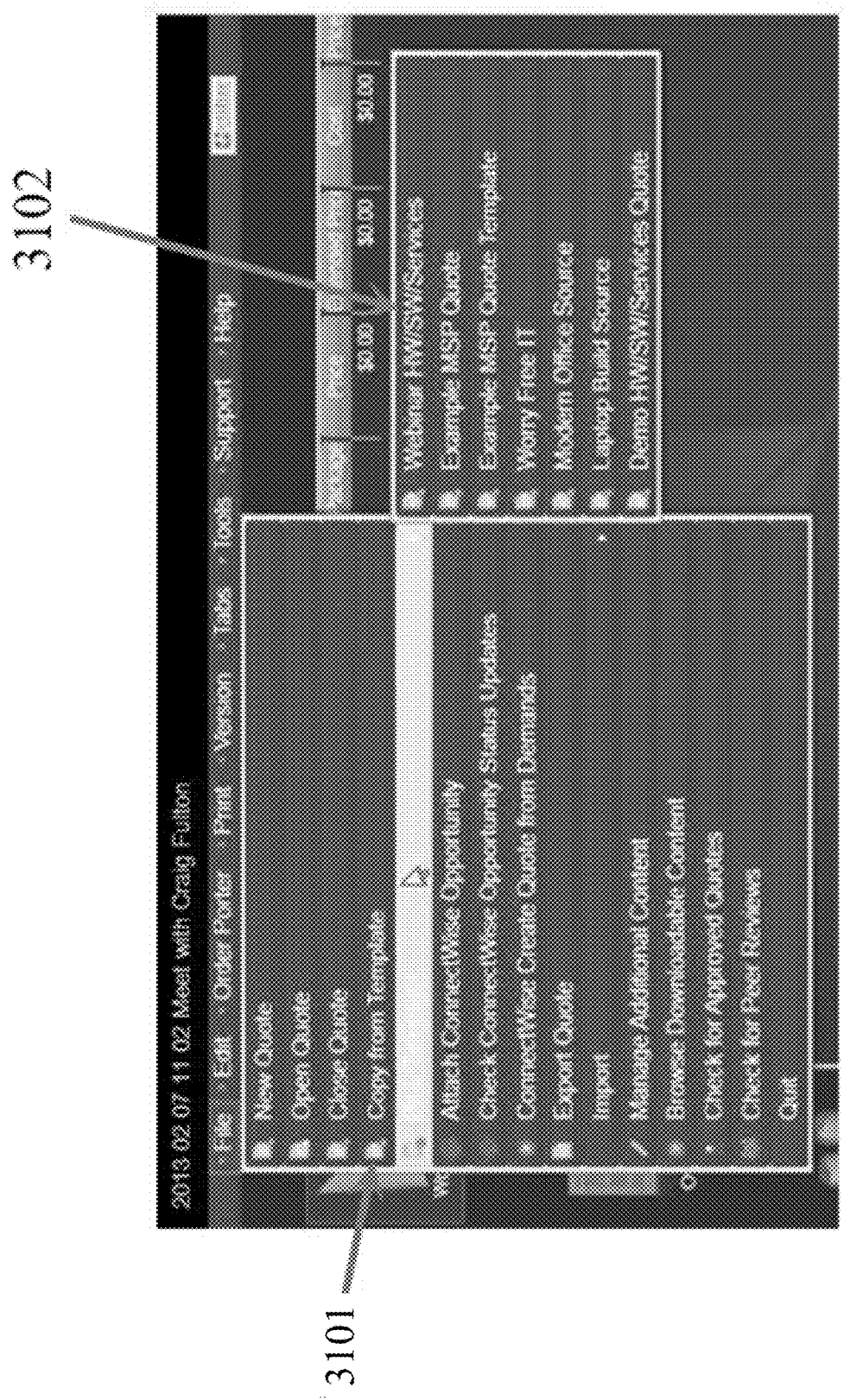
FIG. 31 is an illustrative example of an embodiment of a user interface for selecting a product template.

FIG. 31 illustrates an embodiment of a user interface, provided by the resource planning system 204, for selecting a product template. To create a new quote, one of the menu options 3101 is to copy the quote from a template. Hovering over this menu option 3101 displays a list 3102 of the available quote templates. The desired template can then be selected and used.

Figure 32:
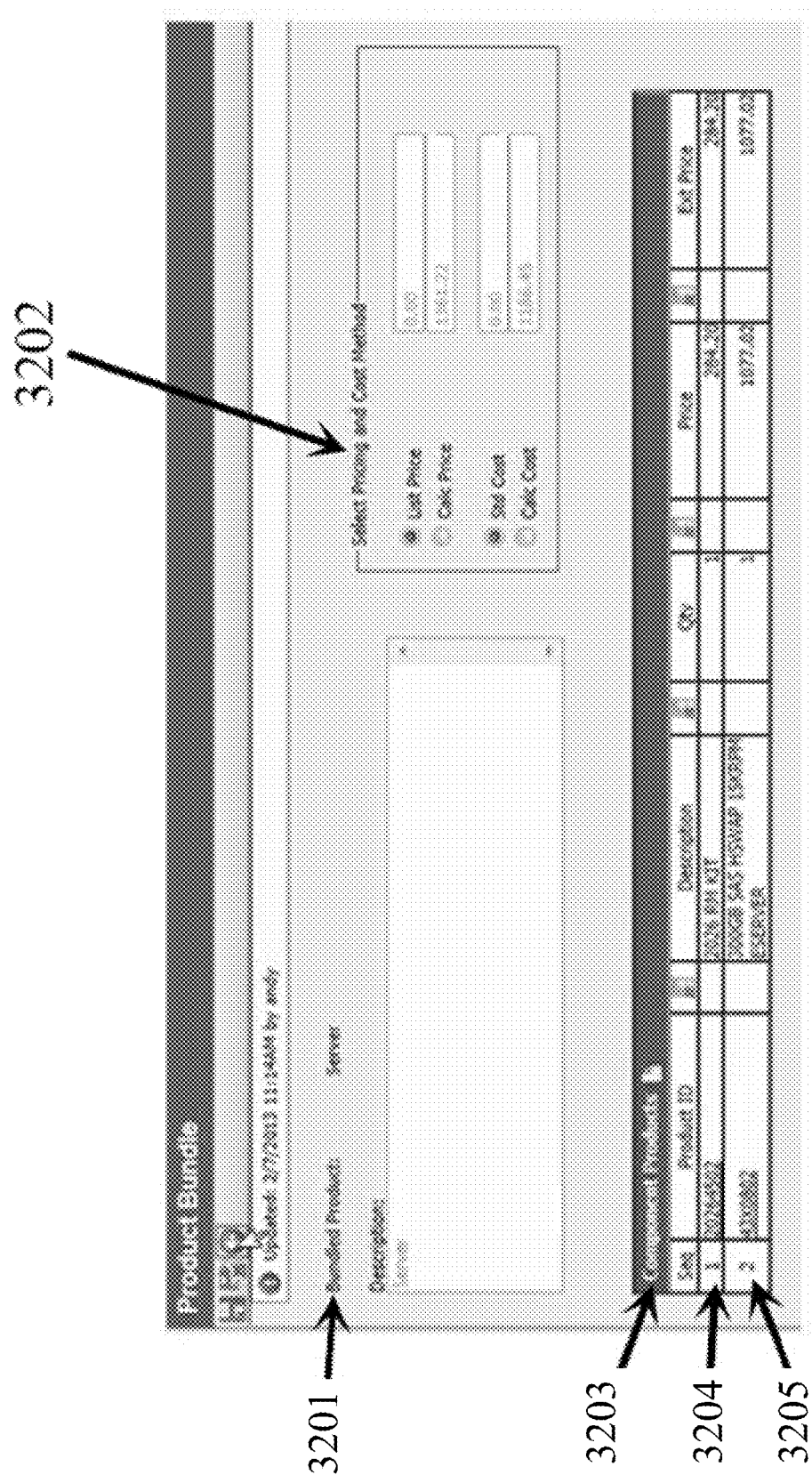
FIG. 32 is an illustrative example of an embodiment of a user interface for displaying and modifying a product bundle.

FIG. 32 illustrates an embodiment of a user interface, provided by the resource planning system 204, for displaying and modifying a product bundle 1101 as previously described with respect to FIG. 11. The display indicates the name 3201 of the bundle. Section 3202 of the user interface allows editing of the pricing options for the bundle. Section 3203 of the user interface lists the products that are included in the bundle. In one embodiment, the bundle contains two products 3204 and 3205 as shown in FIG. 32.

Figure 33:
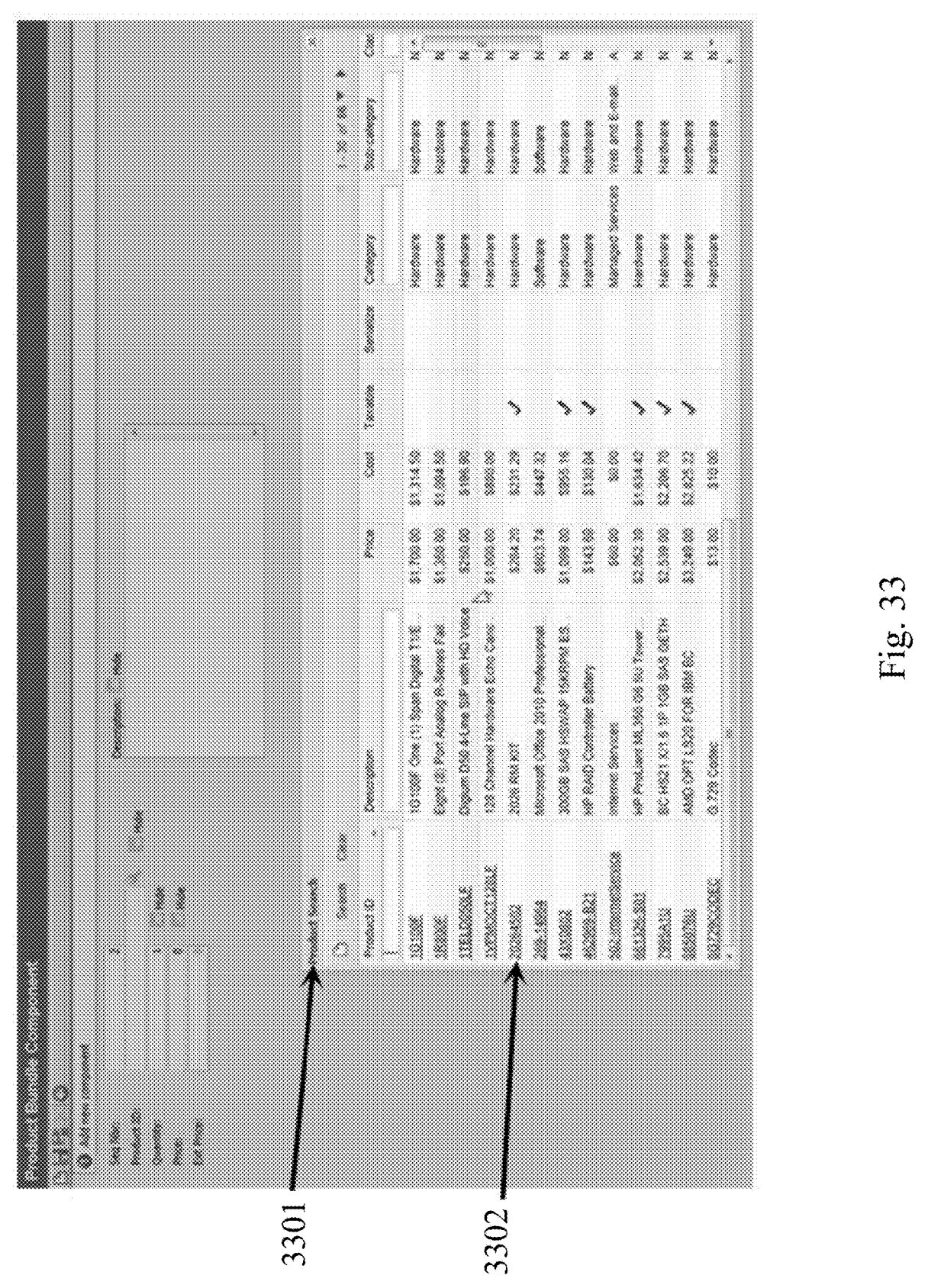

FIG. 33 illustrates an embodiment of a user interface, provided by the resource planning system 204, for selecting products to include in a product bundle. When adding a product to a bundle, the bundle user interface as previously described with respect to FIG. 32 remains in the background, and a product list 3301 is displayed on top of it. Selecting a product 3302 from the list adds it to the bundle being edited.

Figure 34:
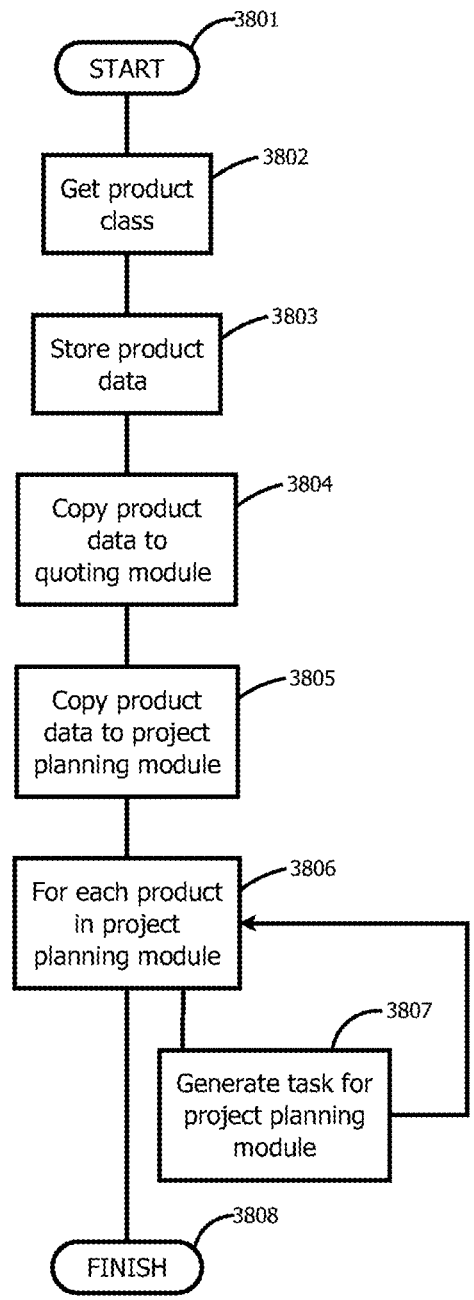
FIG. 34 is an illustrative flowchart depicting one embodiment of the steps taken to schedule and manage a project.

FIG. 34 illustrates a flowchart of an embodiment of the steps taken to schedule and manage a project. The process starts at step 3801. Step 3802 gets the product class for a product, and step 3803 stores the product data, including the product class, in the product data module. Step 3804 copies product data from the product data module to the quoting module. Step 3805 copies product data from the product data module to the project planning module. The loop at step 3806 repeats for each product in the project planning module. In the loop, step 3807 creates a task in the project planning module using the product. When the loop is finished, the process finishes at step 3808.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system, comprising:
a plurality of components including one or more processors and memory to:
receive a first data record corresponding to a sales opportunity for a customer; and
generate a service ticket based on the first data record corresponding to the sales opportunity for the customer;
a first application programming interface ("API") library executed by the one or more processors of the plurality of components to receive a second data record comprising a quote for a first product associated with the sales opportunity for the customer in a first format from a quoting module, and translate the first product in the quote to a third data record comprising the first product in a second format for storage in a product data module, the product data module executed by the plurality of components to manage a data structure, in the memory of the plurality of components, configured with a first class to describe services performed by an entity, a second class to describe items to be purchased and delivered to the customer, and a third class to describe actions performed periodically for the customer, the product data module executed to manage, in the data structure, the first product identifying a time interval for maintenance, an amount of time to perform the maintenance, and a skill level to perform the maintenance;
an external API library executed by the plurality of components to retrieve the third data record comprising the first product in the second format from the product data module, and translate the third data record to a project planning data format for storage in a fourth data record in a project planning module, the fourth data record comprising the first product in the project planning data format;
the project planning module executed by the plurality of components to generate schedule data using at least one of the time interval for the maintenance, the amount of time to perform the maintenance, and the skill level to perform the maintenance stored in the project planning data format in the third data record; and
the one or more processors to modify the service ticket with the schedule data.

2. The system of claim 1, comprising:
the one or more processors to generate a sales order based on the sales opportunity.

3. The system of claim 1, comprising the one or more processors to:
generate a sales order based on the sales opportunity; and
generate the service ticket based on the sales order.

4. The system of claim 1, comprising:
the external API library executed by the plurality of components to receive the schedule data from the project planning module in the project planning data format and translate the schedule data to the second format for storage in the product data module; and the product data module executed by the plurality of components to receive the schedule data in the second format and update the third data record stored in the product data module with the schedule data in the second format.

5. The system of claim 4, comprising:
the first API library executed by the plurality of components to retrieve, from the product data module executed by the plurality of components, the updated second data record including the schedule data and translate the updated third data record to the first format for storage in the quoting module.

6. The system of claim 5, comprising:
the quoting module executed by the plurality of components to receive, via the first API library, the updated third data record including the schedule data translated into the first format, and store the translated updated second data record in the first data record of the quoting module.

7. The system of claim 1, wherein the plurality of components comprise a sales management component to create a sales order based on the sales opportunity.

8. The system of claim 7, comprising the sales management component to:
store a plurality of quotes associated with the sales opportunity; and
provide the plurality of quotes of the sales opportunity for association with the sales order.

9. The system of claim 1, wherein the plurality of components comprise a ticketing system to generate the service ticket.

10. The system of claim 1, wherein the plurality of components comprise a customer relationship management component to:
maintain contact information corresponding to the sales opportunity.

11. The system of claim 10, comprising:
the customer relationship management component to provide an interface to initiate, via the contact information, at least one of a telephone call, an email, a text message, a letter, or a fax.

12. A method, comprising:
receiving, by a plurality of components including one or more processors and memory, a first data record corresponding to a sales opportunity for a customer;
generating, by the one or more processors, a service ticket based on the first data record corresponding to the sales opportunity for the customer;
receiving, by a first application programming interface ("API") library executed by the one or more processors, a second data record comprising a quote for a first product associated with the sales opportunity for the customer in a first format from a quoting module;
translating, by the first API library, the first product in the quote to a third data record comprising the first product in a second format for storage in a product data module, the product data module executed by the plurality of components to manage a data structure, in the memory of the plurality of components, configured with a first class to describe services performed by an entity, a second class to describe items to be purchased and delivered to the customer, and a third class to describe actions performed periodically for the customer, the product data module executed to manage, in the data structure, the first product identifying a time interval for maintenance, an amount of time to perform the maintenance, and a skill level to perform the maintenance;

retrieving, by an external API library executed by the plurality of components, the third data record comprising the first product in the second format from the product data module;

translating, by the external API library, the third data record to a project planning data format for storage in a fourth data record in a project planning module, the fourth data record comprising the first product in the project planning data format;

generating, by the project planning module executed by the one or more processors, schedule data using at least one of the time interval for the maintenance, the amount of time to perform the maintenance, and the skill level to perform the maintenance stored in the project planning data format in the third data record; and modifying, by the one or more processors, the service ticket with the schedule data.

13. The method of claim 12, comprising:
generating, by the one or more processors, a sales order based on the sales opportunity.

14. The method of claim 12, comprising:
generating, by the one or more processors, a sales order based on the sales opportunity; and
generating, by the one or more processors, the service ticket based on the sales order.

15. The method of claim 12, comprising:
receiving, by the external API library, the schedule data from the project planning module in the project planning data format and translate the schedule data to the second format for storage in the product data module;
receiving, by the product data module, the schedule data in the second format; and updating, by the product data module, the third data record stored in the product data module with the schedule data in the second format.

16. The method of claim 15, comprising:
retrieving, by the first API library, from the product data module executed by the plurality of components, the updated second data record including the schedule data and translate the updated third data record to the first format for storage in the quoting module.

17. The method of claim 16, comprising:
receiving, by the quoting module via the first API library, the updated third data record including the schedule data translated into the first format, and store the translated updated second data record in the first data record of the quoting module.

18. The method of claim 12, wherein the plurality of components comprise a sales management component, comprising:
creating, by the sales management component, a sales order based on the sales opportunity.

19. The method of claim 18, comprising:
storing, by the sales management component, a plurality of quotes associated with the sales opportunity; and
providing, by the sales management component, the plurality of quotes of the sales opportunity for association with the sales order.

20. The system of claim 12, wherein the plurality of components comprise a ticketing system and a customer relationship management component, comprising:
generating, by the ticketing system, the service ticket;
maintaining, by the customer relationship management component, contact information corresponding to the sales opportunity; and
providing, by the customer relationship management component, an interface to initiate, via the contact information, at least one of a telephone call, an email, a text message, a letter, or a fax.

* * * * *